(12) United States Patent
Nishimura

(10) Patent No.: US 7,343,452 B2
(45) Date of Patent: Mar. 11, 2008

(54) APPARATUS FOR DIRECT ACCESS TO ONLY SPECIFIC LOWER HIERARCHY DATA IN A NEST STRUCTURE

(75) Inventor: Saori Nishimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 398 days.

(21) Appl. No.: 11/080,520

(22) Filed: Mar. 16, 2005

(65) Prior Publication Data

US 2005/0234855 A1 Oct. 20, 2005

(30) Foreign Application Priority Data

Mar. 31, 2004 (JP) .............................. 2004-104275
Sep. 6, 2004 (JP) .............................. 2004-258624

(51) Int. Cl.
*G06F 12/00* (2006.01)

(52) U.S. Cl. ..................................... 711/115

(58) Field of Classification Search ................ 711/117, 711/154, 115
See application file for complete search history.

(56) References Cited

FOREIGN PATENT DOCUMENTS

| EP | 0 617 387 A2 | 9/1994 |
|---|---|---|
| EP | 1 351 161 A1 | 10/2003 |
| JP | 11-282989 | 10/1999 |
| JP | 2001-34512 | 2/2001 |
| JP | 2003-288258 | 10/2003 |

OTHER PUBLICATIONS

European Search Report dated Dec. 20, 2006 for Appln. No. 05005880.9-2212.
ISO/IEC "7816 Part 4: Interindustry command for Interchange" Internet Citation, Online, Sep. 1, 1995, XP002169265 Retrieved from the Internet: URL : www.geocities.com/ResearchTriangle/Lab /15/8/iso/8164. htm> retrieved on Jun. 11, 2006 Part 5, Part 6, Annex D.
Keller G et al: "Flattening trees" Euro-Par's8 Parallel Processing. 4th International Euro-Par Conference. Proceedings Springer-Verlag Berlin, Germany, 1998, pp. 709-719, XP002410176.
Austrian Search Report dated Jan. 31, 2007 for Singapore Appln. No. 200502197-7.

*Primary Examiner*—Hiep T. Nguyen
(74) *Attorney, Agent, or Firm*—Pillsbury Winthrop Shaw Pittman, LLP

(57) ABSTRACT

An IC card has a memory for storing data having a nest structure in which lower hierarchy data expressed in a predetermined format exists in upper hierarchy data expressed in a predetermined format. The IC card provides direct access to only the desired lower hierarchy data from among a plurality of lower hierarchy data existing in the upper hierarchy data with respect to the data having a nest structure stored in the memory.

10 Claims, 31 Drawing Sheets

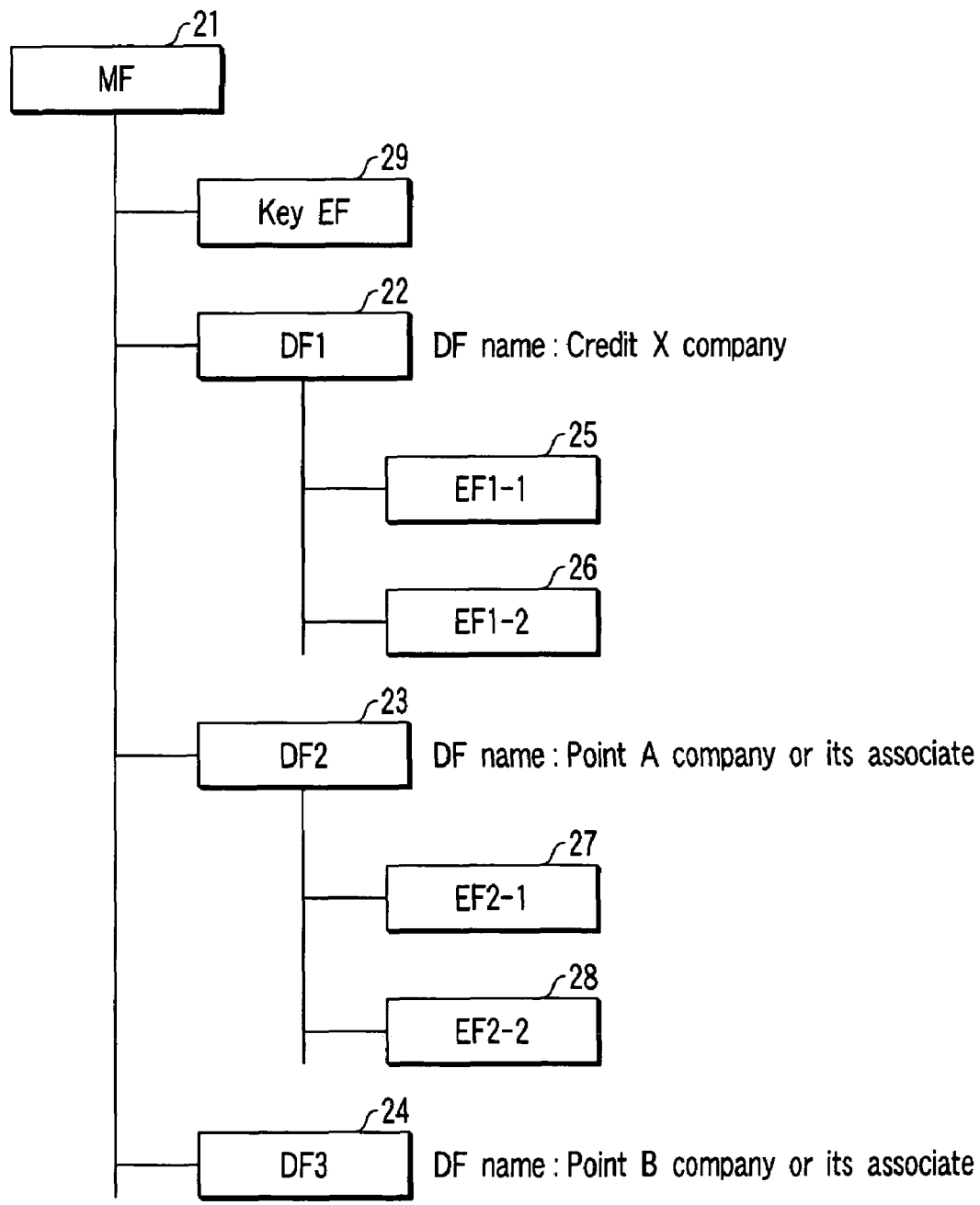
F I G. 3

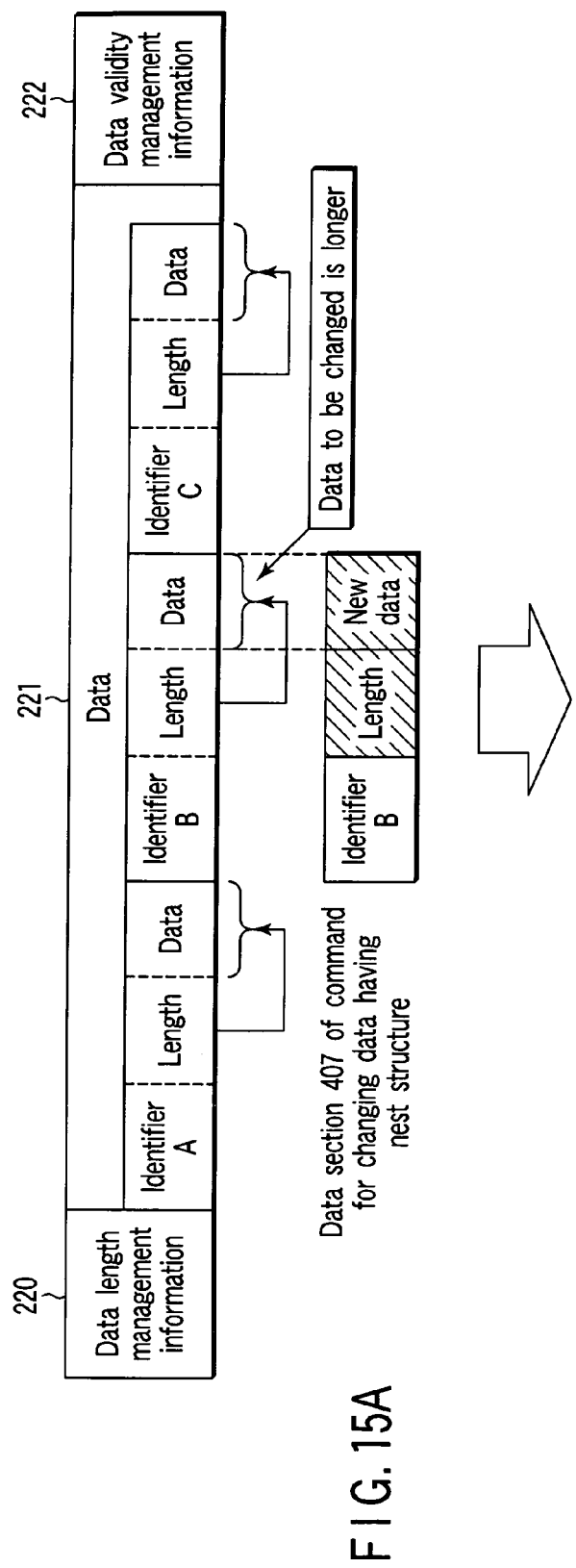
F I G. 15A
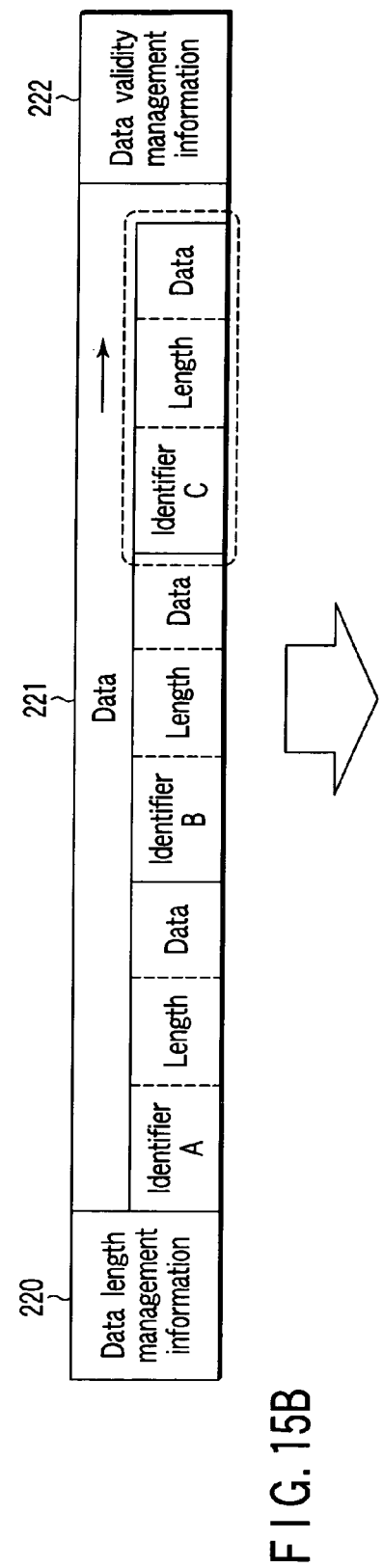
F I G. 15B

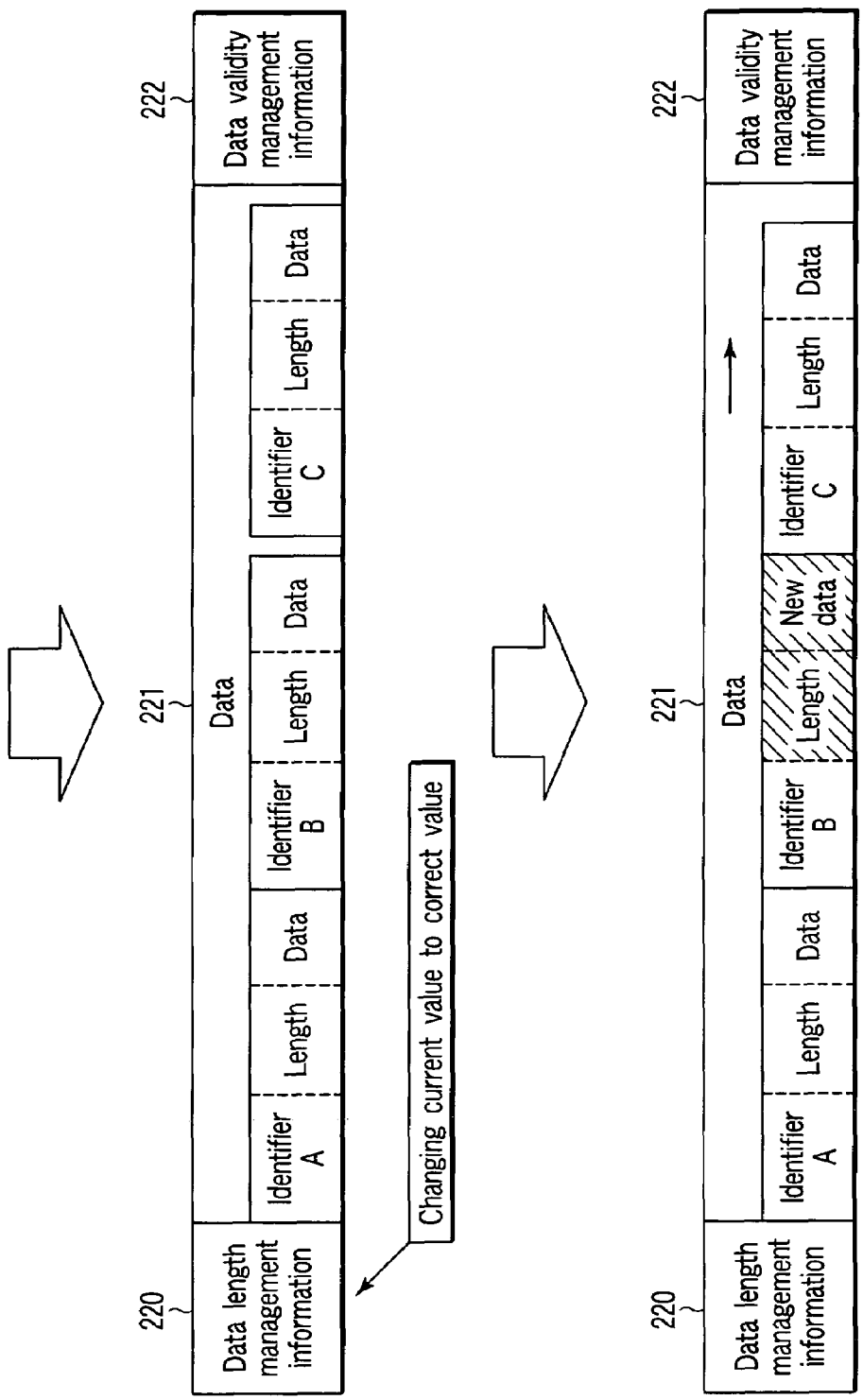
F I G. 15C
F I G. 15D

| Command header section | | | | Lc section | Data section | Le section |
|---|---|---|---|---|---|---|
| CLA | INS | P1 | P2 | Lc | Identifier of data to be read out + sequence | Le |
| 502 | 503 | 504 | 505 | 506 | 507 | 508 |

501 — Command header section, 500

FIG. 17

| Identifier | Data length | Data section | Status code 1 | Status code 2 |
|---|---|---|---|---|
| 601 | 602 | 603 | 604 | 605 |

| Command header section | | | | Lc section | Data section |
|---|---|---|---|---|---|
| CLA | INS | P1 | P2 | Lc | Identifier of data to be deleted |
| 702 | 703 | 704 | 705 | 706 | 707 |

701 → 700

F I G. 23

| Command header section | | | | Lc section | Data section |
|---|---|---|---|---|---|
| CLA | INS | P1 | P2 | Lc | Identifier of data to be written + length + data |
| 802 | 803 | 804 | 805 | 806 | 807 |

801 → 800

F I G. 28

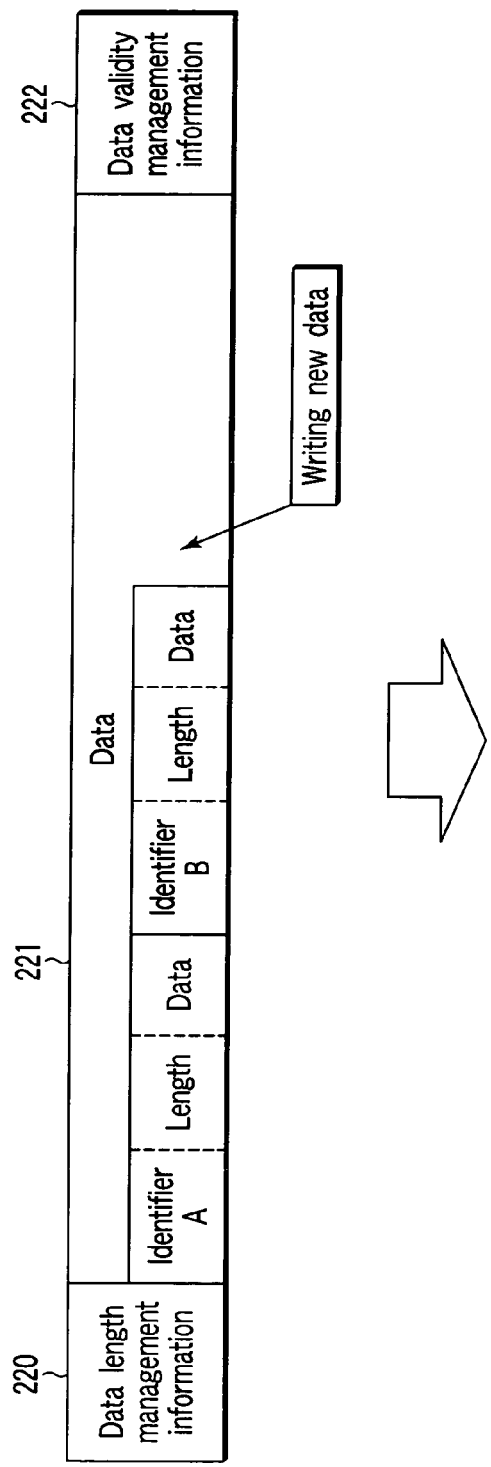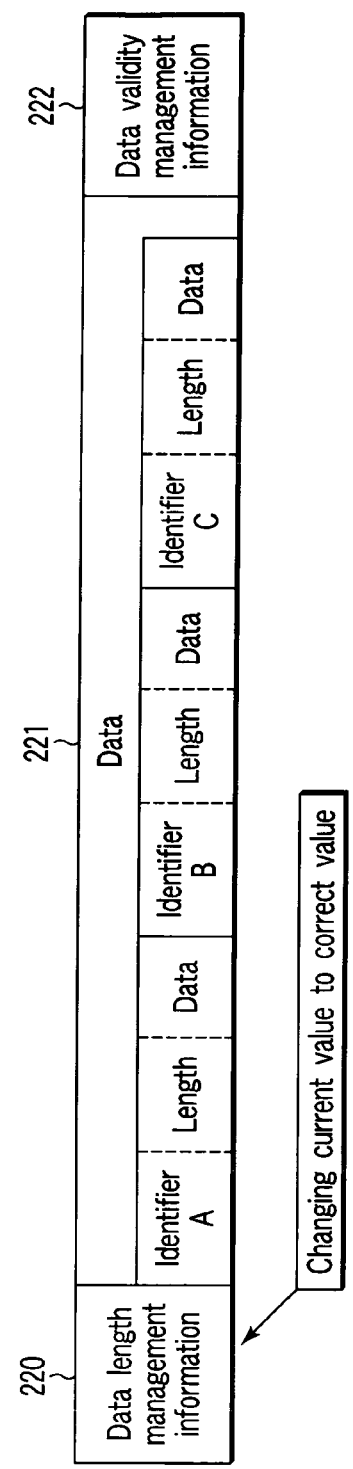
FIG. 27A
FIG. 27B

APPARATUS FOR DIRECT ACCESS TO ONLY SPECIFIC LOWER HIERARCHY DATA IN A NEST STRUCTURE

CROSS-REFERENCE TO RELATED APPLICATIONS

This application is based upon and claims the benefit of priority from prior Japanese Patent Applications No. 2004-104275, filed Mar. 31, 2004; and No. 2004-258624, filed Sep. 6, 2004, the entire contents of both of which are incorporated herein by reference.

BACKGROUND OF THE INVENTION

1. Field of the Invention

The present invention relates to a portable electronic device such as an IC card for executing a variety of processings in response to instruction data supplied from an external device.

2. Description of the Related Art

In recent years, for example, an IC card has been practically used as a portable electronic device. The ID card has: a nonvolatile memory capable of writing and rewriting data, a control element, an interface for making communication with an external device, and the like.

Such an IC card has an advantage that a plurality of application programs can be maintained in one IC card. That is, a plurality of functions such as a cash card, an ID card for personal authentication, and a prepaid card can be achieved by one IC card. In such an IC card having a plurality functions, applications and data required for operating each of the functions are stored in a nonvolatile memory in a file format on an application by application basis.

In addition, the IC card carries out a variety of processings according to an instruction (command) from an external device. Therefore, the IC card selects a file (application) in accordance with the command from the external device, and executes a variety of processings. In general, data to be stored in the nonvolatile memory incorporated in the IC card is stored in the form which consists of an identifier (tag), a data length (length), and a data value (value). Thus, in the IC card, it is possible to provide an access (readout, addition, rewriting, and deletion) or the like to specified data, based on the tag specified by a command.

However, some of the data to be stored in the memory incorporated in the IC card has a nest structure. For example, in ISO/IEC 7816-4 Annex. D, a structured tag field is defined as an example of the data having the nest structure. Such data having the nest structure has a problem that a direct access cannot be provided to data which exists in a certain type of data. For example, in a conventional IC card, there is a problem that, in the case where a plurality of second hierarchy data exist in first hierarchy data, a direct access cannot be provided to the second hierarchy data.

BRIEF SUMMARY OF THE INVENTION

It is an object of the present invention to provide a portable electronic device capable of efficiently providing an access to data having a nest structure.

According to the present invention, there is provided a portable electronic device comprising: a memory which stores data having a nest structure in which a plurality of lower hierarchy data exist in upper hierarchy data; and a control section which provides a direct access to only a specific lower hierarchy data from among the plurality of lower hierarchy data which exist in the upper hierarchy data, with respect to the data having a nest structure stored in the memory.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a diagram depicting a file structure of a data memory;

FIG. 15A is a view illustrating the processing for changing data having a nest structure;

FIG. 15B is a view illustrating the processing for changing data having a nest structure;

FIG. 15C is a view illustrating the processing for changing data having a nest structure;

FIG. 15D is a view illustrating the processing for changing data having a nest structure;

FIG. 17 is a view showing a configuration of a sequence specifying read command for specifying a sequence and requesting readout of data having a nest structure;

FIG. 18 is a view showing a configuration of response data in response to the sequence specifying read command;

FIG. 23 is a view showing a configuration of a deleting command for requesting deletion of data having a nest structure;

FIG. 27A is a view illustrating the processing for additionally writing data having a nest structure;

FIG. 27B is a view illustrating the processing for additionally writing data having a nest structure;

FIG. 28 is a view showing a configuration of an additionally writing command for requesting additional writing of data having a nest structure;

DETAILED DESCRIPTION OF THE INVENTION

Hereinafter, preferred embodiments of the present invention will be described with reference to the accompanying drawings.

Figure 1:
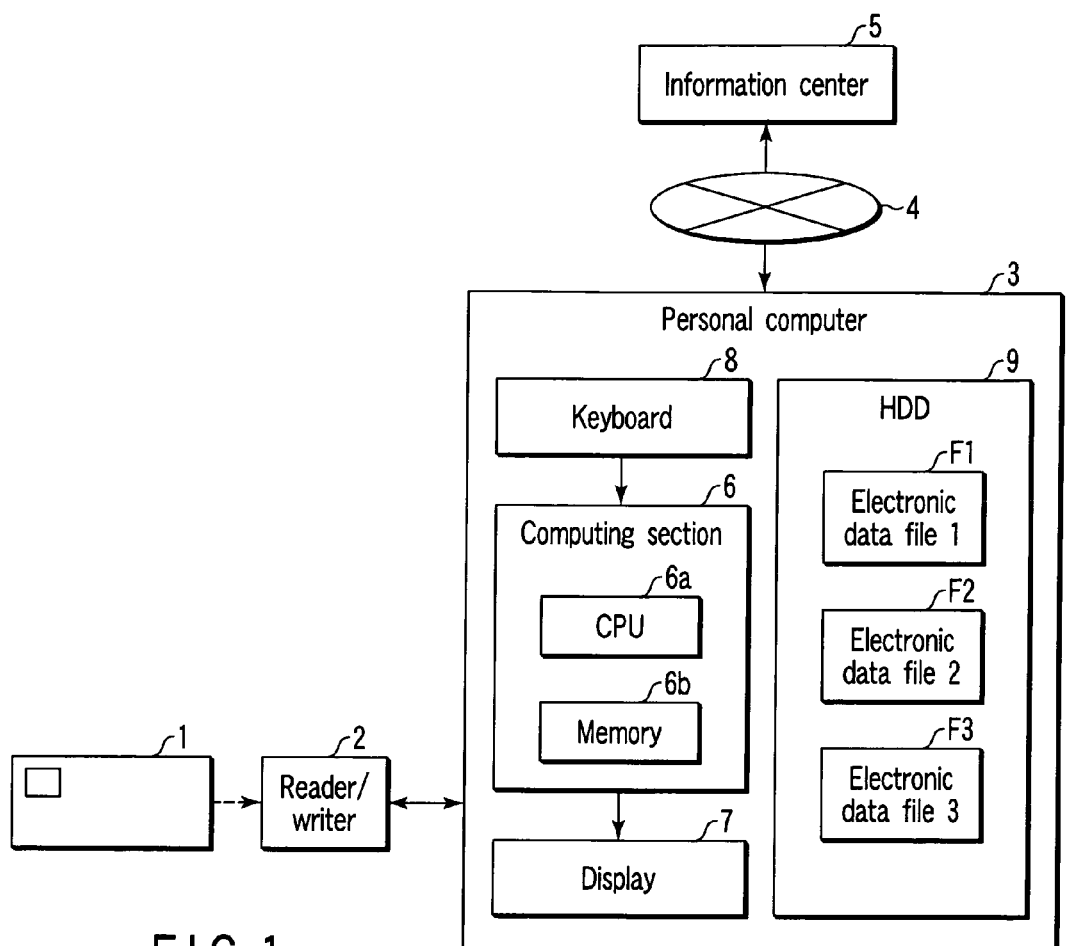
FIG. 1 is a block diagram schematically depicting a configuration of an IC card and an IC card system, the IC card serving as a portable electronic device according to an embodiment of the present invention.

FIG. 1 schematically depicts a configuration of an IC card serving as a portable electronic device according to an embodiment of the present invention, and an IC card system utilizing the IC card.

In FIG. 1, this IC card system is composed of a reader/writer 2, a personal computer 3 (hereinafter, simply referred to as a "PC"), a public communication network 4, and an information center 5. Also, in the IC card system, there can be applied: an IC card (contact type IC card) for making data communication by bringing the IC card 1 and the reader/writer 2 into contact with each other; and an IC card (non-contact type IC card) for making data communication via wireless communication without bringing the IC card 1 and the reader/writer 2 into contact with each other.

The above reader/writer 2 is provided as an external device for reading out or writing data from or into the IC card 1. The reader/writer 2 is connected to the personal computer (PC) 3 serving as a host device. The PC 3 has a function for making connection to the external information center 5 via the public communication network 4 such as the Internet, public telephone network, or ISDN.

The above PC 3 also has a computing section 6, a display 7, a keyboard 8, a hard disk (HDD) 9, and the like. The computing section 6 has a CPU 6a and a memory 6b etc. The CPU 6a controls a whole operation of the PC 3. The CPU 6a carries out a variety of processings in accordance with a control program stored in the memory 6b or the like. The memory 6b functions as a main storage device.

The display 7 functions as display means. The display 7, for example, notifies an operator of operating procedures or an operating state. The keyboard 8 functions as input means. The keyboard 8 is operated and inputted by the operator, for example. The hard disk device (HDD) 9 functions as storage means. A plurality of files, which are confidential information, are stored in the hard disk 9. The confidential information to be stored in the hard disk device 9 includes, for example, a first electronic data file F1, a second electronic data file F2, and a third electronic data file F3. In the PC 3 configured as described above, exchange (transmission and reception) of a variety of data is carried out between the PC 3 and the IC card 1 via the reader/writer 2.

The reader/writer 2 has a function for making communication according to a communication mode of the IC card 1. The reader/writer 2 has an internal memory and a communication section (not shown). The reader/writer 2 reads data from the IC card 1 or writes data into the IC card 1 by data transmission and reception between the reader/writer 2 and the IC card 1.

For example, in the case where an IC card is an IC card (contact type IC card) for making data communication via a contact section with which the IC card is brought into physical contact, the reader/writer 2 has a function for making data communication in contact with the contact section of the IC card 1. In addition, in the case where the IC card 1 is a contact type IC card, the reader/writer 2 is provided with an IC card insert section (not shown) for inserting the IC card 1, and the reader/writer 2 is provided so as to come into contact with a contact section of the IC card inserted into the IC card insert section.

In addition, in the case where an IC card is an IC card (non-contact type IC card) for making data communication via wireless communication without any physical contact, the reader/writer 2 has a function for making wireless data communication with the IC card 1. Also, in the case where the IC card 1 is a non-contact type IC card, the reader/writer 2 is provided with a communication section for transmitting and receiving a radio wave for wireless communication with the non-contact type IC card.

Next, a configuration of the IC card 1 will be described here.

Figure 2:
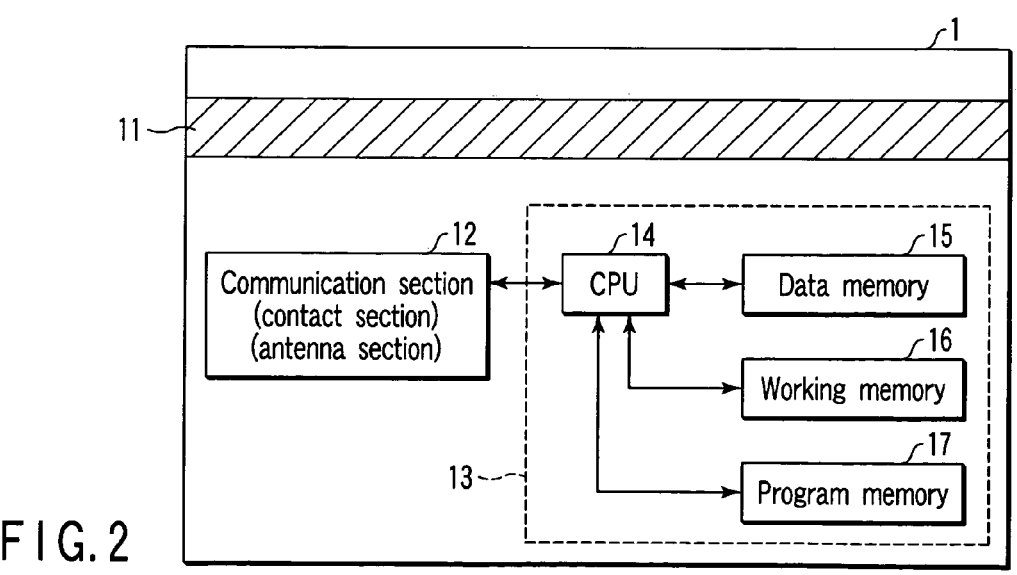
FIG. 2 is a block diagram schematically depicting a configuration of the IC card.

FIG. 2 is a view schematically depicting an example of a configuration of the IC card 1.

As shown in FIG. 2, the IC card 1 is composed of a magnetic stripe section 11, a communication section 12, and one (or a plurality of) IC chips 13.

The magnetic stripe section 11 is provided on a card surface. Data is magnetically stored in the magnetic stripe section 11.

The communication section 12 functions as receiving means and output means for data exchange with the reader/writer 2.

In the case where the IC card 1 is provided as a non-contact type IC card 1, the communication section 12 is composed of: an antenna section for transmitting and receiving a radio wave; a modulator circuit for modulating transmission data and issuing the modulated data by the antenna section; a demodulator circuit for demodulating the radio wave (modulated wave) received by the antenna section; and the like. In this case, the communication section 12 generates power and an operating clock to be supplied to each section incorporated in the IC chip 13 from the received modulated wave.

In the case where the IC card 1 is provided as a contact type IC card, the communication section 12 composed of a contact section and a communication control circuit etc. In this case, the communication section 12 obtains power and an operating clock from the reader/writer 2 by bringing the IC card 1 into contact with a contact terminal section (not shown) provided in the reader/writer 2.

The IC chip 13 is embedded in the IC card main body in a state in which the chip is connected with the communication section 12. The IC chip 13, as shown in FIG. 2, has a data memory 15, a working memory 16, a program memory 17, and the like.

The CPU 14 functions as a control element. The CPU 14, for example, carries out a variety of processings in accordance with a control program or the like stored in the program memory 17. For example, the CPU 14 executes a file selection processing operation described later and carries out a variety of processings such as discrimination processing or determination processing, data writing into the data memory 15, and data readout from the data memory 15.

The data memory 15 is provided a nonvolatile memory capable of rewriting data. For example, this data memory is composed of: a nonvolatile storage element capable of rewriting data such as an electrical erasable and programmable read only memory (EEPROM) or a flash ROM. A variety of data such as application data are stored in the data memory 15.

The working memory 16 is composed of a nonvolatile memory such as a RAM (Random Access Memory), for example. The working memory 16 functions as a working memory for the CPU 14 to temporarily maintain data being processed.

The program memory 17 is provided as a rewriting disable nonvolatile memory. For example, this program memory is composed of: a rewrite-disabled storage element such as a mask ROM (Read Only Memory). The program memory 17 stores a variety of control programs to be executed by the CPU 14. For example, the program memory 17 stores a control program for achieving each of the basic functions of the IC card 1 such as processing for a command from the reader/writer 2.

Next, a file structure of data stored in the data memory 15 will be described here.

FIG. 3 is a view showing an example of a file structure in the data memory 15.

As shown in FIG. 3, the data memory 15 stores a variety of data in a file format. The file structure as shown in FIG. 3 is based on ISO/IEC 7816-4. The file structure shown in FIG. 3 is provided as a tree structure of a directory having a variety of folder types. In accordance with the file structure as shown in FIG. 3, the data memory 15 stores data relating to a plurality of applications.

For example, in the case where the IC card 1 is used as a card having a plurality of functions such as a credit card, a point cord, and an ID card, the data memory 15 stores data relating to a plurality of applications such as an application which functions as a credit card, an application which functions as a point card, and an application serving as an ID card.

In addition, as shown in FIG. 3, the data memory 15 is configured so that an MF (Master File) 21 is provided at the top position; DF (Dedicated File) 22, DF23, and DF24 are provided under the MF21; and EF (Elementary File) 25, EF26, EF27, and EF28 are provided under each of these DF22, DF23, and DF24. In addition, under MF21, there is also provided a key EF29 used to store key information or the like for establishing an access permission for the IC card 1.

The above DF22, DF23, and DF24 are provided as folders set for each application. Therefore, the above DF22, DF23, and DF24 are provided in number which corresponds to the number of applications mounted in the IC card 1.

The above EF25, EF26, EF27, and EF28 are provided as files for storing data such as user data actually used in applications. In addition, EF25, EF26, EF27, and EF28 each are provided files for storing data relating to applications which correspond to the upper DF22, DF23, and DF24, respectively.

For example, in an example shown in FIG. 3, EF25 and EF26 are provided as files in which data relating to applications defined by DF22 is stored. EF27 and EF28 are provided as files in which data relating to applications defined by EF23 is stored.

In the present embodiment, as shown in FIG. 3, a description will be given assuming that the data memory 15 stores: an application for the IC card 1 to function as a Company X's credit card (Company X oriented application); an application for the IC card 1 to function as a Company A's point card (Company A oriented application); and an application for the IC card 1 to function as a Company B's point card (Company B oriented application).

In the example shown in FIG. 3, DF22 (hereinafter, referred to as DF1) is set as a folder for storing the Company X oriented application. In DF22, for example, a DF name serving as a file name is set as a "credit Company X". Further, under the DF22, two files, i.e., EF25 (hereinafter, referred to as EF1-1) and EF26 (hereinafter, referred to as EF1-2) exist as files for storing data relating to the Company X oriented application.

DF23 (hereinafter, referred to as DF2) is set as a filter storing the Company A oriented application. In DF23, for example, a DF name serving as a file name is set as a "point Company A". Under the DF23, two files, i.e., EF27 (hereinafter, referred to as EF2-1) and EF28 (hereinafter, referred to as EF2-2) exist as files for storing data relating to the Company A oriented application.

In addition, DF24 (hereinafter, referred to as DF3) is set as a filter for storing the Company B oriented application. In DF24, for example, a DF name serving as a file name is set as a "point Company B".

Now, a configuration of data having a nest structure stored in the data memory 15 will be described here.

The data memory 15 can store data having a nest structure. The data having a nest structure used here denotes data configured so that second hierarchy (lower hierarchy) data is present in first hierarchy (upper hierarchy) data. In the present embodiment, the first hierarchy data and second hierarchy data are configured in a similar expression format. The first hierarchy data and second hierarchy data are produced in an expression format such that an identifier (tag), a data length (length), and a data value (value) are arranged in order. The identifier (tag) is provided as information for identifying the data. The data length (length) is provided as information indicating a size (length) of the data value (value) of the data. The data value (value) is provided as a main portion of the data.

Figure 4A:
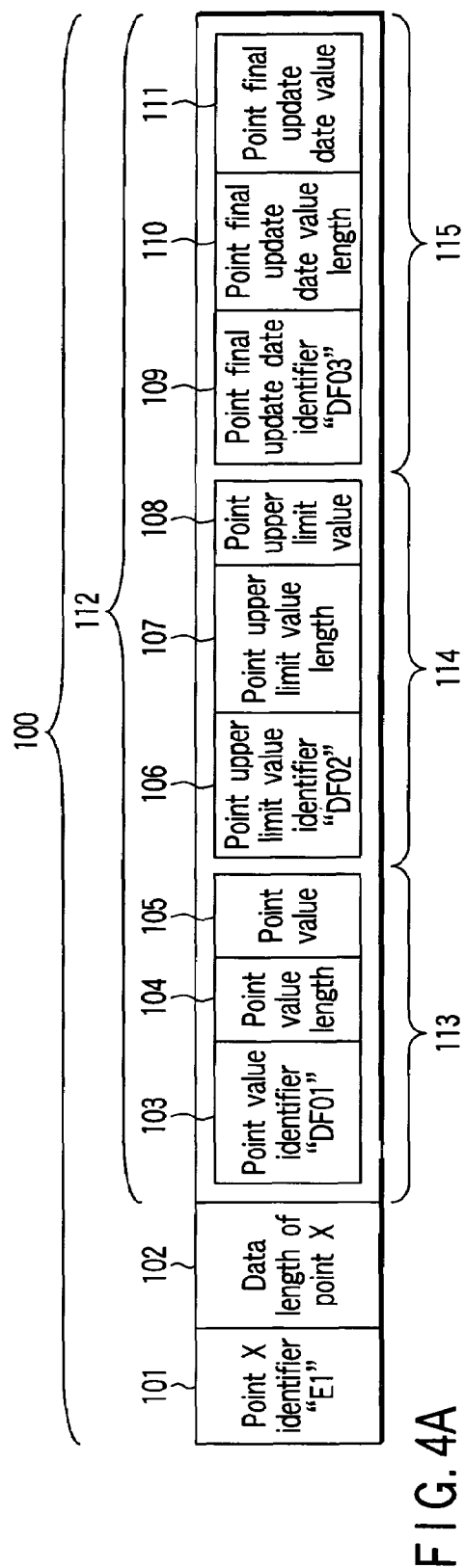
FIG. 4A is a view showing an example of a configuration of data having a nest structure.
Figure 4B:
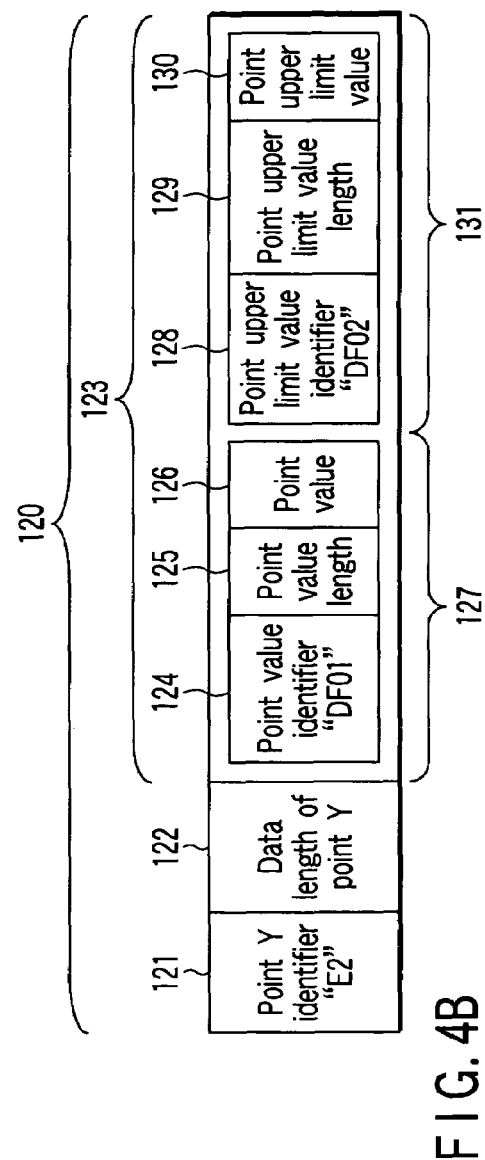
FIG. 4B is a view showing an example of a configuration of data having a nest structure.
Figure 4C:
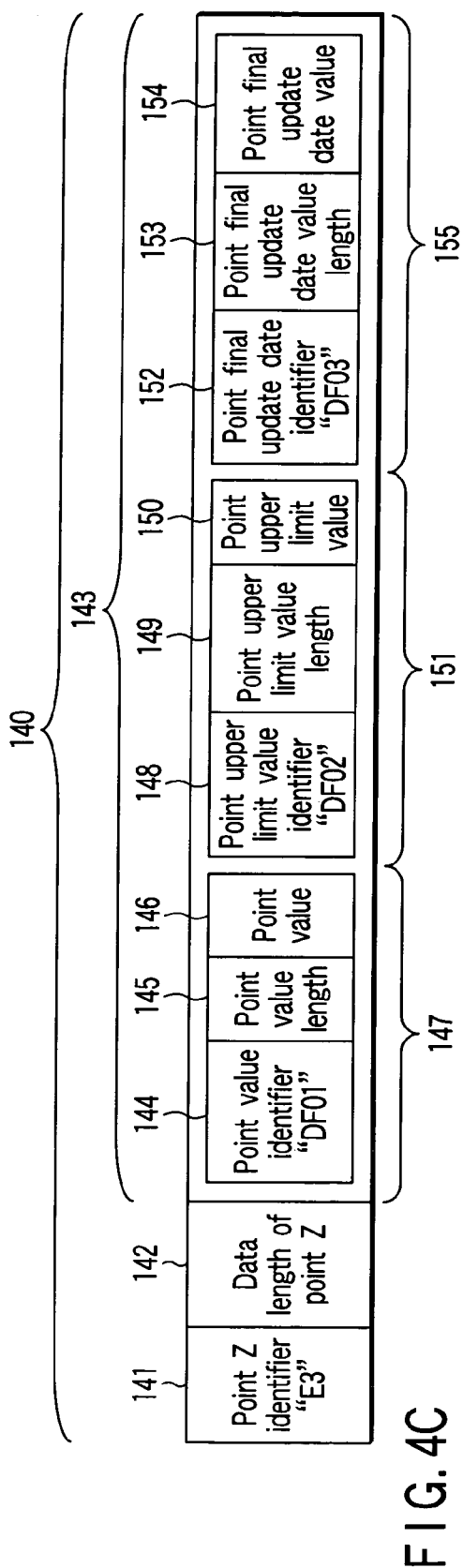
FIG. 4C is a view showing an example of a configuration of data having a nest structure.

FIGS. 4A, 4B and 4C are views each showing an example of data having a nest structure. The data having the structure shown in FIGS. 4A, 4B and 4C indicates an example of data stored in an "EF", for example.

Here in FIGS. 4A, 4B and 4C, it is assumed that data relating to the Company A oriented application is stored in "EF2-2". In addition, the Company A application manages a plurality of data relating to plural types of points (points X, Y, and Z). The points are assumed to be data changed according to a utilization state of service provided by the Company A oriented application.

FIG. 4A shows an example of a configuration of data 100 of point X.

The data (first hierarchy data) 100 of point X is composed of an identifier (tag), a data length (length), and a data value (value). The point X data 100, as shown in FIG. 4A, is composed of: an identifier ("E1") 101 serving as an identifier of the data 100; a data length 102 serving as a data length of the data 100; and a value 112 serving as a value of the data 100. The data length 102 indicates a data length of the value 112.

The value 112 of the point X is composed of data 113, data 114, and data 115 serving as second hierarchy data. These items of data (second hierarchy data) 113, 114, and 115 are composed in an expression format of data similar to the above data (first hierarchy data) 100. Namely, the data 113, 114, and 115 each are composed of an identifier (tag), a data length (length), and a data value (value).

The data 113 is provided as data indicating a point value of point X. The data 113, as shown in FIG. 4A, is composed of a data length 104 serving as a data length of the data 113 and a value 105 serving as a value of the data 113.

The data 114 is provided as data indicating an upper limit value of point X. The data 114, as shown in FIG. 4A, is composed of an identifier ("DF02") serving as an identifier of the data 114; a data length 107 serving as a data length of the data 114; and a value 108 serving as a value of the data 114.

The data 115 is provided as data indicating a final update date of point X. The data 115, as shown in FIG. 4, is composed of: an identifier ("DF03") 109 serving as an identifier of the data 115; a data length 110 serving as a data length of the data 115; and a value 111 serving as a value of the data 115.

The data structure as shown in FIG. 4A is referred to as a nest structure. Namely, the data having the nest structure indicates data configured so that, in the first hierarchy data in a predetermined format (data 100 in the example of FIG. 4A), second hierarchy data (data 113, 114, and 115 in the example of FIG. 4A) in a similar format are nested.

FIG. 4B shows an example of a configuration of data 120 of point Y.

The data (first hierarchy data) 120 of point Y is provided as data relating to point Y. The data 120, as shown in FIG. 4B, is composed of: an identifier ("E2") 121 serving as an identifier of the data 120; a data length 122 serving as a data length of the data 120; and a value 123 serving as a value of the data 120.

In addition, the value 123 of point Y is composed of: data 127 and data 131 serving as second hierarchy data. The data (second hierarchy data) 127 and 131 each are configured in a data expression format similar to the data (first hierarchy data) 120. Namely, the data 120 relating to point Y also has a nest structure, as shown in FIG. 4B.

The data 127 is provided as data indicating a point value of point Y. The data 127, as shown in FIG. 4B, is composed of: an identifier ("DF01") 124 serving as an identifier of the data 127; a data length 125 serving as a data length of the data 127; and a value 126 serving as a value of the data 27.

The data 131 is provided as data indicating an upper limit value of point Y. The data 131 is composed of: an identifier ("DF02") 128 serving as an identifier of the data 131; a data length 129 serving as a data length of the data 131; and a value 130 serving as a value of the data 131.

FIG. 4C shows an example of a configuration of data 140 of point Z.

The data (first hierarchy data) 140 of point Z is provided as data relating to point Z.

The data 140 of point Z, as shown in FIG. 4C, is composed of: an identifier ("E2") 141 serving as an identifier of the data 140; a data length 142 serving as a data length of the data 140; and a value 143 serving as a value of the data 140.

In addition, the value 143 of point Z is composed of data 147, data 151, and data 155 serving as second hierarchy data. The data (second hierarchy data) 147, 151, and 155 each are configured in a data expression format similar to the data (first hierarchy data) 140. Namely, the data 140 of point Z also has a nest structure, as shown in FIG. 4C.

The data 147 is provided as data indicating a point value of point Z. The data 147, as shown in FIG. 4C, is composed of an identifier ("DF01") 144 serving as an identifier of the data 147; a data length 145 serving as a data length of the data 147; and a value 146 serving as a value of the data 147.

The data 151 is provided as data indicating an upper limit value of point Z. The data 151, as shown in FIG. 4C, is composed of an identifier ("DF02") serving as an identifier of the data 151; a data length 149 serving as a data length of the data 151; and a value 150 serving as a value of the data 151.

The data 155 is provided as data indicating a final update date of point Z. The data 155, as shown in FIG. 4C, is composed of: an identifier ("DF03") 152 serving as an identifier of the data 155; a data length 153 serving as a data length of the data 155; and a value 154 serving as a value of the data 155.

Now, data management information contained in the data memory 15 will be described here.

Figure 5:
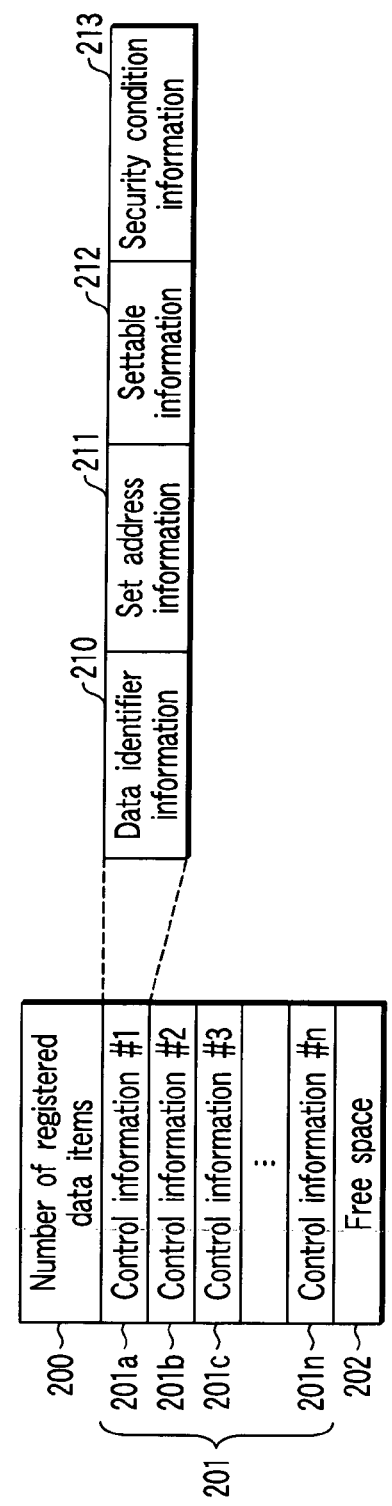
FIG. 5 is a view illustrating data management information.

FIG. 5 shows an example of data management information to be stored in the data memory 15.

The data management information as shown in FIG. 5 is provided as management information for reading out data, rewriting data, or making a search for data. The data contained in the data memory 15 is controlled to be accessed based on the above data management information. In addition, data having a nest structure is managed for each item of the first hierarchy data.

The data management information shown in FIG. 5 is composed of a data item number region 200, a control information region 201, and a free space 202. The data item number region 200 stores information indicating the number of data items (the number of control information items). The control information region 201 stores control information 201a, . . . whose item number corresponds to the number of data items (first hierarchy data for data having a nest structure).

In addition, each item of control information 201a, . . . contained in the control information region 201 is provided to be associated with each item of data (first hierarchy data for data having a nest structure). Each item of control information 201a, . . . is composed of information for controlling the corresponding data. In an example shown in FIG. 5, each item of control information 201a, . . . is composed of data identifier information 210, set address information 211, settable size information 212, and security condition information 213.

The data identifier information 210 is provided as information indicating an identifier of data corresponding to the control information 201a, . . . . With respect to data having a nest structure, the data identifier information 210 is provided as an identifier of the first hierarchy data. This data identifier information 210 is used for specifying data to be accessed. For example, in the case where data to be accessed from the reader/writer 2 in a command is specified by an identifier, the IC card 1 compares the command specified identifier with the data identifier information 210 such as each item of control information 201a, . . . , thereby making a search for the specified data.

The set address information 211 is provided as information indicating an address to which data is allocated. Namely, the set address information indicates to which address the data corresponding to the control information 201a, . . . is allocated in the data memory 15 of the IC card 1.

The settable size information 212 is provided as information indicating an allowable data size. Namely, the settable size information 212 indicates a size which can be set as data corresponding to the control information 201a, . . . . In other words, the data corresponding to the control information 201a, . . . can be changed as long as the data is within the range of sizes set in the settable size information 212.

The security condition information 213 is provided as information indicating a security condition for data corresponding to the control information 201a, . . . . The security condition information is provided as a security condition required for, in the case of reading out or rewriting the data, providing an access to the data.

The data management information is described in detail in, for example, Jpn. Pat. Appln. KOKAI Publication No. 11-282989.

Figure 6:
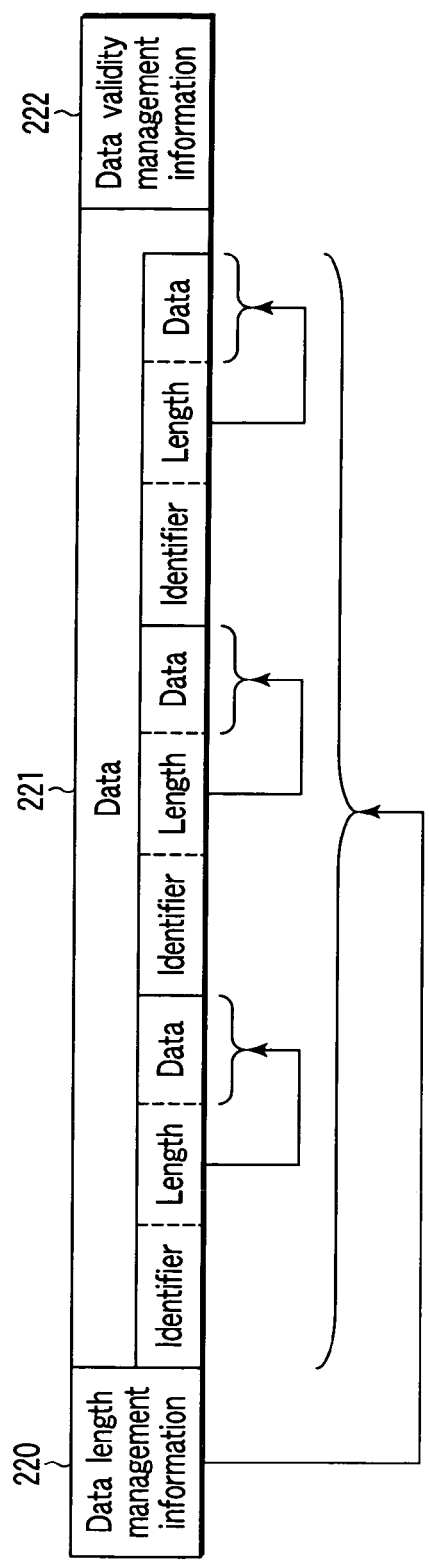
FIG. 6 is a view showing a format of data indicated by control information.

FIG. 6 shows an example of a format of data having a nest structure controlled by the above control information 201a (201b, . . . ).

The data shown in FIG. 6 is stored in an address on the data memory 15 indicated by the set address information 211 of the corresponding control information 201a (201b, . . . ). In FIG. 6, data length information 220 is provided as management information indicating a data length of a first hierarchy data value (value). Data 221 is provided as a portion of the first hierarchy data value (value). Data validity management information 222 is provided as management information for discriminating the validity of the first hierarchy data. For example, the validity of the data is checked by an exclusive logical sum or the like of the data (data length management information) 220 and data (data validity management information) 221.

Next, a description will be given with respect to a variety of processings for data having a nest structure in the IC card 1 configured as described above.

First, a description will be given with respect to the processing for reading out second hierarchy data contained in first hierarchy data having a nest structure.

Figure 7:
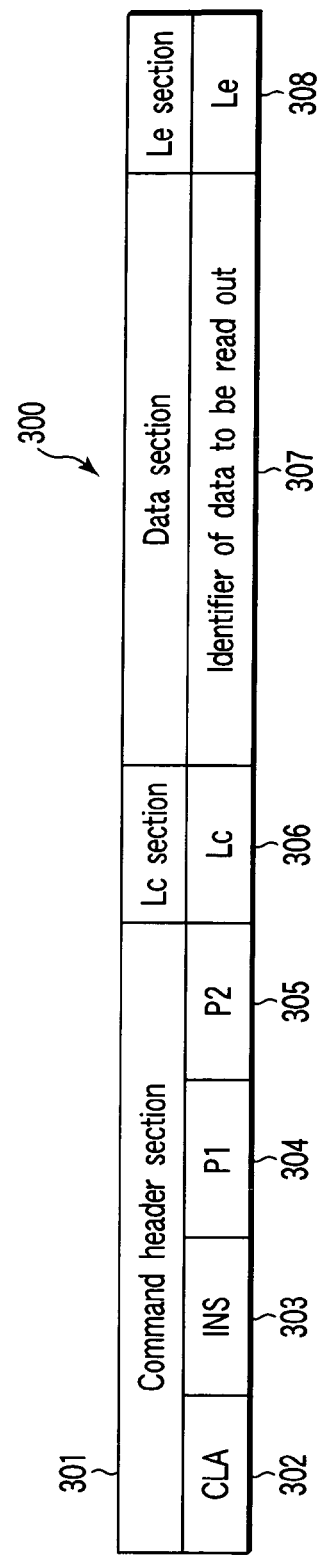
FIG. 7 is a view showing a configuration of a read command for requesting readout of data having a nest structure.

FIG. 7 shows an example of a configuration of instruction data (read command) 300 for instructing readout of second hierarchy data having a nest structure for the IC card 1. This read command 300 is supplied to the IC card 1 from the reader/writer 2.

The read command 300, as shown in FIG. 7, is composed of a command header section 301, an Lc section 306, a data section (readout data identifier) 307, and an Le section 308. The command header section 301 stores data indicating classification, instructions, and parameters of the command. The Lc section 306 stores information indicating a data length of data in the data section 307 of the command. The data section 307 stores an identifier of data to be read out.

In addition, the command header section 301 is composed of a CLA (class) section 302, an INS (Instruction) section 303, a first parameter (P1) section 304, and a second parameter (P2) section 305.

The CLA section 302 stores data indicating classification (class) of the command. The INS section 303 stores data indicating an instruction of the command. For example, in the read command 300, data indicating a read instruction is set at the INS section 303.

The first parameter (P1) section 304 and second parameter (P2) section 305 indicate which identifier of first hierarchy data includes an identifier of second hierarchy data set at the data section 307. For example, in a read command for requesting readout of the point value 105 contained in the point X data 100 shown in FIG. 4A, data indicating a read command is set at the CLA section 302 and the INS section 303. At the P1 section 304 and P2 section 305, "00" and "E1" are set as identifiers of the first hierarchy data. At the data section 307, "DF01" is set as an identifier of the second hierarchy data.

In the case where the read command 300 as shown in FIG. 7 has been received, the CPU 14 of the IC card 1 discriminates that the command is a read command based on the data set at the CLA section 302 and the INS section 303 of the command. When the command is a read command, the CPU 14 discriminates first hierarchy data which includes second hierarchy data to be read out based on a parameter (data) set at the P1 section 304 and P2 section 305. When the first hierarchy data is discriminated, the data including second hierarchy data to be read out by the P1 section 304 and P2 section 305, the CPU 14 discriminates second hierarchy data to be read out, the second hierarchy data existing in the first hierarchy data specified by the parameters of the P1 section 304 and P2 section, based on the data (second hierarchy data identifier) set at the data section 307 of the command, and reads out the second hierarchy data.

Next, the processing for reading out data in the IC card 1 will be described here.

Figure 8:
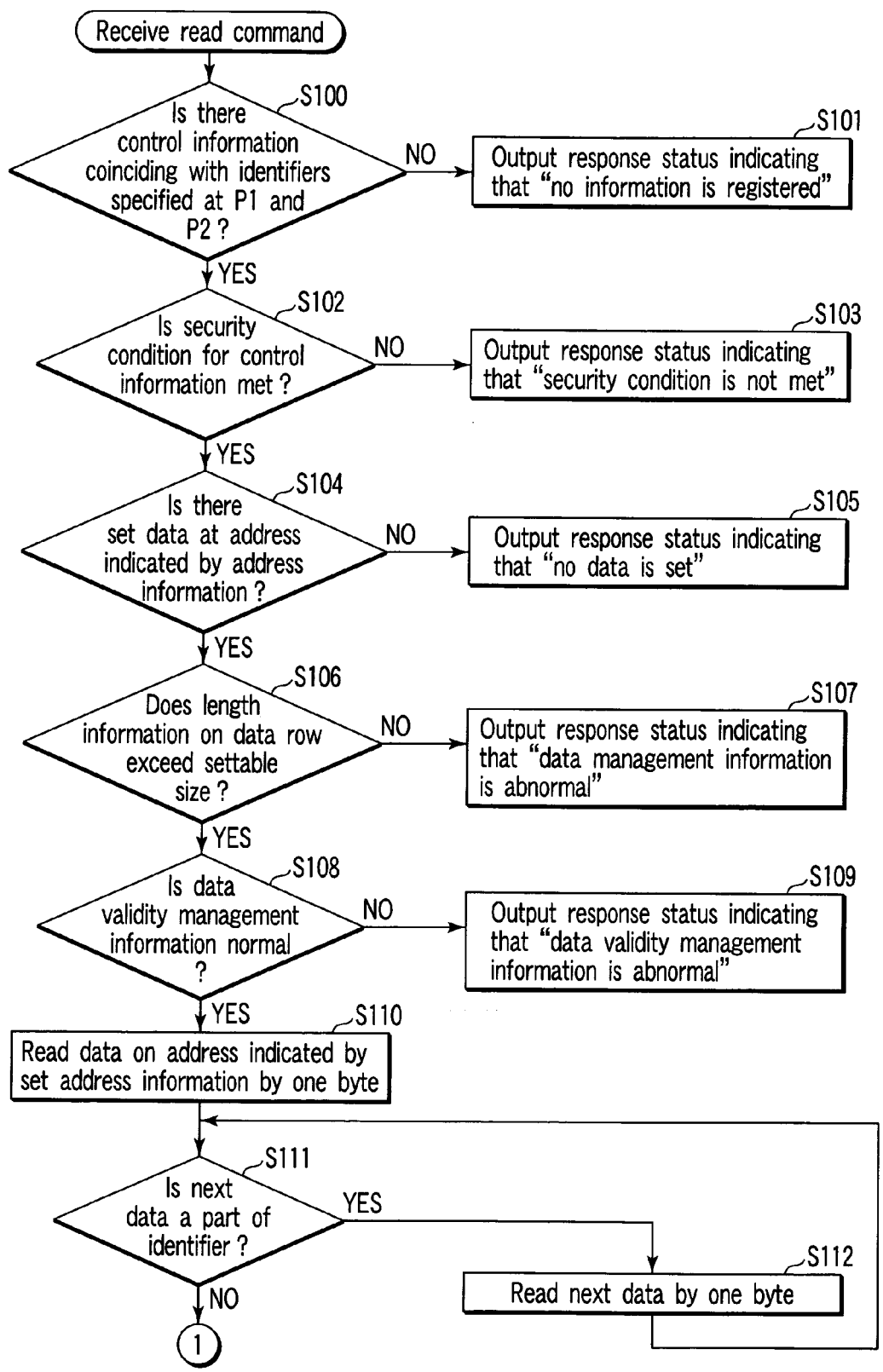
FIG. 8 is a flow chart illustrating a flow of the processing for reading out data having a nest structure.
Figure 9:
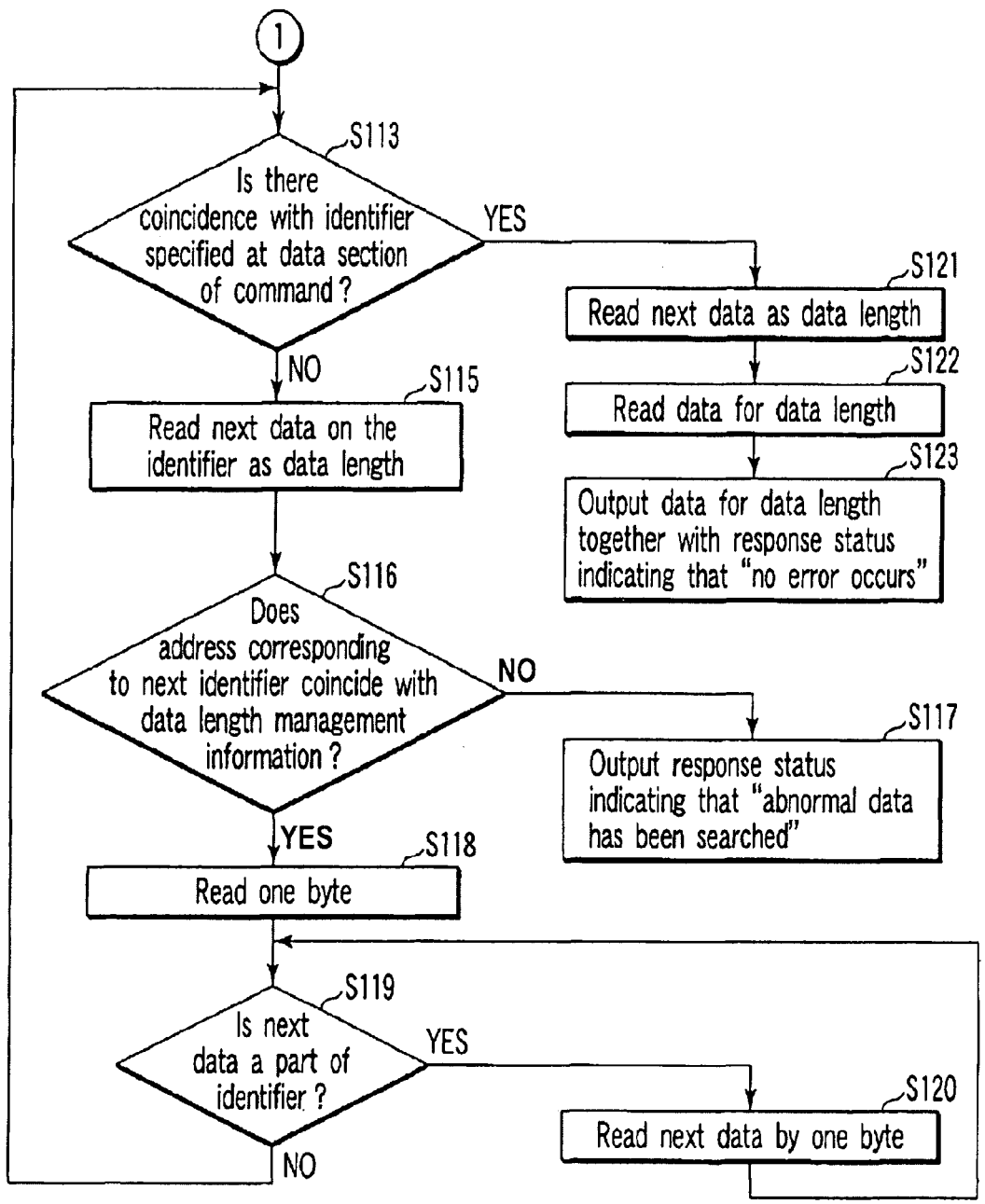
FIG. 9 is a flow chart illustrating a flow of the processing for reading out data having a nest structure.

FIGS. 8 and 9 are flow charts illustrating the processing for reading out second hierarchy data stored in the data memory 15, the second hierarchy data having a nest structure.

First, it is assumed that the reader/writer serving as an external device has supplied the read command 300 to the IC card 1. Then, in the IC card 1, the communication section 12 receives the read command 300. The received read command 300 is supplied from the communication section 12 to the CPU 14. Then, the CPU 14 determines that the command is the read command 300 by the CLA and INS of the command header section 301 of the received command.

When it is determined that the received command is the read command 300, the CPU 14 makes a search for the first hierarchy data on an identifier which coincides with parameters set at the PI section 304 and P2 section 305 of the command 300. This processing operation makes a search for control information which coincides with identifiers specified by the P1 section 304 and P2 section 305 from the data management information shown in FIG. 5 (step S100).

In the case where control information on the identifiers which coincide with the parameters of the P1 section 304 and P2 section 305 of the command 300 cannot be specified (step S100, NO), the CPU 14 outputs a response status indicating that the control information is not registered, to the reader/writer 2 (step S101), and terminates processing.

In the case where control information on the identifiers which coincide with the parameters of the P1 section 304 and P2 section 305 of the command 300 can be specified (step S100, YES), the CPU 14 checks whether or not a security condition set by the security condition information 213 contained in the control information (step S102) is met. When the above security condition is not met (step S102, NO), the CPU 14 outputs a response status indicating that the security condition is not set, to the reader/writer 2 (step S103), and terminates processing.

In the case where the security condition is met (step S102, YES), the CPU 14 checks whether or not the first hierarchy data is set to an address indicated by the set address information 211 contained in the control information (step S104).

In the case where the first hierarchy data is not set to an address indicated by the set address information 211 contained in the control information (step S104, NO), the CPU 14 outputs a response status indicating that data is not set, to the reader/writer 2 (step S105), and terminates processing.

In the case where it is checked that the first hierarchy data is set to an address indicated by the set address information 211 contained in the control information (step S104, YES), the CPU 14 checks whether or not a data length indicated by the data length management information 220 on the first hierarchy data is within an allowable range indicated by the settable size information 212 contained in the control information (step S106).

In the case where the data length of the first hierarchy data exceeds the allowable range (step S106, NO), the CPU 14 outputs a response status indicating that the data management information is abnormal (indicating that the data length exceeds the allowable range) to the reader/writer 2 (step S107), and terminates processing.

In the case where it is checked that the data length of the first hierarchy data is within the allowable range (step S106, YES), the CPU 14 checks the validity of the data by referring to the data validity management information 222 on the first hierarchy data (step S108).

In the case where the validity of the first hierarchy data has not been successfully checked, namely, in the case where abnormality of the first hierarchy data has been determined (step S108, NO), the CPU 14 outputs a response status indicating that the data validity management information on the first hierarchy data is abnormal (indicating that data validity cannot be checked), to the reader/writer 2 (step S109), and terminates processing.

In the case where the validity of the first hierarchy data has been successfully checked (step S108, YES), the CPU 14 reads data on an address indicated by the set address information 211 contained in the control information by one byte (step S110). When one byte of data is read in the above step S110, the CPU 14 checks whether or not next data (next one byte) is provided as a part of an identifier (step S111). When it is checked that the next data is provided as a part of the identifier (step S111, YES), the CPU 14 reads next data by one byte (step S112).

In the case where it is checked that the next data is not provided as a part of the identifier (step S111, NO), the CPU 14 determines that data read in the above steps S110 and S112 is provided as data indicating an identifier. That is, the CPU 14 reads an identifier of the first data in the second hierarchy which exists in the first hierarchy data in accordance with the above steps S110 to S112.

Therefore, in the case where it is checked that the next data is not provided as a part of the identifier (step S111, NO), the CPU 14 determines whether or not the identifier read in the above steps S110 and S112 coincides with an identifier of the second hierarchy data specified at the data section 307 of the command 300 (step S113).

In the case where it is determined that the identifier read by this determination coincides with the identifier specified at the data section 307 of the received command 300 (step S113, YES), the CPU 14 reads the next data on the identifier as data indicating a data length of the identifier data (step S121). In the case where it is predetermined that a data length is one byte, the CPU 14 reads data on the next one byte of the identifier as a data length.

When the data length of the identifier is thus read, the CPU 14 reads the next data on the data length as a data value (value) of the second hierarchy data by a data length (step S122). When the data value (value) of the second hierarchy data on the identifier is read, the CPU 14 outputs the read data value (value) and information indicating that readout processing has normally terminated (information indicating that no abnormality occurs) to the reader/writer 2 as a response status for the command 300 (step S123), and terminates processing.

In addition, in the case where it is determined that the identifier read by the determination of the step S113 does not coincide with the identifier specified at the data section 307 of the received command 300 (step S113, NO), the CPU 14 reads out the next data on the identifier as a data length of the identifier data (step S115).

When the data length of the identifier data is read, the CPU 14 determines a start address of the next data on the second hierarchy (identifier of the next data on the second hierarchy) based on the read data length. When a start address of an identifier of the next data on the second hierarchy is determined, the CPU 14 checks whether or not an address corresponding to the identifier of the next data on the second hierarchy coincides with a data length of the data length management information 220 (step S116).

In the determination of the step S116, for example, the coincidence is checked based on whether or not the start address of the next data on the second hierarchy exceeds an allowable range of an address based on the data length specified by the data length management information 220.

Figure 10:
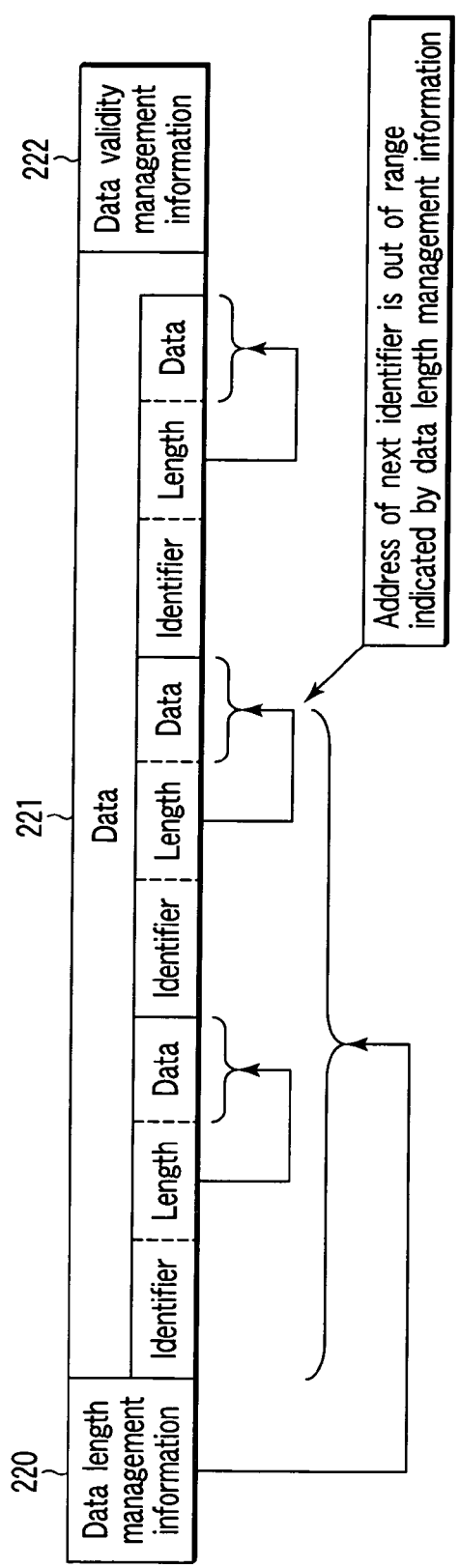
FIG. 10 is a view illustrating the processing for checking coincidence between a data address and data length management information.

Namely, in the determination of the step S116, it is determined whether or not the next data on the second hierarchy is normal (whether or not the next data on the second hierarchy exists). For example, FIG. 10 is a view showing a case in which the start address of the next data on the second hierarchy exceeds an allowable range of an address based on the data length of the data length management information 220. In such a case, the CPU 14 determines that the next data on the second hierarchy is abnormal (does not exist).

In the case where the address of the identifier of the next data on the second hierarchy does not coincide with the data length management information 220 based on the above determination, namely, in the case where the next data is abnormal (does not exist) (step S116, NO), the CPU 14 outputs a response status indicating that data has been abnormally searched, to the reader/writer 2 (step S117), and terminates processing.

In the case where it is checked that the address of the identifier of the next data on the second hierarchy coincides with the data length management information 220 (step S116, yes), the CPU 14 reads data on an address corresponding to the identifier of the next data on the second hierarchy by one byte (step S118). When one byte of data is read in the above step S118, the CPU 14 checks whether or not the next data (next one byte) is provided as a part of an identifier (step S119). In the case where it is thus checked that the next data is provided as a part of the identifier (step 5119, YES), the CPU 14 reads the next data by one byte (step S120).

In addition, in the case where it is checked that the next data is not provided as a part of the identifier (step S119, NO), the CPU 14 determines that the data read in the above steps S118 and S120 is provided as an identifier of the next data on the second hierarchy. That is, the CPU 14 reads the identifier of the next data on the second hierarchy in accordance with the processings of the above steps S118 to S120. Therefore, in the case where it is checked that the next data is not provided as a part of the identifier, namely, in the case where the identifier of the next data on the second hierarchy is read (step S119, NO), the CPU 14 returns to the above step S113. In this manner, the CPU 14 determines whether or not the identifier of the next data on the second hierarchy read in the above steps S118 and S120 coincides with the identifier specified by the data section 307 of the command 300 (step S113).

The processings in the steps S133 to S120 are repeatedly executed until the identifier of the read second hierarchy data has coincided with the identifier specified by the data section 307 of the command 300. In this manner, the second hierarchy data on the identifier specified by the data section 307 of the command 300 is read out, and the read-out second hierarchy data is outputted to the reader/writer 2 as response data.

The identifier of the second hierarchy data may be configured in one byte or in two bytes or may be configured in three types or more. For example, the identifier of the second hierarchy data is configured in one byte, the above steps S119 and S120 are omitted. In addition, in the case where the identifier of the second hierarchy data is configured in two bytes, the above step S120 is executed for each identifier only once.

Also, information (data length) indicating a data length may be configured in one byte or may be configured in two bytes or more. For example, in the case where the data length information is configured in one byte, data for next one byte of an identifier is read out as length information in the above step S115.

As described above, in the case where there has been successfully received a read command having specified the first hierarchy data and the second hierarchy data to be read out, the IC card reads out only the specified second hierarchy data which exists in the specified first hierarchy data.

In this manner, the specified second hierarchy data can be easily read out from the specified first hierarchy data without reading out the whole first hierarchy data. As a result, it becomes possible to efficiently read out specific second hierarchy data contained in the first hierarchy data having a nest structure.

Next, a change processing (rewrite processing) operation of data (second hierarchy data) having a nest structure will be described.

First, an instruction (data change command) for requesting a change (rewriting) of second hierarchy data will be described.

Figure 11:
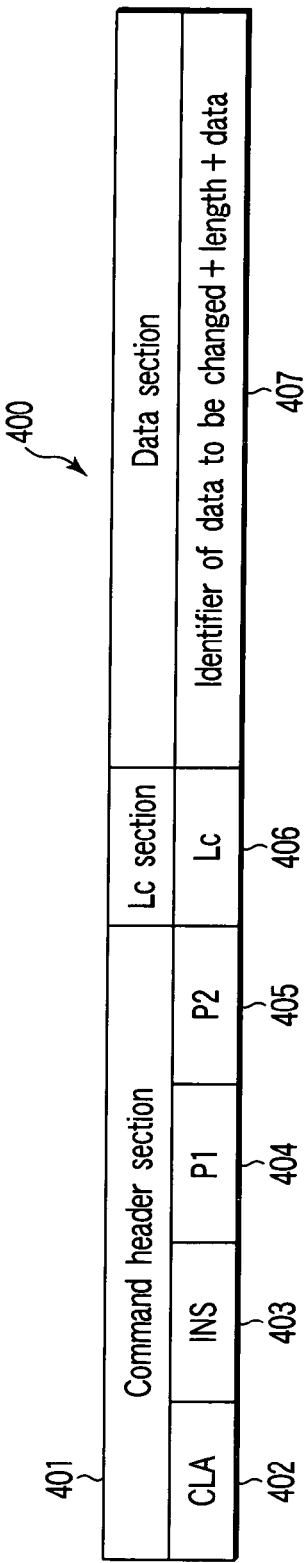
FIG. 11 is a view showing a configuration of a data change command for requesting a change of data having a nest structure.

FIG. 11 shows an example of a configuration of a data change command 400 for instructing a change (rewriting) of data having a nest structure stored in the data memory 15. This data change command 400 is supplied from the reader/writer 2 to the IC card 1.

The data change command 400, as shown in FIG. 11, is composed of: a command header section 401, an Lc section 406, and a data section 407. The command header section 401 stores data indicating the classification, instructions, parameters and the like of the command. The Lc section 406 stores information indicating a data length of data contained in the data section 407 of the command. The data section 407 stores an identifier of data to be changed, a data length, and data.

In addition, the command header section 401 is composed of a CLA (class) section 402, an INS (instruction) section 403, a first parameter (P1) section 404, and a second parameter (P2) section 405.

The CLA section 402 stores data indicating the classification (class) of the command. The INS section 403 stores data indicating an instruction of the command. For example, in the case of the data change command 400, data indicating a data change instruction is set at the INS section 403.

The first parameter (P1) section 404 and the second parameter (P2) section 405 each indicate which data identifier includes an identifier of the data set at the data section 407. For example, in the case of the data change command 400 for requesting a change of the point upper limit value 108 contained in data on point X shown in FIG. 4A, data indicating a data change command is set at the CLA section 402 and the INS section 403. Then, "E1" and "00" are set, respectively, as identifiers of the first hierarchy data at the P1 section 404 and P2 section 405, and "DF02" is set as an identifier of the second hierarchy data at the data section 407.

In the case where the data change command 400 as shown in FIG. 11 has been received, the CPU 14 of the IC card 1 first discriminates that the command is a data change command based on the data set at the CLA section 402 and the INS section 403 of the command 400. When it is discriminated that the command is a data change command, the CPU 14 discriminates first hierarchy data which includes second hierarchy data to be changed based on the parameters (data) set at the P1 section 404 and P2 section 405.

If the first hierarchy data including the second hierarchy data to be changed by the P1 section 404 and P2 section 405 is discriminated, the CPU 14 discriminates the second hierarchy data to be changed, the second hierarchy data existing in the first hierarchy data specified by the parameters of the P1 section 404 and P2 section 405 based on the identifier of the second hierarchy data set at the data section 407 of the command. When the second hierarchy data to be changed is discriminated, the CPU 14 rewrites a value of the second hierarchy data to be changed into data on a data length set at the data section 407.

Now, a change processing (rewrite processing) operation for second hierarchy data in the IC card 1 will be described.

Figure 12:
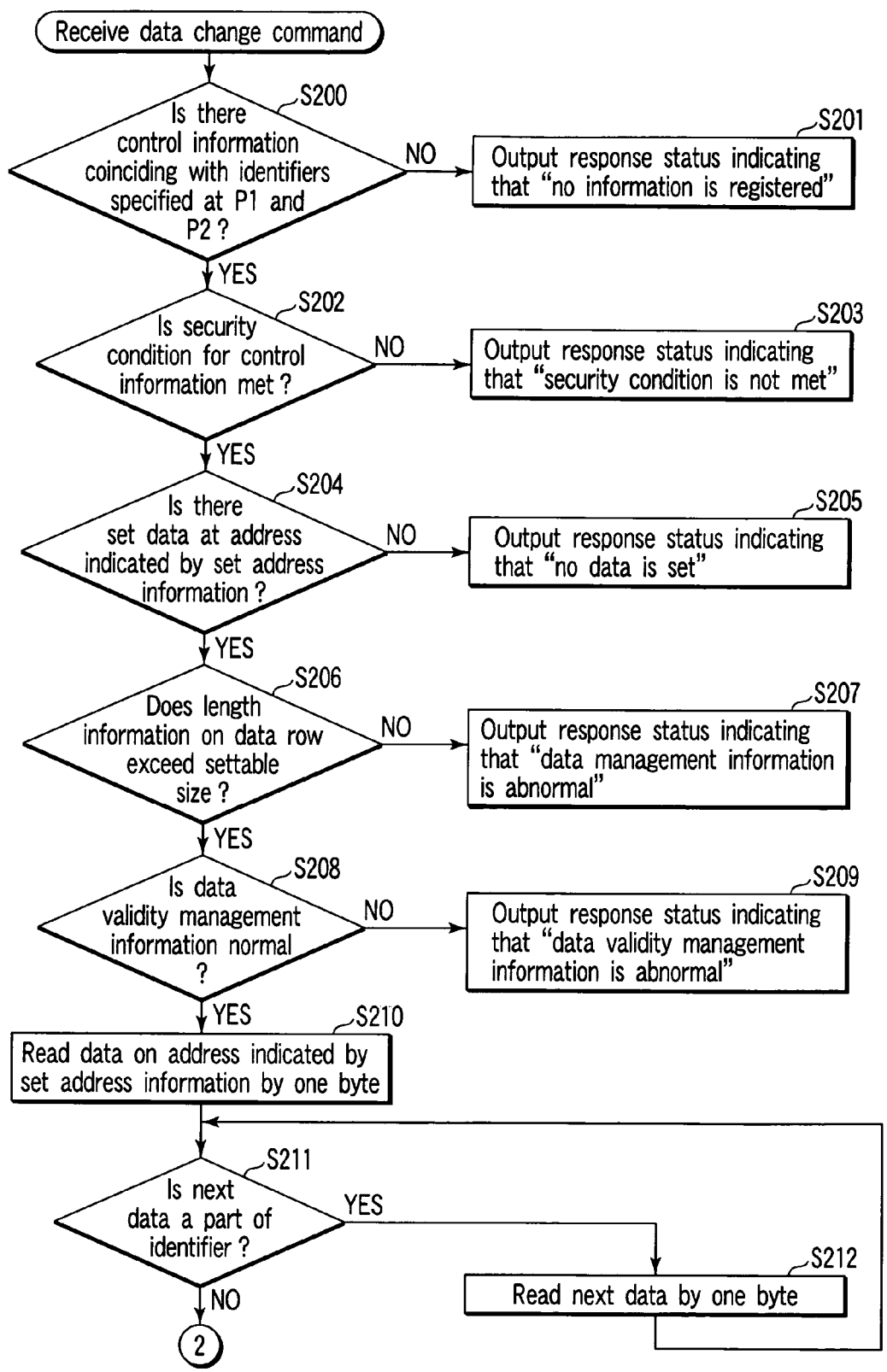
FIG. 12 is a flow chart illustrating a flow of the processing for changing data having a nest structure.
Figure 13:
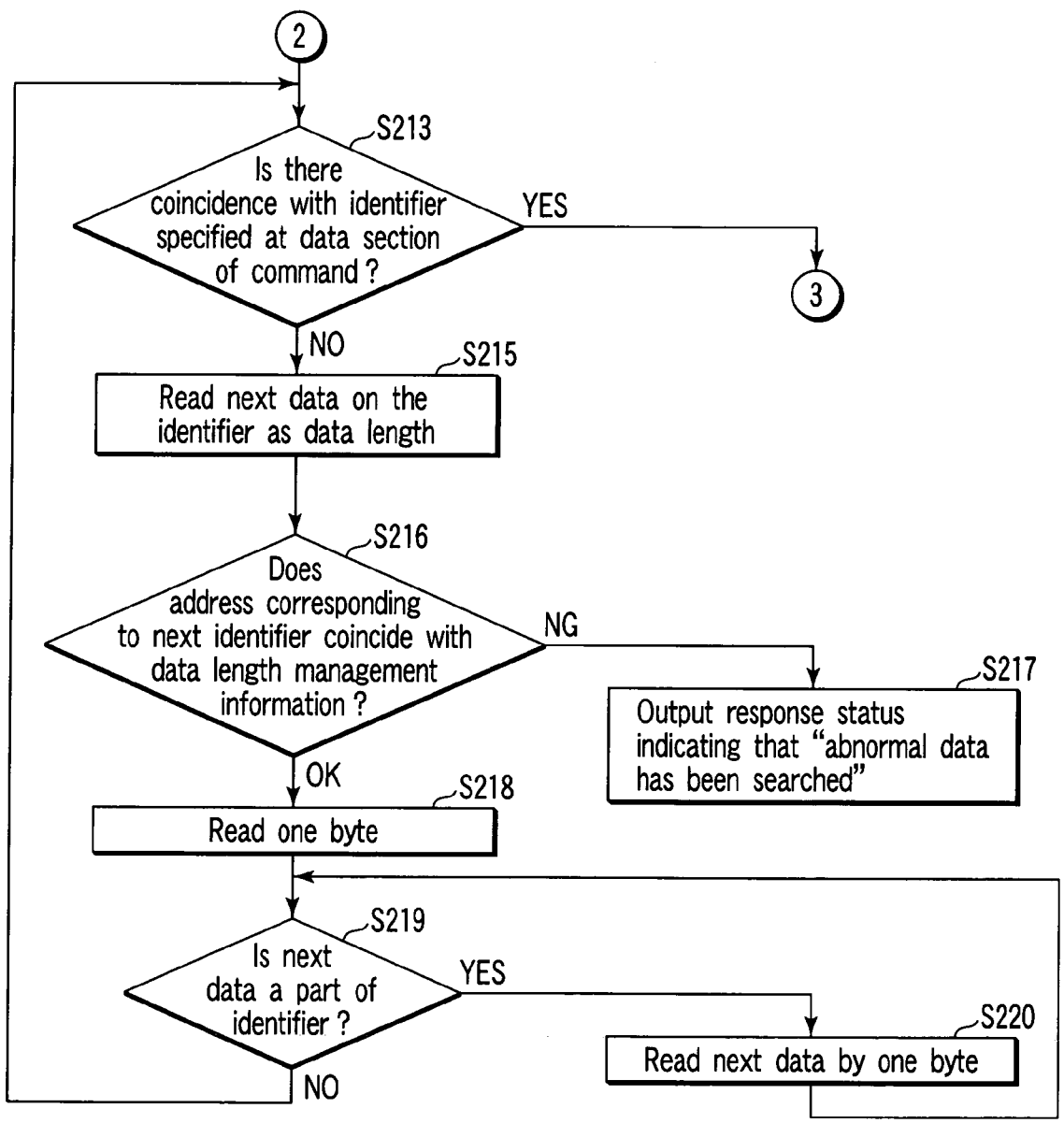
FIG. 13 is a flow chart illustrating a flow of the processing for changing data having a nest structure.
Figure 14:
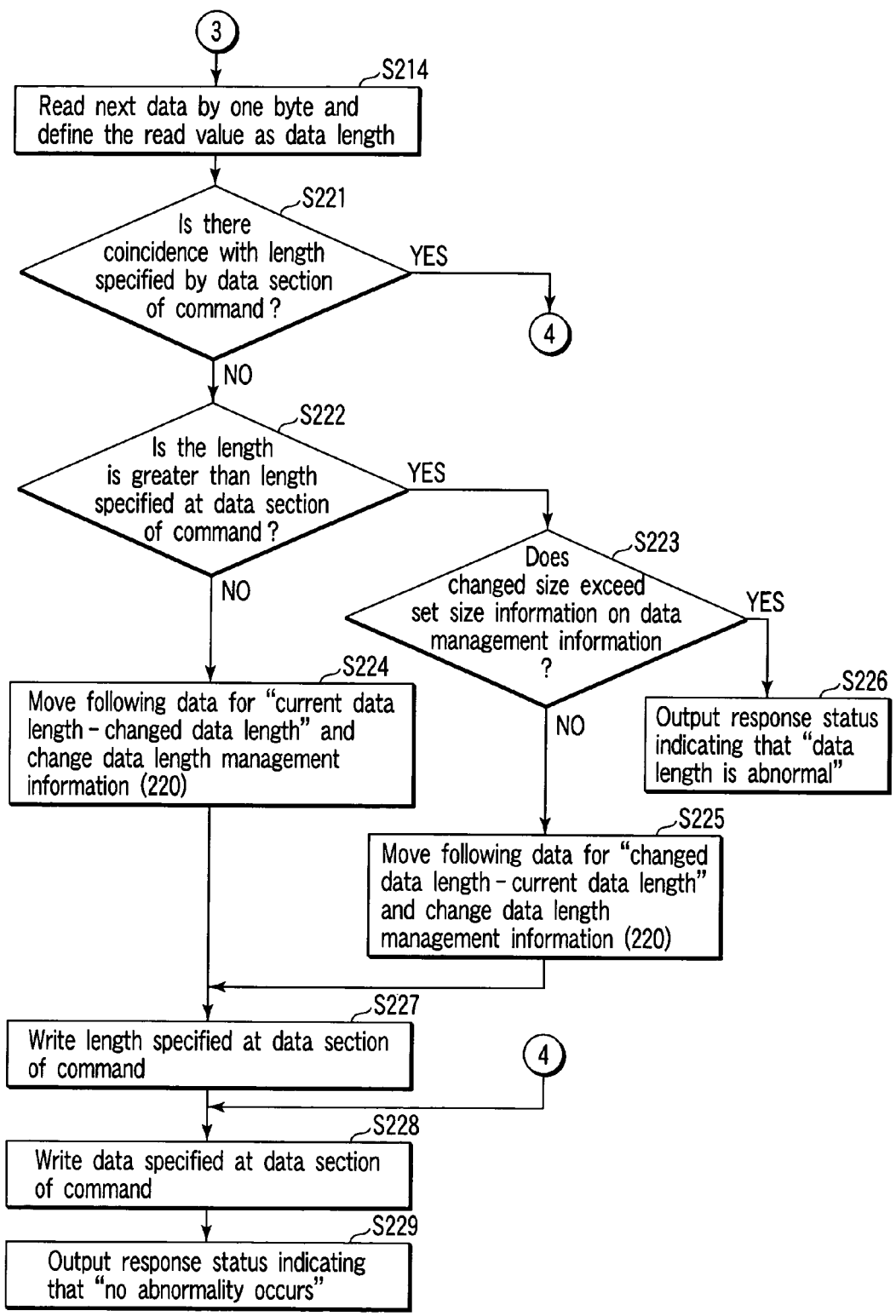
FIG. 14 is a flow chart illustrating a flow of the processing for changing data having a nest structure.

FIGS. 12, 13 and 14 are flow charts each illustrating a change processing (rewrite processing) operation for changing second hierarchy data stored in the data memory 15 incorporated in the IC card 1.

First, it is assumed that the reader/writer 2 serving as an external device has supplied a data change command 400 to the IC card 1. In the IC card 1, the communication section 12 receives the data change command 400. The received data change command 400 is supplied from the communication section 12 to the CPU 14. Then, the CPU 14 determines that the command is the data change command 400 by the CLA section 402 and INS section 403 of the command header section 301 of the received command.

When it is determined that the received command is the data change command, the CPU 14 makes a search for the first hierarchy data which coincides with the parameters set at the P1 section 404 and P2 section 405 of the command 400. Namely, this processing makes a search for control information on the first hierarchy data which coincides with the identifiers specified by the P1 section 404 and P2 section 405 from the data management information shown in FIG. 5 (step S200).

In the case where the control information coinciding with the parameters of the P1 section 404 and P2 section 405 of the command has not been successfully specified (step S200, NO), the CPU 14 outputs a response status indicating that the control information is not registered, to the reader/writer 2 (step S201), and terminates processing.

In the case where the control information coinciding with the parameters of the P1 section 404 and P2 section 405 of the command has been successfully specified (step S200, YES), the CPU 14 checks whether or not the security condition set by the security condition information 213 contained in the control information is met (step S202). In the case where the above security condition is not met (step S202, NO), the CPU 14 outputs a response status indicating that the security condition is not met, to the reader/writer 2 (step S203), and terminates processing.

In the case where it is checked that the security condition is met (step S202, YES), the CPU 14 checks whether or not the first hierarchy data is set at an address indicated by the set address information 211 contained in the control information (step S204).

In the case where the first hierarchy data is not set at the address indicated by the set address information 211 contained in the control information (step S204, NO), the CPU 14 outputs a response status indicating that the data is not set, to the reader/writer 2 (step S205), and terminates processing.

In the case where it is checked that the first hierarchy data is set at the address indicated by the set address information 211 contained in the control information (step 204, YES), the CPU 14 checks whether or not the data length indicated by the data length management information 220 on the first hierarchy data is within an allowable range indicated by the settable size information contained in the control information (step S206).

In the case where the data length of the first hierarchy data exceeds the allowable range (step S206, NO), the CPU 14 outputs a response status indicating that the data management information is abnormal (indicating that the data length of the first hierarchy data exceeds the allowable range), to the reader/writer 2 (step S207), and terminates processing.

In the case where a data length of the first hierarchy data is within the allowable range (step S206, YES), the CPU 14 checks the validity of the first hierarchy data in accordance with the data validity management information 222 contained in the first hierarchy data (step S208).

In the case where the validity of the first hierarchy data has not been successfully checked, namely, in the case where it is determined that the first hierarchy data is abnormal (step S208, NO), the CPU 14 outputs a response status indicating that the data validity management information contained in the first hierarchy data is abnormal (indicating that the validity has not been successfully checked), to the reader/writer 2 (step S209), and terminates processing.

In the case where the validity of the first hierarchy data has been successfully checked (step S208, YES), the CPU 14 reads the data on an address indicated by the set address information 211 contained in the control information by one byte (step S210). When one byte of data is read in the above step S210, the CPU 14 checks whether or not the next data (next one byte) is provided as a part of an identifier (step S211). In the case where it is thus checked that the next data is provided as a part of the identifier (step S211, YES), the CPU 14 reads the next one byte of data (step S212).

In the case where it is checked that the next data is not provided as a part of the identifier (step S211, NO), the CPU 14 determines that the data read in the above steps S210 and S212 is data indicating the identifier. That is, the CPU 14 reads the identifier of the first data in the second hierarchy which exists in the first hierarchy data in accordance with the processings in the steps S210 to S212.

Therefore, in the case where it is checked that the next data is not provided as a part of the identifier, namely, in the case where the identifier of the second hierarchy data is read (step S211, NO), the CPU 14 determines whether or not the identifier of the second hierarchy data read in the steps S210 and S212 coincides with the identifier specified by the data section 407 of the command (step S213).

In the case where it is determined that the identifier of the second hierarchy data read by this determination does not coincide with the identifier specified by the data section 407 of the received command (step S213, NO), the CPU 14 reads the next data on the identifier as a data length of the identifier data (step S215).

When the data length of the identifier data is thus read, the CPU 14 determines a start address of the next data on the second hierarchy (the identifier of the next data on the second hierarchy) from the read data length. When the start address of the next data identifier is determined, the CPU 14 checks whether or not the address corresponding to the next identifier coincides with the data length management information 220 (step S216).

In this determination, for example, the coincidence is checked in accordance with whether or not the start address of the identifier of the next data on the second hierarchy exceeds the allowable range of the address based on the data length of the data length management information 220. Namely, in the above determination of the step S216, it is determined whether or not the next data on the second hierarchy is normal (whether or not the next data on the second hierarchy exists).

In the case where it is determined that the address of the identifier of the next data on the second hierarchy does not coincide with the data length management information 220 by the above determination, namely, in the case where it is determined that the next data is abnormal (does not exist) (step S216, NG), the CPU 14 outputs a response status indicating that abnormal data has been searched, to the reader/writer 2 (step S217), and terminates processing.

In addition, in the case where it is checked that the address of the identifier of the next data on the second hierarchy coincides with the data length management information 220 (step S216, YES), the CPU 14 reads the data on an address which corresponds to the identifier of the next data on the second hierarchy by one byte (step S218). When one byte of data is read in the step S218, the CPU 14 checks whether or not the next data (next one byte) is provided as a part of the identifier (step S219). In the case where it is thus checked that the next data is provided as a part of the identifier (step S219, YES), the CPU 14 reads the next one byte of data (step S220).

In addition, in the case where it is checked that the next data is not provided as a part of the identifier (step S219, NO), the CPU 14 determines that the data read in the steps S218 and S220 is provided as data indicating an identifier. That is, the CPU 14 reads the identifier of the next data on the second hierarchy which exists in the first hierarchy data in accordance with the processings in the steps S218 to S220.

Therefore, in the case where it is checked that the next data is not provided as a part of the identifier, namely, in the case where the identifier of the next data on the second hierarchy is read (step S219, NO), the CPU 14 returns to the step S213, and determines whether or not the identifier of the next data on the second hierarchy read in the steps S218 and S120 coincides with the identifier specified by the data section 407 of the command (step S213).

In the case where it is determined that the identifier read by the determination of the step S213 coincides with the identifier specified by the data section 407 of the received command (step S213, YES), the CPU 14 reads the next data on the identifier as a data length of the identifier data (step S214). In the case where it is predetermined that the data length is one byte, the CPU 14 reads the next one-byte data on the identifier as a data length.

When the data length of the identifier is read, the CPU 14 determines whether or not the data length read in the step S214 coincides with the length of the second hierarchy data to be changed, the length being specified by the data portion 407 of the command (step S221). In this determination, it is determined whether or not the second hierarchy data which currently exists in the first hierarchy data has the same length as the second hierarchy data (new data) to be written, the data being specified by the command 400.

In the case where it is determined that both of them coincide with each other by the above determination (step S221, YES), the CPU 14 carries out processing for writing new data specified by the data section 407 of the command 400 from the next address of the data length read in the step S214 (step S228).

When writing of this new data is normally terminated, the CPU 14 outputs information indicating that the task is normally terminated (indicating that no abnormality occurs) to the reader/writer 2 as a response status for the command 400 (step S229).

In the case where the size of a data region to be written (a data length of data on an identifier specified by a command) is equal to the size of data to be written (a length of data to be written, the data being specified by a command), the CPU 14 changes data by overwriting the second hierarchy data. In this case, the data length of the second hierarchy data does not change. Thus, there is no need for changing the data length management information 220 serving as the data length of the first hierarchy data and a data length of the second hierarchy data. In this manner, the second hierarchy data can be normally rewritten.

In addition, in the case where both of them do not coincide with each other by the above determination (step S221, NO), the CPU 14 determines whether the data length read in the step S214 is longer or shorter than the data length of data (new data) to be written, the data being specified by the command 400 (step S222).

In the case where it is determined that the data length read in the step S214 is shorter than the data length of the data to be written, the data specified by the command 400, by the above determination (step S222, NO), the CPU 14 moves all the second hierarchy data that follows the second hierarchy data in the first hierarchy data in an amount obtained by subtracting the data length (changed data length) of the data to be written from the data length (current data length) read in the step S214 (in an amount corresponding to "current data length–changed data length"). Further, the CPU 14 changes a data length of the data length management information 220 (a data length of a whole data value of the first hierarchy data) to a data length (whole length) after changed (step S224).

In addition, in the case where it is determined that the data length read in the step S214 is longer than the data length of the data to be written, the data being specified by the command 400, by the above determination (step S222, YES), the CPU 14 determines whether or not the data length (whole length after changed) of the first hierarchy data in the case where the data specified by the command 400 is written exceeds the settable size specified in accordance with the settable size information contained in the control information on the first hierarchy data (step S223).

In the case where it is determined that the whole length after changed exceeds the settable size by the above determination (step S223, YES), the CPU 14 outputs a response status indicating that the data length of the first hierarchy data is abnormal to the reader/writer 2 without changing data by the command 400 (step S226).

In the case where it is determined that the whole length after changed does not exceed the settable size (step S223, NO), the CPU 14 moves (shifts) all the second hierarchy data that follows the second hierarchy data in the first hierarchy data in amount corresponding to "changed data length–current data length". Further, the CPU 14 rewrites the data length of the data length management information 220 into the whole length after changed (step S225).

When movement (shifting) of second hierarchy data that follows the second hierarchy data and change of the data length management information 220 have been completed in accordance with the step S224 or S225, the CPU 14 writes the data length of the data to be written, the data being specified by the data section 407 of the command 400, as the data length of the second hierarchy data on the corresponding identifier (step S227).

When the data length of the second hierarchy data is rewritten, the CPU 14 writes new data specified by the data section 407 of the command 400 as second hierarchy data on the corresponding identifier (step S228). When this writing has been normally completed, the CPU 14 outputs a response status indicating that data change processing has been normally terminated (indicating that no abnormality occurs) to the reader/writer 2 (step S229), and terminates processing.

The data change processing operation as described above will be described by way of a specific example.

FIG. 15A shows an example of first hierarchy data including a plurality of second hierarchy data and an example of data (new data) to be written as the second hierarchy data contained in the first hierarchy data value (value).

For example, as shown in FIG. 15A, it is assumed that the second hierarchy data on identifier B is changed to new data on a data length which is longer than a current data length. In this case, as shown in FIG. 15A, new data overflows from a region in which the second hierarchy data on the current identifier B is stored. Thus, the second hierarchy data on identifier C serving as data that follows the second hierarchy data on the identifier B is moved in an amount corresponding to "changed data length−current data length", as shown in FIG. 15B.

In this manner, the region for storing the second hierarchy data on the identifier B is changed to a size corresponding to a data length of new data, as shown in FIG. 15C. At this time, the data length management information 220 is rewritten into a data length after the whole data length has been changed.

In this state, the data length of the second hierarchy data on the identifier B is rewritten into the data length of new data, and the new data is written into a value of the second hierarchy data on the identifier B when the next address of the data length of the identifier B becomes a start address (namely, the data value of the identifier B is rewritten into new data). Then, as shown in FIG. 15D, with respect to the second hierarchy data on the identifier B, the data length is obtained as a data length of new data, and a value is obtained as new data.

As described above, in the case where there has been successfully received a data change command having specified first hierarchy data and second hierarchy data to be changed (to be rewritten), the IC card rewrites only the specified second hierarchy data which exists in the specified first hierarchy data.

In this manner, solely the specified second hierarchy data can be easily rewritten from the first hierarchy data, without rewriting the whole first hierarchy data. As a result, it becomes possible to efficiently rewrite specific second hierarchy data contained in the first hierarchy data having a nest structure.

Now, a description will be given with respect to a readout processing operation in the case where a plurality of second hierarchy data on the same identifier exist in the first hierarchy data.

Figure 16A:
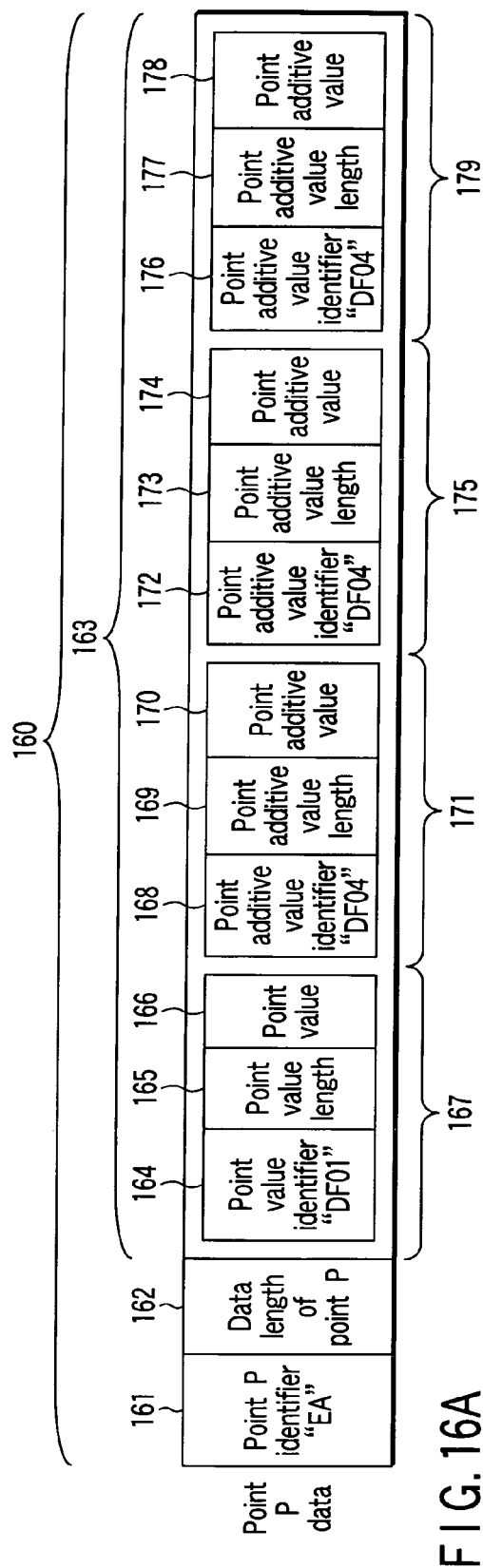
FIG. 16A is a view showing an example of a configuration of data having a nest structure in which a plurality of second hierarchy data having the same identifier are included in first hierarchy data.
Figure 16B:
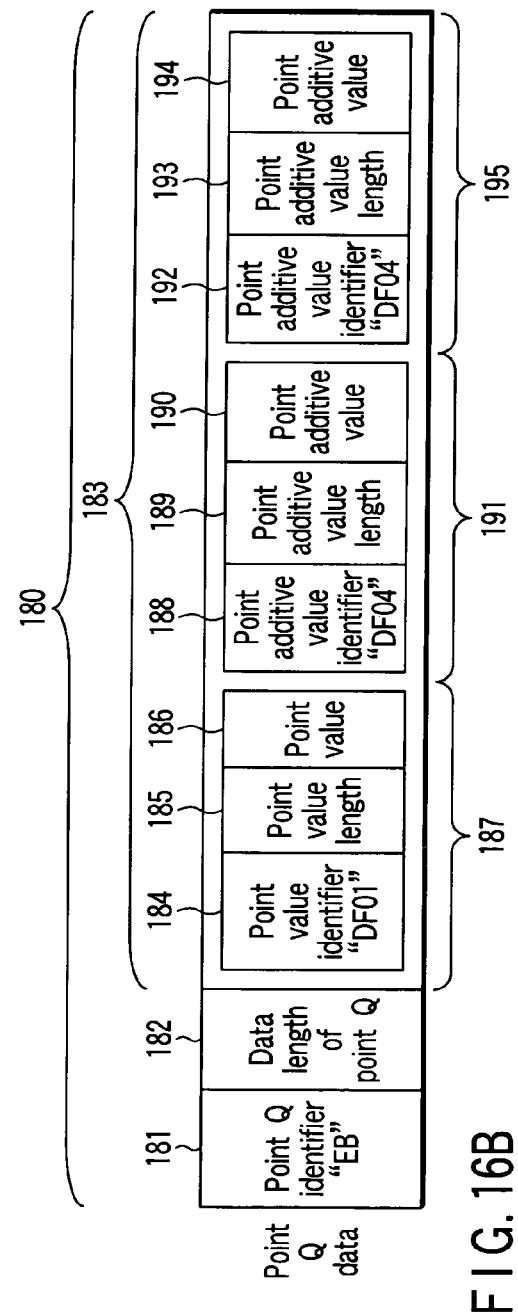
FIG. 16B is a view showing an example of the configuration of data having a nest structure in which a plurality of second hierarchy data having the same identifier are included in first hierarchy data.

FIGS. 16A and 16B each show an example of a data configuration in the case where a plurality of second hierarchy data on the same identifier exist in the first hierarchy data value (value).

FIG. 16A shows data 160 on point P as an example of the first hierarchy data.

As shown in FIG. 16A, data 160 on point P is composed of an identifier (EA) 161 of the data 160 on point P, a data length 162 of the data 160 on point P, and a data value (value) 163 of the data 160 on point P. A plurality of second hierarchy data 167, 171, 175, and 179 exist in the value 163 of the point P. The second hierarchy data 167 is provided as data indicating a point value of point P. The data 167 of this point value is composed of an identifier (DF01) 164, a data length 165, and a data value (value) 166.

The second hierarchy data 171, 175, and 179 are provided as data indicating an additive value of point P. The above second hierarchy data 171, 185, and 179 are composed of identifiers (DF04) 168, 172, and 176; data lengths 169, 173, and 177; and values 170, 174, and 178. In addition, the second hierarchy data 171, 175, and 179 have the same identifier (DF04).

FIG. 16B shows an example of data 180 on point Q as the first hierarchy data. As shown in FIG. 16B, the data 180 on point Q is composed of an identifier (EB) 181 of the data 180 on point Q, a data length 182 of the data 180 on point Q, and a data value (value) 183 of the data 180 on point Q. Further, a plurality of second hierarchy data 187, 191, and 185 exist in the value 183 of the data 180 on the point Q. The second hierarchy data 187 is provided as data indicating a point value of point Q. This point value data 187 is composed of an identifier (DF01) 184, a data length 185, and a data value (value) 186.

The second hierarchy data 191 and 195 are provided as data indicating additive values of point Q, respectively. The second hierarchy data 191 and 195 each are composed of: an identifier (DF04) 188 and 192, data lengths 189 and 193, and real data 190 and 194. In addition, the second hierarchy data 191 and 195 have the same identifier (DF04).

FIG. 17 shows an example of a configuration of instruction data (sequence specifying read command) 500 for specifying a sequence and instructing readout of the second hierarchy data. This sequence specifying read command 500 is provided as a command to be supplied from the reader/writer 2 to the IC card 1.

The sequence specifying read command 500 is composed of a command header section 501, an Lc section 506, a data section 507, and a Le section 508, as shown in FIG. 11. The command header section 501 stores data indicating the classification, instructions, and parameters of the command. The Lc section stores information indicating a data length of data set at the data section 507 of the command. The data section 507 stores an identifier of data to be read and a readout sequence of data on that identifier.

The command header section 501 is composed of a CLA (class) section 502, an INS (instruction) section 503, a first parameter (P1) section 504, and a second parameter (P2) section 505. The CLA section 502 stores data indicating classification (class) of the command. The INS section 503 stores data indicating an instruction of the command. In the sequence specifying read command 500, data indicating an instruction for reading out the second hierarchy data on an identifier corresponding to the specified sequence is set at the INS section 503.

The first parameter (P1) section 504 and the second parameter (P2) section 505 indicate which identifier of the first hierarchy data includes an identifier of the second hierarchy data to be read out, the data being set at the data section 507. For example, in a command for requesting readout of a second point additive value (second data in second hierarchy of the corresponding identifier) 174 contained in the data (first hierarchy data) 160 on point P shown in FIG. 16A, data indicating a data change command is set at the CLA section 502 and the INS section 503; "00" and "E1" are set, respectively, as the first hierarchy data identifiers in the P1 section 404 and P2 section 405. "DF0402" set at the data section 407 indicates that "02"-th data is specified from among the second hierarchy data on the identifier "DF04".

It the case where there has been successfully received the sequence specifying read command 500 as shown in FIG. 17, the CPU 14 of the IC card 1 first determines that the command is a sequence specifying read command based on the data set at the CLA section 502 and the INS section 503 of the command 500. When it is discriminated that the command is the sequence specifying read command 500, the CPU 14 discriminates the first hierarchy data including the second hierarchy data to be read out based on the parameter (data) set at the P1 section 504 and P2 section 505.

After discriminating the first hierarchy data including the second hierarchy data to be read out by the P1 section 504 and P2 section 505, the CPU 14 discriminates the second hierarchy data to be read out, the second hierarchy data existing in the first hierarchy data specified by the parameters of the P1 section 504 and P2 section 505, based on the identifier and sequence of the second hierarchy data set at the data section 507 of the command 500. After discriminating the second hierarchy data to be read out, the CPU 14 reads out a data value (value) of the second hierarchy data, and transmits the read-out value as a response to the reader/writer 2.

FIG. 18 shows an example of a configuration of response data 600 for the above sequence specifying read command 500. This response data 600 is provided as data to be outputted from the IC card 1 to the reader/writer 2 as a result of execution of the sequence specifying read command 500.

The response data 600 is composed of an identifier 601, a data length 602, a data section 603, a first status code section 604, and a second status code section 605.

An identifier of the second hierarchy data specified at the data section 507 of the sequence specifying read command 500 (identifier of the read-out second hierarchy data) is set as the above identifier 601. A data length of data set at the data section 603 is set at the data length 602. A value of the second hierarchy data read out by the CPU 14 according to the sequence specifying read command 500 or the like is set at the data section 603. A status code indicating the processing result of the sequence specifying read command 500 is set at the first status code section 604. A total number of the second hierarchy data on an identifier specified by the sequence specifying read command 500 is set at the second status code section 605, the second hierarchy data existing in the first hierarchy data specified by the sequence specifying read command 500.

For example, it the case where there has been successfully received the sequence specifying read command 500 for requesting readout of a second point additive value (second hierarchy data on second identifier "DF04") shown in FIG. 16A, the CPU 14 outputs response data obtained by setting a value of a point additive value 174 as a value of the second hierarchy data on the second identifier "DF04" at the data section 603, and then, setting data "DF0403" indicating that three items of the second hierarchy data on the identifier "DF04" exist in the second status code section 605. The "DF0403" set at the second status code section 605 indicates that three items of the second hierarchy data (data on point additive value) of the identifier "DF04" exist in the first hierarchy data (data 160 on point P).

Now, a description will be given with respect to a flow of the processing for sequentially specifying and reading out the second hierarchy data (sequence specifying readout processing).

Figure 19:
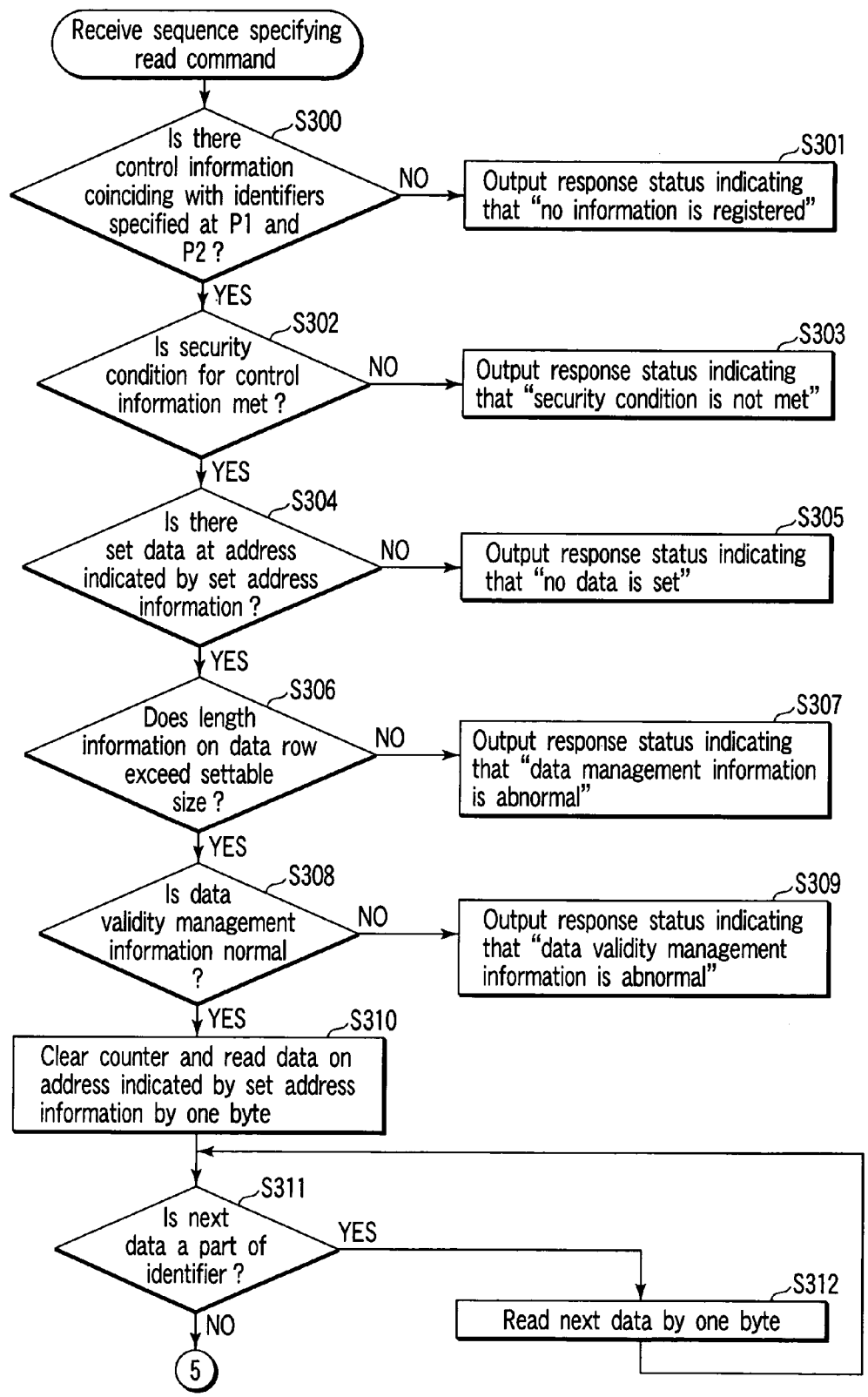
FIG. 19 is a flow chart illustrating a flow of the processing for reading out data having a nest structure whose sequence is specified.
Figure 20:
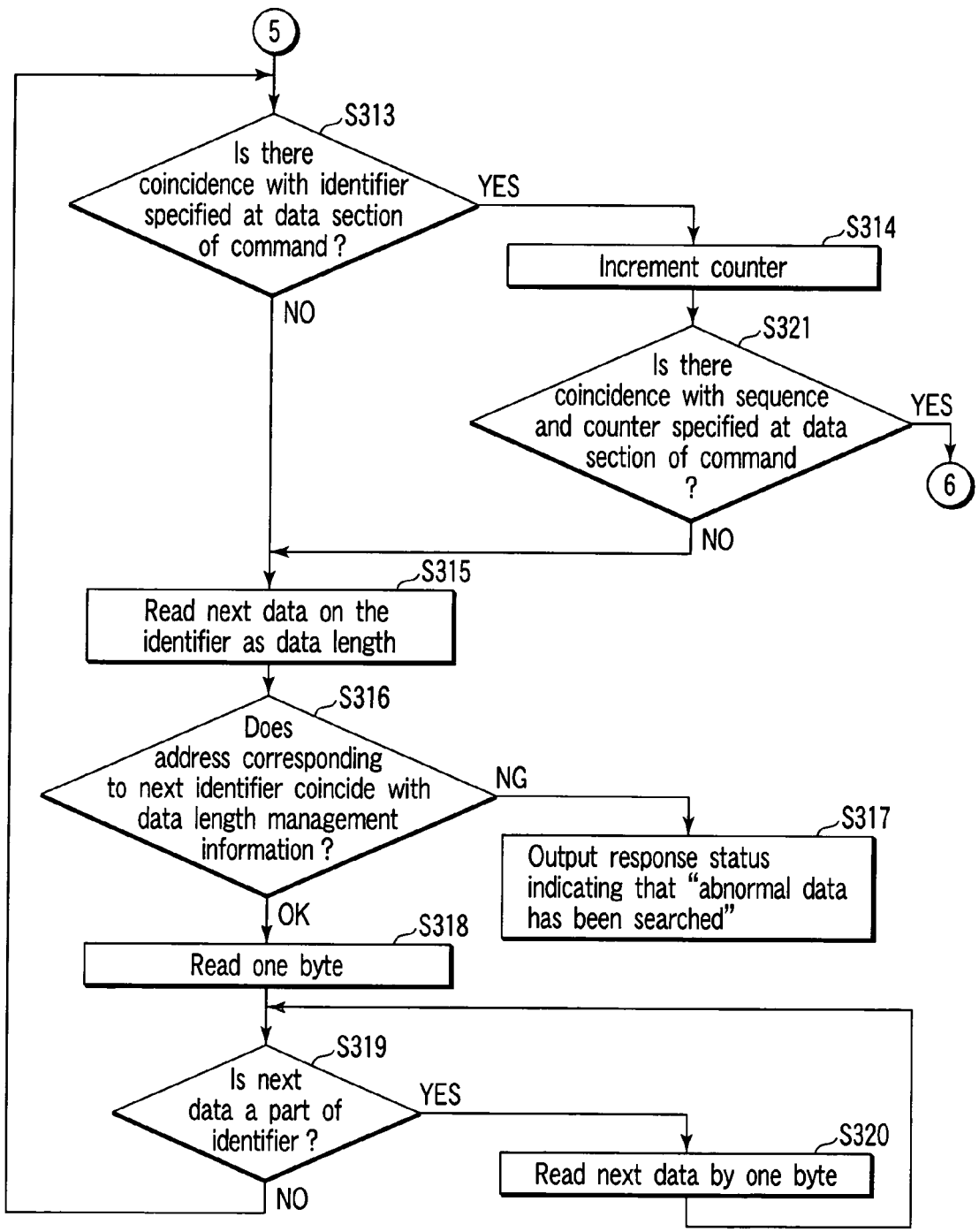
FIG. 20 is a flow chart illustrating a flow of the processing for reading out data having a nest structure whose sequence is specified.
Figure 21:
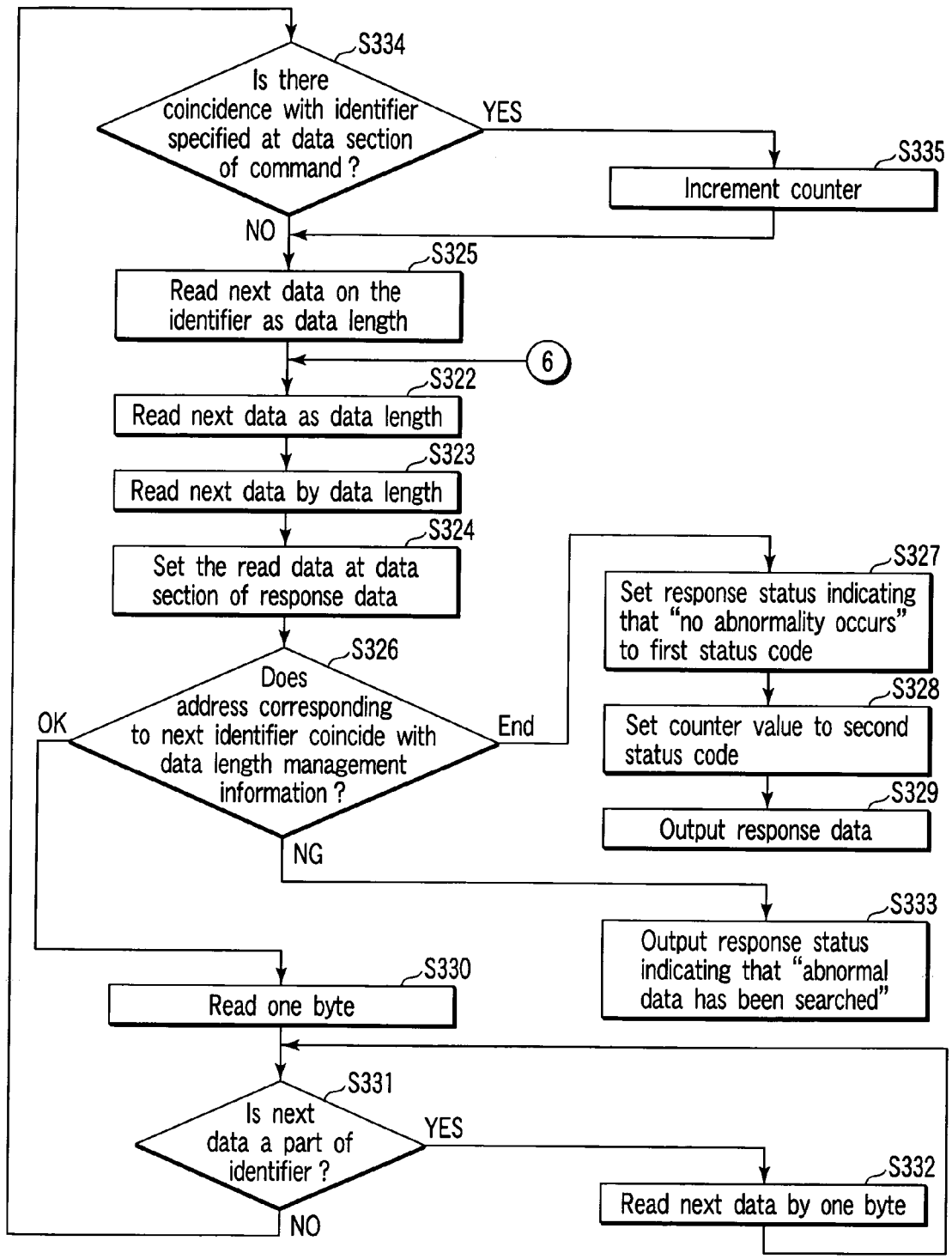
FIG. 21 is a flow chart illustrating a flow of the processing for reading out data having a nest structure whose sequence is specified.

FIGS. 19, 20, and 21 are flow charts each illustrating the processing for sequentially specifying and reading out the second hierarchy data.

First, it is assumed that the reader/writer 2 serving as an external device supplies a sequence specifying read command 500 to the IC card 1. In the IC card 1, the communication section 12 receives the sequence specifying read command 500. The received command 500 is supplied from the communication section 12 to the CPU 14. Then, the CPU 14 determines that the command is the sequence specifying read command 500 by the CLA section 502 and INS section 503 of the command header section 501 of the received command 500.

When it is determined that the received command is the sequence read command 500, the CPU 14 makes a search for the first hierarchy data which coincides with the parameters set at the P1 section 504 and P2 section 505 of the command 500. This processing makes a search for control information on the first hierarchy data on an identifier which coincides with the identifiers specified at the P1 section 504 and P2 section 505 from the data management information shown in FIG. 5 (step S300).

In the case where the control information coinciding with the parameters of the P1 section 504 and P2 section 505 of the command 500 has not been successfully specified (step S300, NO), the CPU 14 outputs a response status indicating that the control information on the first hierarchy data is not registered, to the reader/writer 2 (step S301), and terminates processing.

In the case where the control information coinciding with the parameters of the P1 section 504 and P2 section 505 of the command 500 has been successfully specified (step S300, YES), the CPU 14 checks whether or not the security condition set in accordance with the security condition information 213 contained in the control information (step S302) is met. In the case where the above security condition is not met (step S302, NO), the CPU 14 outputs a response status indicating that the security condition is not met, to the reader/writer 2 (step S303), and terminates processing.

In the case where the above security condition is met (step S302, YES), the CPU 14 checks whether or not the first hierarchy data is set at an address indicated by the set address information 211 contained in the control information (step S304).

In the case where the first hierarchy data is not set at the address indicated by the set address information 211 contained in the control information (step S304, NO), the CPU 14 outputs a response status indicating that the first hierarchy data is not set, to the reader/writer 2 (step S305), and terminates processing.

In the case where it is checked that the first hierarchy data is set at the address indicated by the set address information 211 contained in the control information (step S304, YES), the CPU 14 checks whether or not the data length indicated by the data length management information 220 on the first hierarchy data is within the allowable range indicated by the settable size information 212 contained in the control information (step S306).

In the case where the data length of the first hierarchy data exceeds the allowable range (step S306, NO), the CPU 14 outputs a response status indicating that the data length management information is abnormal (indicating that the data length exceeds the allowable range) to the reader/writer 2 (step S307), and terminates processing.

In the case where it is checked that the data length of the first hierarchy data is within the allowable range (step S306, YES), the CPU 14 checks the validity of the first hierarchy data in accordance with the data validity management information 222 on the first hierarchy data (step S308).

In the case where the validity of the first hierarchy data has not been successfully checked, namely, in the case where it is determined that the first hierarchy data is abnormal (step S308, NO), the CPU 14 outputs a response status indicating that the data validity management information on the first hierarchy data is abnormal (indicating that the validity has not been successfully checked) to the reader/writer 2 (step S309), and terminates processing.

In the case where the validity of the first hierarchy data has been successfully checked (step S308, YES), the CPU 14 clears a counter (not shown), and reads data on an address indicated by the set address information 211 contained in the control information by one byte (step S310). The counter may be provided on the data memory 15 or may be provided in the working memory 16 or in the internal memory of the CPU 14.

When one byte of data is read in the above step S310, the CPU 14 checks whether or not the next data (next one byte) is provided as a part of an identifier (step S311). In the case where the next data is provided as a part of the identifier (step S311, YES), the CPU 14 reads the next one byte of data (step S312).

In the case where the next data is not provided as a part of the identifier (step S311, NO), the CPU 14 determines that the data read in the steps S310 and S312 is provided as data indicating the identifier. That is, the CPU 14 reads the identifier of the first data in the second hierarchy contained in the first hierarchy data by the processings in the steps S310 to S312.

Therefore, in the case where the next data is not provided as a part of the identifier, namely, in the case where the identifier of the first data in the second hierarchy in the first hierarchy data is read (step S311, NO), the CPU 14 determines whether or not the identifier of the second hierarchy data read in the steps S310 and S312 coincides with the identifier of the second hierarchy data specified at the data section 507 of the command 500 (step S313).

In the case where it is determined that the identifier of the second hierarchy data read by this determination does not coincide with the identifier specified at the data section 507 of the received command 500 (step S313, NO), the CPU 14 reads the data that follows the identifier as a data length of the identifier data (step S315). When the data length of the identifier data is read, the CPU 14 determines a start address of the next data on the second hierarchy (identifier of the next data on the second hierarchy) from the read data length. When the start address of the next data on the second hierarchy is determined, the CPU 14 checks whether or not the address corresponding to the next data on the second hierarchy coincides with the data length management information 220 (step S316).

In this determination, for example, coincidence is checked in accordance with whether or not the start address of the identifier of the next data on the second hierarchy exceeds the allowable range of the address based on the data length specified based on the data length management information 220. Namely, in the determination of the step S216, it is determined whether or not the next data on the second hierarchy is normal (exists).

In the case where it is determined that the address of the next data on the second hierarchy does not coincide with the data length management information 220 by the above determination, namely, in the case where the next data on the second hierarchy is abnormal (does not exist) (step S316, NG), the CPU 14 outputs a response status indicating that abnormal data has been searched to the reader/writer 2 (step S317), and terminates processing.

In addition, in the case where it is checked that the address of the next data on the second hierarchy coincides with the data length management information 220, namely, in the case where it is determined that the next data on the second hierarchy exists (step S316, YES), the CPU 14 reads one byte of data on an address which corresponds to an identifier of the next data on the second hierarchy (step S318). When one byte of data is read in the step S318, the CPU 14 checks whether or not the next data (next one byte) is provided as a part of an identifier (step S319). In the case where the next data is provided as a part of the identifier (step S319, YES), the CPU 14 reads the next one byte of data (step S320).

In addition, in the case where the next data is not provided as a part of the identifier (step S319, NO), the CPU 14 determines that the data read in the steps S318 and S320 is provided as an identifier of the next data on the second hierarchy. That is, the CPU 14 carries out processing for reading the identifier of the next data on the second hierarchy in accordance with the processings of the steps S318 to S320.

Therefore, in the case where it is checked that the next data is not provided as a part of the identifier, namely, in the case where the identifier of the next data on the second hierarchy is read (step S319, NO), the CPU 14 returns to the step S313, and determines whether or not the next identifier in the second hierarchy read in the steps S318 and S320 coincides with the identifier specified at the data section 507 of the command 500 (step S313).

In addition, in the case where it is determined that the identifier of the second hierarchy data read by the determination of the step S313 coincides with the identifier specified at the data section 507 of the received command 500 (step S313, YES), the CPU 14 increments the above counter (step S314). When the above counter is incremented, the CPU 14 checks whether or not the sequence specified at the data section 507 of the command 500 coincides with the count value of the above counter (step S321).

In the case where it is determined that the sequence specified at the command 500 does not coincide with the count value of the above counter by this check (step S321, NO), the CPU 14 proceeds to the step S315, and repeatedly executes the above described processings. Namely, the processings of the step S313 to S321 are repeatedly executed until the second hierarchy data on an identifier in sequence specified by the command 500 has been found.

In addition, in the case where the sequence specified by the command 500 coincides with the count value of the counter in the above step S321 (step S321, YES), the CPU 14 reads the data that follows the identifier as a data length of the identifier data (second hierarchy data to be read) (step S322). When the data length of the data on the identifier is read, the CPU 14 reads the data that follows the data length as a value of the identifier data (second hierarchy data to be read) by the data length (step S323). In this manner, the value of the second hierarchy data specified by the identifier and sequence (namely, second hierarchy data to be read) is read in the command 500.

When the value of the second hierarchy data specified by the command 500, the CPU 14 sets the value of the read second hierarchy data at a data section 603 of response data 600 with respect to the command 500 (step S324).

When the value of the read second hierarchy data on the command 500 is set at the data section 603 of the response data 600, the CPU 14 checks the coincidence between the address of the next data on the second hierarchy based on the data length read in the above step S322 or the step S325 described later and the address based on the data length (data length of the first hierarchy data) of the data length management information 220 (step S326). In this step S326, it is determined whether or not the next data on the second hierarchy exists in a normal state in the first hierarchy data. That is, in the step S326, it is determined whether or not the first hierarchy data is in a normal state and whether or not the next data on the second hierarchy exists.

In the case where it is thus determined that the first hierarchy data is normal and that the next data on the second hierarchy data does not exist (step S326, END), the CPU 14 terminates reading of the second hierarchy data in the first hierarchy data, and proceeds to the step S327 described later.

In addition, in the case where it is determined that the first hierarchy data is normal and that the next data on the second hierarchy exists (step S326, OK), the CPU 14 proceeds to the step S330 described later in order to read the next data on the second hierarchy in the first hierarchy data.

In addition, in the case where the first hierarchy data is not normal (step S326, NG), the CPU 14 transmits to the reader/writer 2 a response having set a response status indicating that abnormal data has been searched (step S333), and terminates processing.

That is, in the case where it is determined that the next data on the second hierarchy exists in the step S326 (step S326, OK), the CPU 14 reads data on an address corresponding to the identifier of the data on the second hierarchy by one byte (step S330). When one byte of data is read in the above step S330, the CPU 14 checks whether or not the next data (next one byte) is provided as a part of an identifier (step S331). In the case where the next data is provided as a part of the identifier (step S331, YES), the CPU 14 reads the next one byte of data (step S332).

In addition, in the case where the next data is not provided as a part of the identifier (step S331, NO), the CPU 14 determines that the data read in the step S330 and S332 is provided as an identifier of the next data on the second hierarchy. That is, the CPU 14 reads an identifier of the next data on the second hierarchy in accordance with the processings of the steps S330 to S332.

Therefore, in the case where the next data is not provided as a part of the identifier, namely, in the case where the identifier of the next data on the second hierarchy is read (step S331, NO), the CPU 14 proceeds to the step S334 in which it is determined whether or not the identifier of the read data on the second hierarchy coincides with the identifier specified at the data section 507 of the command 500 (step S334).

In the case where it is determined that the above identifiers coincide with each other by this determination (step S334, YES), the CPU 14 further increments the counter (step S335), and proceeds to the step S325. In this step S335, like the step S322, the next data on the identifier is read as a data length of the next data on the second hierarchy, and processing goes to the step S326.

In addition, in the case where it is determined that the next data on the second hierarchy exists in the step S326 (step S326, END), the CPU 14 sets a response status indicating that no abnormality occurs at a first status code 604 of the response data 600 (step S327), and the identifier specified by the command 500 (identifier of the read data on the second hierarchy) and the count value of the counter are set at the second status code 605 (step S328). The count value of the counter value indicates a total number of data items on the second hierarchy of the specified identifier, the data existing in the first hierarchy data specified by the command.

When the response data 600 having set the first status code 604 and the second status code 605 is completed, the CPU 14 outputs the response data 600 to the reader/writer 2 (step S329), and terminates processing.

The processings in the above steps S325, S326, S330 to S332, S334 and S335 are repeatedly carried out until it is determined that the next data on the second hierarchy does not exist in the step S326. As a result, the count value of the counter is obtained as a value indicating the number of data items on the second hierarchy of the identifier specified by the command when the end of the task is determined in the step S326.

As described above, it the case where there has been successfully received a sequence specifying a read command having specified an identifier of the first hierarchy data, an identifier of the second hierarchy data, and sequence, the IC card reads out only the data on the second hierarchy in the specified sequence, from among the second hierarchy data on the specified identifier existing in the specified first hierarchy data.

In this manner, the second hierarchy data in the specified sequence from among the second hierarchy data on the specified identifier can be easily read out from the specified first hierarchy data without reading out the whole first hierarchy data or all the second hierarchy data on the specified identifier. As a result, even in the case where the second hierarchy data on the same identifier exist in the first hierarchy data having a nest structure, it becomes possible to efficiently read out specific second hierarchy data.

Now, a description will be given with respect to a processing operation for deleting the second hierarchy data having a nest structure.

First, a processing operation for deleting the second hierarchy data having a nest structure will be briefly described with reference to a specific example.

Figure 22:
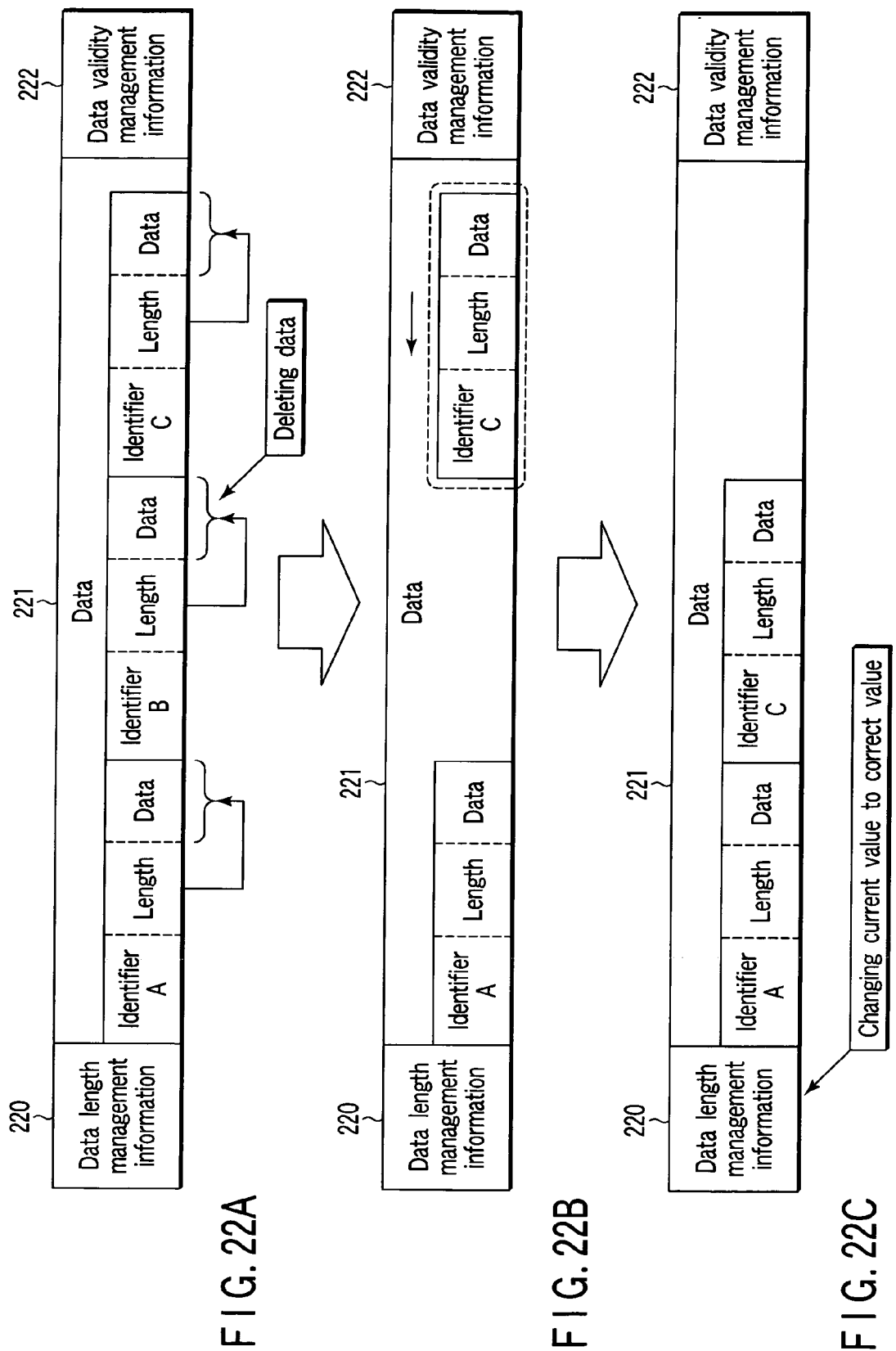
FIG. 22A is a view illustrating the processing for deleting data having a nest structure.
FIG. 22B is a view illustrating the processing for deleting data having a nest structure.
FIG. 22C is a view illustrating the processing for deleting data having a nest structure.

FIG. 22A is a view showing an example of a data configuration in the case where the second hierarchy data on identifiers A, B, and C exist in the first hierarchy data. FIG. 22B shows an example of a data configuration in the case where only the second hierarchy data on identifier B has been deleted from the data having a nest structure shown in FIG. 22A. In other words, FIG. 22C shows an example of a data configuration in the case where the data is further reconstructed after deleting the second hierarchy data on identifier B.

That is, in the case where the second hierarchy data on identifier B is deleted from the first hierarchy data shown in FIG. 22A, the CPU 14 first erases the second hierarchy data on identifier B (identifier, data length, and data value (value)). Then, the value of the first hierarchy data as shown in FIG. 22B enters a state as shown in FIG. 22B. With respect to the data in the state as shown in FIG. 22B, the CPU 14 moves the second hierarchy data on identifier C that follows the second hierarchy data on the deleted identifier B so as to follow the second hierarchy data on identifier A. In this manner, the contents of data 221 serving as a value of the first hierarchy data take on the data arrangement as shown in FIG. 22C. Further, the CPU 14 changes the data length management information to the data which consists of the second hierarchy data on identifier A and the second hierarchy data on identifier C. In this manner, the data having a nest structure as shown in FIG. 22C is formed.

Now, a description will be given with respect to instruction data (deleting command) 700 for requesting deletion of the second hierarchy data.

FIG. 23 shows an example of a configuration of instruction data (deleting command) 700 for instructing deletion of the second hierarchy data having a nest structure. This deleting command 700 is provided as a command supplied from the reader/writer 2 to the IC card.

The above deleting command 700, as shown in FIG. 23, is composed of a command header section 701, an Lc section 706, and a data section 707. The above command header section 701 stores data indicating classification, instructions, and parameters of the command. The above Lc section 706 stores information indicating a data length of data set at the data section 707 of the command. The above data section 707 stores an identifier of the second hierarchy data to be deleted.

In addition, the command header section 701 is composed of: a CLA (class) section 702; an INS (instruction) section 703; a first parameter (P1) section 704; and a second parameter (P2) section 705.

The above CLA section 702 stores data indicating classification (class) of the command. The above INS section 703 stores data indicating an instruction of the command. In the deleting command 700, the data indicating an instruction for deleting data on a specified identifier is set at the INS section 703.

The above first parameter (P1) section 704 and the second parameter (P2) section 705 each indicate which identifier of the first hierarchy data includes the second hierarchy data to be deleted, the data being set at the data section 707.

For example, in the command for requesting deletion of the point upper limit value 108 contained in data 100 on point X shown in FIG. 4, the data indicating a deleting command is set at the CLA section 702 and the INS section 703. Then, "00" and "E1" are set, respectively, as identifiers of the first hierarchy data, at the P1 section 704 and P2 section 705, and "DF04" is set as an identifier of the second hierarchy data, at the data section 407.

It the case where there has been successfully received the deleting command 700 as shown in FIG. 23, the CPU 14 of the IC card 1 first discriminates that the command is a deleting command based on the data set at the CLA section 702 and the INS section 703 of the command 700. When it is discriminated that the command is the deleting command 700, the CPU 14 discriminates the first hierarchy data including the second hierarchy data to be deleted based on the parameter (data) set at the P1 section 704 and the P2 section 705.

After discriminating the first hierarchy data including the second hierarchy data to be deleted by the P1 section 704 and P2 section 705, the CPU 14 discriminates the second hierarchy data to be deleted, the data existing in the first hierarchy data specified by the parameters of the P1 section 704 and P2 section 705 based on the identifier of the second hierarchy data set at the data section 707 of the command 700. After discriminating the second hierarchy data to be deleted, the CPU 14 deletes the second hierarchy data.

Now, a flow of the processing for deleting the second hierarchy data will be described.

Figure 24:
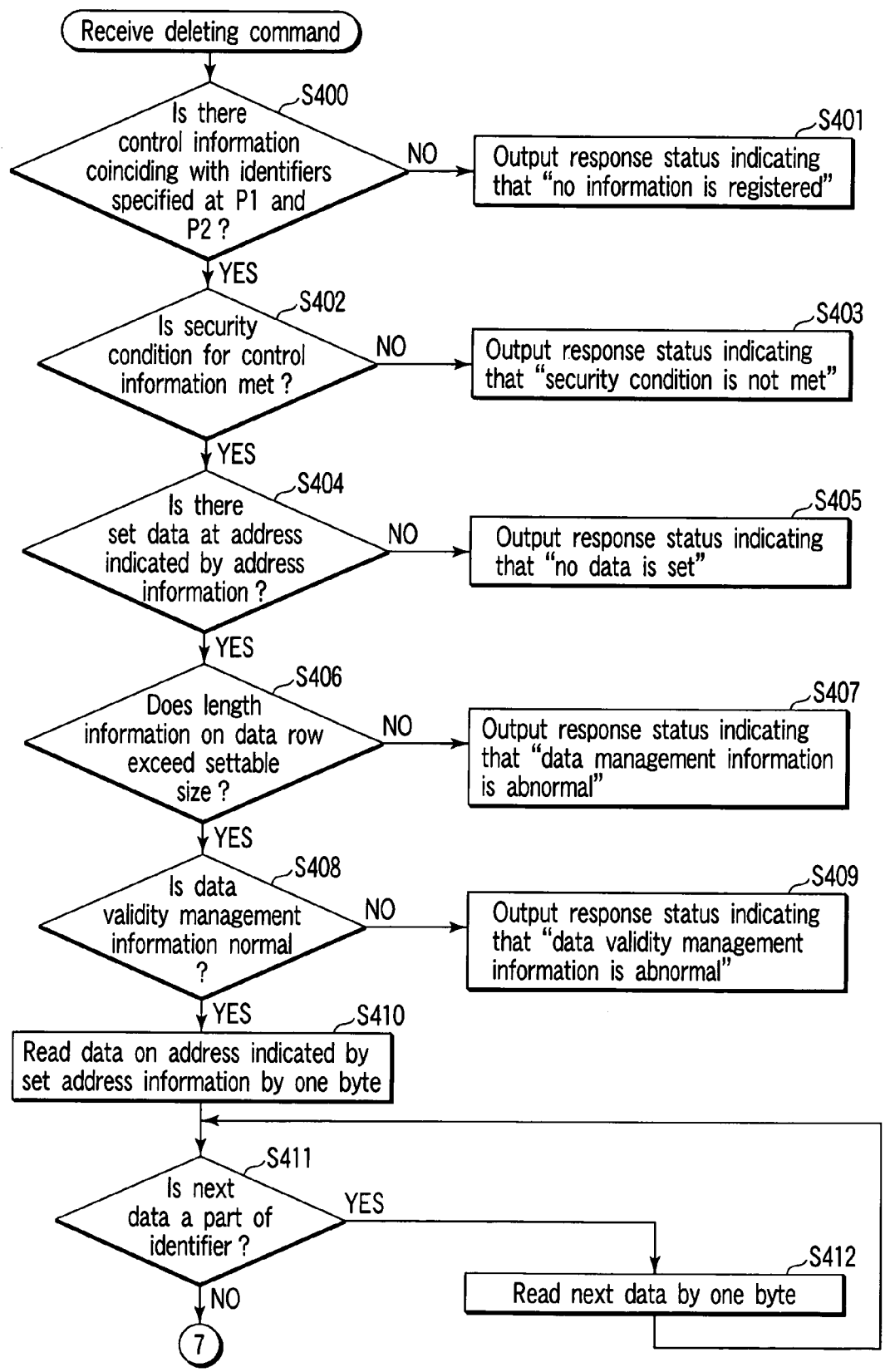
FIG. 24 is a flow chart illustrating a flow of the processing for deleting data having a nest structure.
Figure 25:
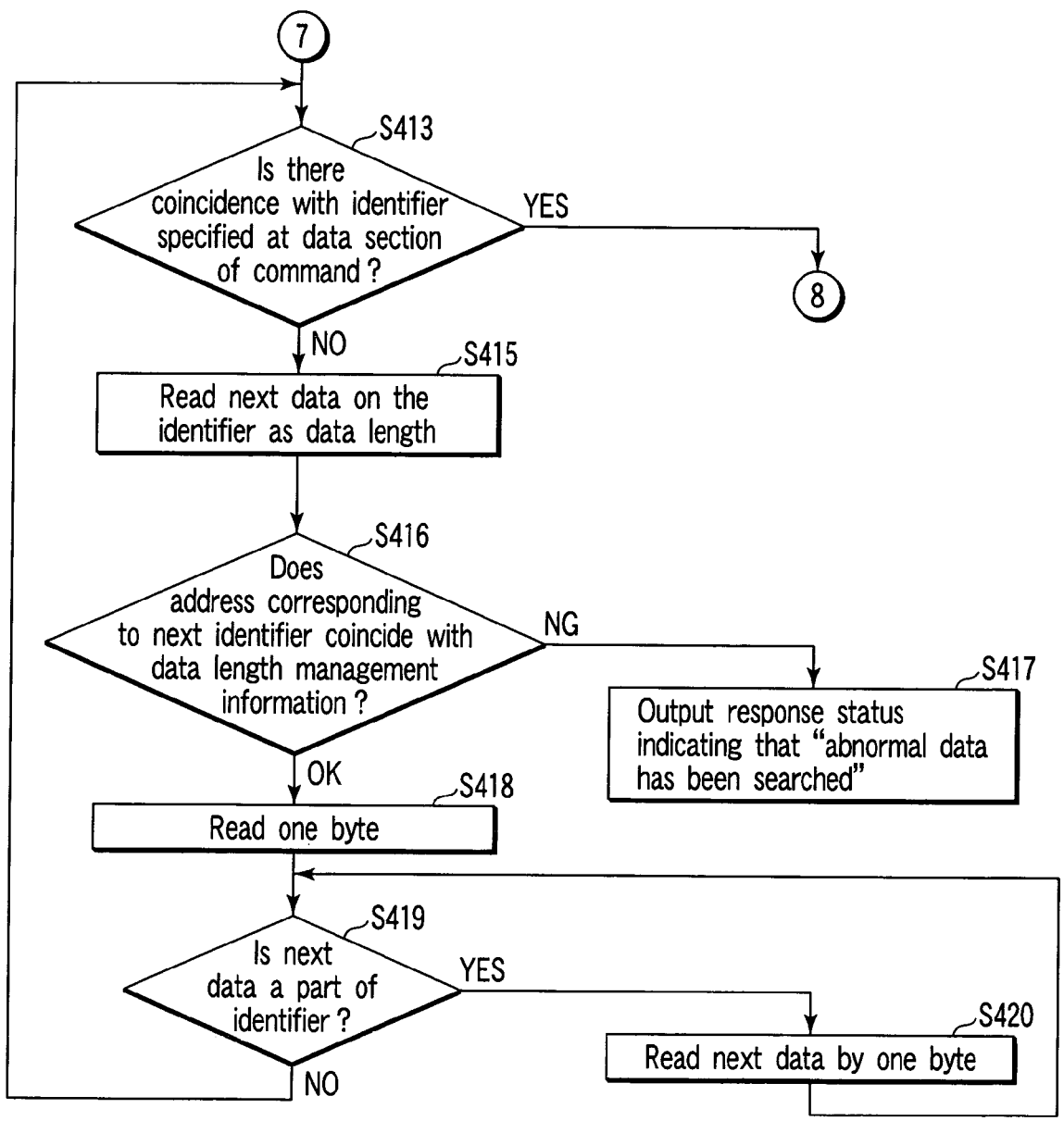
FIG. 25 is a flow chart illustrating a flow of the processing for deleting data having a nest structure.
Figure 26:
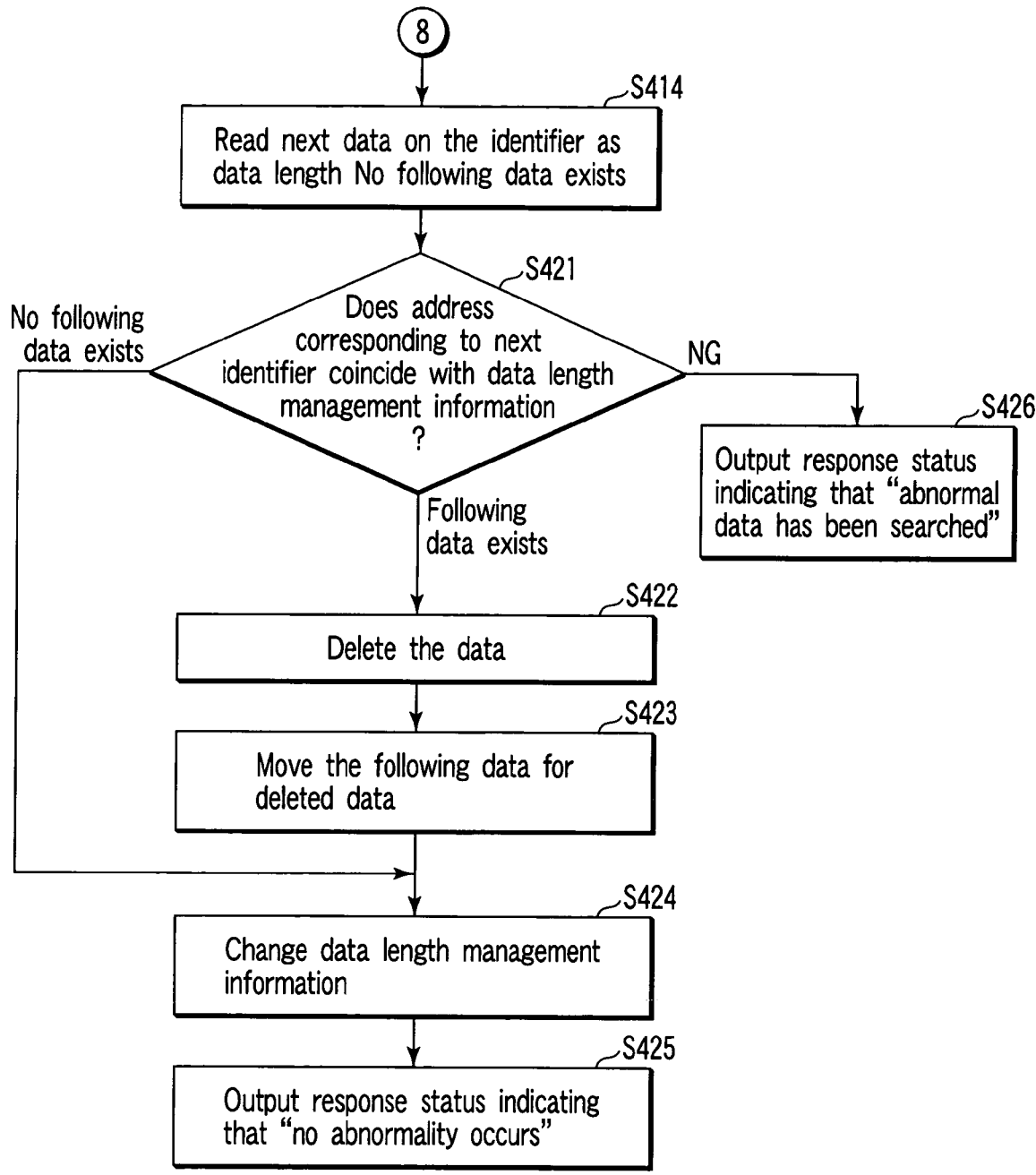
FIG. 26 is a flow chart illustrating a flow of the processing for deleting data having a nest structure.

FIGS. 24, 25 and 26 are flow charts each illustrating the processing for deleting the second hierarchy data having a nest structure.

First, it is assumed that the reader/writer 2 serving as an external device has supplied a deleting command 700 to the IC card 1. Then, in the IC card 1, the communication section 12 receives the deleting command 700. The received deleting command 700 is supplied from the communication section 12 to the CPU 14. Then, the CPU 14 determines that the command is a deleting command by the CLA section 702 and INS section 703 of the command header section 701 of the received command 700.

When it is determined that the received command is the deleting command, the CPU 14 makes a search for data which coincides with the parameters set at the P1 section 704 and P2 section 705 of the command. This processing makes a search for control information on the first hierarchy data which coincides with the identifiers specified at the P1 section 704 and P2 section 705 from the data management information shown in FIG. 5 (step S400).

In the case where control information coinciding with the parameters of the P1 section 704 and P2 section 705 has not been successfully specified (step S400, NO), the CPU 14 outputs a response status indicating that control information is not registered, to the reader/writer 2 (step S4019, and terminates processing.

In the case where control information coinciding with the parameters of the P1 section 704 and P2 section 705 has been successfully specified (step S400, YES), the CPU 14 checks whether or not the security condition set in accordance with the security condition information contained in the control information is met (step S402). In the case where the above security condition is not met (step S402, NO), the CPU 14 outputs a response status indicating the security condition is not met, to the reader/writer 2 (step S403), and terminates processing.

In the case where the above security condition is met (step S402, YES), the CPU 14 checks whether or not the first hierarchy data is set at an address indicated by the set address information 211 contained in the control information (step S404).

In the case where the first hierarchy data is not set at the address indicated by the set address information 211 contained in the control information (step S404, NO), the CPU 14 outputs a response status indicating that the first hierarchy data is not set, to the reader/writer 2 (step S405), and terminates processing.

In the case where the first hierarchy data is set at the address indicated by the set address information 211 contained in the control information (step S404, YES), the CPU 14 checks whether or not the data length indicated by the data length management information 220 on the first hierarchy data is within the allowable range indicated by the settable size information 212 contained in the control information (step S406).

In the case where the data length of the first hierarchy data exceeds the allowable range (step S406, NO), the CPU 14 outputs a response status indicating that the data management information is abnormal (indicating that the data length exceeds the allowable range) to the reader/writer 2 (step S407), and terminates processing.

In the case where the data length of the first hierarchy data is within the allowable range (step S406, YES), the CPU 14 checks the validity of the first hierarchy data in accordance with the data validity management information 222 on the first hierarchy data (step S408).

In the case where the validity of the first hierarchy data has not been successfully checked, namely, in the case where it is determined that the first hierarchy data is abnormal (step S408, NO), the CPU 14 outputs a response status indicating that the data validity management information on the first hierarchy data is abnormal (indicating that the validity has not been successfully checked) to the reader/writer 2 (step S409), and terminates processing.

In the case where the validity of the first hierarchy data has been successfully checked (step S408, YES), the CPU 14 reads data on an address indicated by the set address information 211 contained in the control information by one byte (step S410). When one byte of data is read in the above step S410, the CPU 14 checks whether or not the next data (next one byte) is provided as a part of an identifier (step S411). In the case where it is thus checked that the next data is provided as a part of the identifier (step S111, YES), the CPU 14 reads the next one byte of data (step S412).

In the case where it is checked that the next data is not provided as a part of the identifier (step S411, NO), the CPU 14 determines that the data read in the steps S410 and S412 is provided as data indicating the identifier. That is, the CPU 14 carries out a processing operation for reading the identifier of the first data on the second hierarchy in accordance with the processings of the steps S410 to S412.

Therefore, in the case where it is checked that the next data is not provided as a part of the identifier (step S411, NO), the CPU 14 determines whether or not the identifier of the second hierarchy data read in the steps S410 and S412 coincides with the identifier specified at the data section 707 of the command 700 (step S413). In this determination, it is determined whether or not the identifier of the read second hierarchy data is provided as an identifier of the second hierarchy data to be deleted.

In the case where it is determined that the identifier read by this determination does not coincide with the identifier of the second hierarchy data to be deleted (step S413, NO), the CPU 14 reads the next data on the identifier as a data length of the identifier data (step S415). When the data is thus read, the CPU 14 determines a start address of the next data on the second hierarchy (identifier of the next data on the second hierarchy) from the read data length. When the start address of the next data on the second hierarchy is determined, the CPU 14 checks whether or not the address corresponding to the identifier of the next data on the second hierarchy coincides with the data length management information 220.

In the above step S416, for example, the coincidence is checked in accordance with whether or not the start address of the next data on the second hierarchy (start address of the identifier of the next data on the second hierarchy) determined from the data length of the identifier data exceeds the allowable range of the address based on the data length of the data length management information 220. Namely, in the determination of the step S416, it is determined whether or not the next data on the second hierarchy is normal.

In the case where it is determined that the address of the next data on the second hierarchy does not coincide with the data length indicated by the data length management information 220 in the above determination, namely, in the case where it is determined that the data is abnormal (step S416, NG), the CPU 14 outputs a response status indicating that abnormal data has been searched, to the reader/writer 2 (step S417), and terminates processing.

In addition, in the case where the address of the next data on the second hierarchy coincides with the data length management information 220 (step S416, OK), the CPU 14 reads the data on an address corresponding to the identifier of the next data on the second hierarchy by one byte (step S418). When one byte of data is read in the step S418, the CPU 14 checks whether or not the next data (next one byte) is provided as a part of an identifier (step S419). In the case where the next data is provided as a part of the identifier (step S419, YES), the CPU 14 reads the next one byte of data (step S420).

In the case where the next data is not provided as a part of the identifier (step S419, NO), the CPU 14 determines that the data read in the steps S418 and S420 is provided as data indicating the identifier, and returns to the step S413. That is, the CPU 14 repeatedly executes the above steps S413 and S415 to S420 until the identifier coinciding with the identifier specified at the data section 707 of the command has been found.

In addition, in the case where it is determined that the identifier read by the determination of the step S413 coincides with the identifier specified at the data section 707 of the received command, namely, in the case where it is determined that the second hierarchy data on the read identifier is provided as the second hierarchy data to be deleted (step S413, YES), the CPU 14 reads the next data on the identifier as a data length of the identifier data (data to be deleted) (step S414).

When reading the data length of the second hierarchy data to be deleted, the CPU 14 determines a start address of the next data on the second hierarchy (identifier of the next data on the second hierarchy) based on the read data length. When the address corresponding to the next identifier is determined, the CPU 14 checks the coincidence between the address corresponding to the next identifier and the data length indicated by the data length management information 220 (step S421). In this step S421, specifically, the CPU 14 determines whether or not the first hierarchy data is in a normal state and whether or not there exists the second hierarchy data that follows the second hierarchy data determined to be deleted.

In the case where it is determined that the first hierarchy data is abnormal in the step S421 (step S421, NG), the CPU 14 outputs a response status indicating that abnormal data has been searched, to the reader/writer 2 (step S426), and terminates processing.

In addition, in the case where it is determined that there does not exist the second hierarchy data that follows the second hierarchy data to be deleted in the step S421 (step S421, No following data exists), the CPU 14 deletes the second hierarchy data (step S422).

In this case, the data length of first hierarchy data is changed by deleting the second hierarchy data. Thus, the CPU 14 needs to change the data length of the first hierarchy data.

Therefore, the CPU 14 computes a data length obtained by subtracting a data length of the second hierarchy data deleted from a data length of the current data on the first hierarchy. Based on the data length of the computed new first hierarchy data, the CPU 14 corrects the data length of the data length management information 220 (step S424).

When these processings are normally completed, the CPU 14 outputs a response status indicating that no abnormality occurs to the reader/writer 2 (step S425), and terminates processing.

In addition, in the case where it is determined there exists the second hierarchy data that follows the second hierarchy data to be deleted in the step S421 (step S421, Following data exists), the CPU first deletes the second hierarchy data (step S422).

In this case, it is necessary to move the second hierarchy data that follows the deleted second hierarchy data. Thus, the CPU 14 determines a movement quantity of the following second hierarchy data based on the data length of the deleted second hierarchy data. This movement quantity denotes a length of the whole data on the deleted second hierarchy. That is, the CPU 14 moves the second hierarchy data that follows the deleted second hierarchy data by "a whole length of the deleted second hierarchy data" as a movement quantity of the following second hierarchy data (step S423).

Further, in this case, the first hierarchy data is changed by moving the following second hierarchy data together with deletion of the second hierarchy data. Thus, the CPU 14 needs to change the data length of the first hierarchy data. Therefore, the CPU 14 computes a data length obtained by subtracting a data length of the second hierarchy data deleted from a data length of the current first hierarchy data. Based on the thus computed data length, the CPU 14 corrects a data length of the data length management information on the first hierarchy data (step S424).

When these processings have been normally completed, the CPU 14 outputs a response status indicating that no abnormality occurs, to the reader/writer 2 (step S425), and terminates processing.

As described above, it the case where there has been successfully received a deleting command having specified the first hierarchy data and the second hierarchy data to be deleted, the IC card deletes only the second hierarchy data specified, the data existing in the specified first hierarchy data.

In this manner, it is possible to easily delete the specified second hierarchy data from the specified first hierarchy data without rewriting the whole data on the first hierarchy. As a result, it becomes possible to efficiently delete specific second hierarchy data contained in the first hierarchy data having a nest structure.

Now, a description will be given with respect to a processing operation for adding the second hierarchy data into the first hierarchy data (additional writing processing operation).

First, a processing operation for adding the second hierarchy data into the first hierarchy data will be briefly described with reference to a specific example.

FIG. 27A is a view showing an example of a data configuration in the case where the second hierarchy data on identifiers A and B exists in the first hierarchy data. FIG. 27B shows an example of a data configuration in the case where the second hierarchy data on identifier C is newly written into the first hierarchy data shown in FIG. 27A.

That is, in the case where the second hierarchy data on identifier C is additionally written into the first hierarchy data shown in FIG. 27A, the CPU 14 first writes data on identifier C (identifier, data length, and data value (value)) that follows the second hierarchy data on identifier B. Then, the data value (value) of the first hierarchy data is changed by the second hierarchy data on identifier C which has been additionally written. Thus, the CPU 14 changes a data length of the data length management information 220 to a data length consisting of the second hierarchy data on identifiers B and C. In this manner, the second hierarchy data on identifier C is newly added into the first hierarchy data, and the data length management information enters a normal state.

Now, a description will be given with respect to instruction data (additional writing command) for requesting additional writing of the second hierarchy data into the first hierarchy data.

FIG. 28 shows an example of a configuration of instruction data (additional writing command) 800 for instructing additional writing of the second hierarchy data into the first hierarchy data. This additional writing command 800 is provided as a command to be supplied from the reader/writer 2 to the IC card.

The additional writing command 800, as shown in FIG. 28, is composed of a command header section 801, an Ls section 806, and a data section 807. The command header section 801 stores data indicating the classification, instructions, and parameters or the like, of the command. The Lc section 806 stores information indicating a data length of data set at the data section 807 of the command. The above data section 807 stores the identifier, length, and data value (value) of the second hierarchy data to be additionally written.

In addition, the command header section 801 is composed of: a CLA (class) section 802; an INS (instruction) section 803; a first parameter (P1) section 804; and a second parameter (P2) section 805.

The CLA section 802 stores data indicating the classification (class) of the command. The INS section 803 stores data indicating the instruction of the command. In the additional writing command 800, the data indicating an instruction for additionally writing data stored in the data section 807 is set at the INS section 803.

The above first parameter (P1) section 804 and the second parameter (P2) section 805 each indicate which identifier of the first hierarchy data includes an identifier of the second hierarchy data to be deleted, the data being set at the data section 807.

It the case where there has been successfully received the additional writing command 800 as shown in FIG. 28, the CPU 14 of the IC card 1 first discriminates that the command is provided as an additional writing command based on the data set at the CLA section 802 and the INS section 803 of the command 800. When it is discriminated that the command is provided as the additional writing command, the CPU 14 discriminates the first hierarchy data into which the second hierarchy data is additionally written based on the parameter (data) set at the P1 section 804 and P2 section 805.

When discriminating the first hierarchy data additionally written by the P1 section 804 and the P2 section 805, the CPU 14 writes data (identifier of the second hierarchy data, length, and data) to be written, the data being set at the data section 807, into the first hierarchy data specified by the parameters of the P1 section 704 and P2 section 705.

Now, a flow of the processing for additionally writing data having a nest structure will be described.

Figure 29:
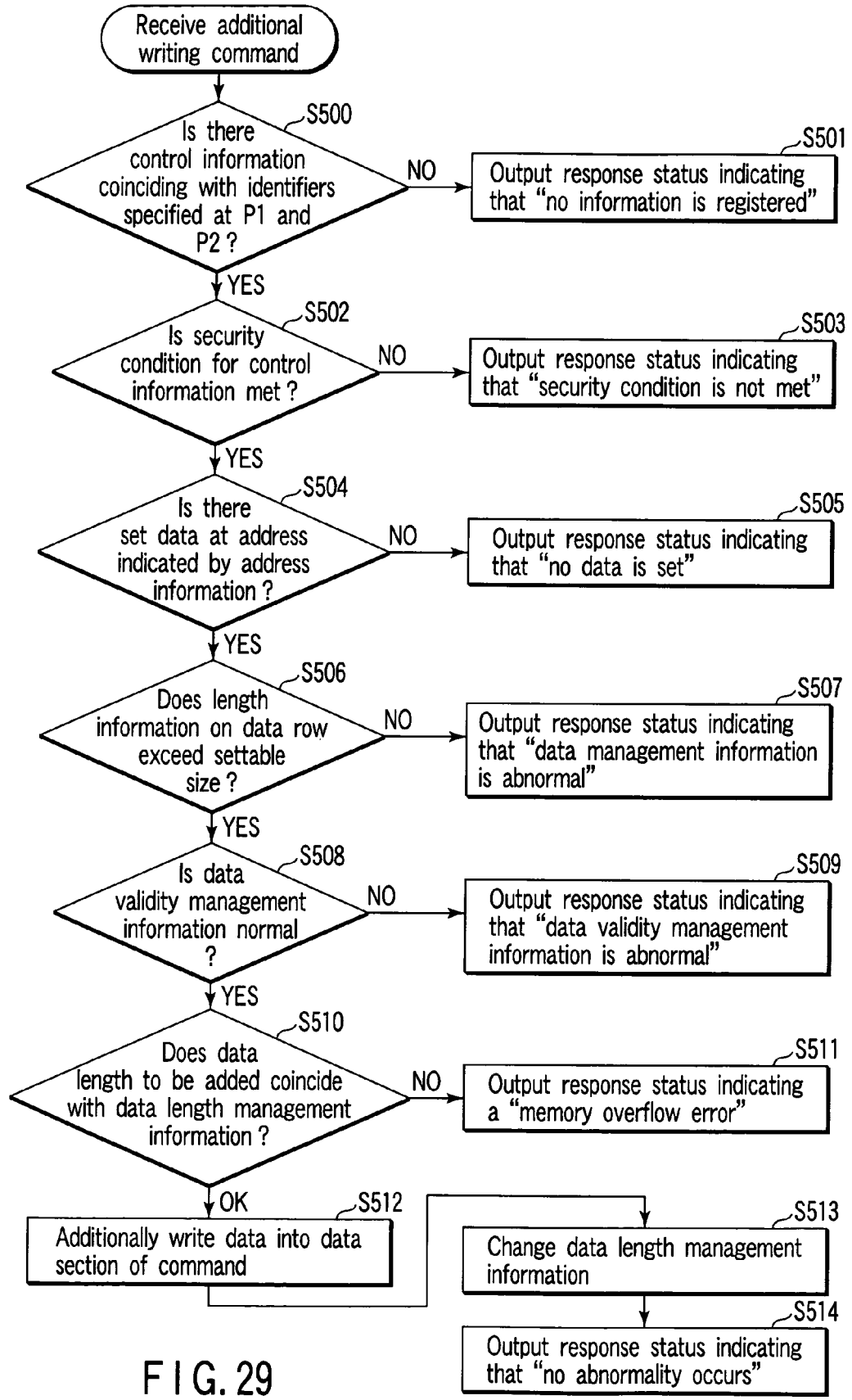
FIG. 29 is a flow chart illustrating a flow of the processing for additionally writing data having a nest structure.

FIG. 29 is a flow chart illustrating the processing for additionally writing the second hierarchy data having a nest structure.

First, it is assumed that the reader/writer 2 serving as an external device has supplied an additional writing command 800 to the IC card 1. Then, in the IC card 1, the communication section 12 receives the additional writing command 800. The received additional writing command 800 is supplied from the communication section 12 to the CPU 14. Then, the CPU 14 determines that the command is provided as an additional writing command by the CLA section 802 and INS section 803 of the command header section 801 of the received command 800.

When it is determined that the received command is provided as the additional writing command 800, the CPU 14 makes a search for data which coincides with the parameters set at the P1 section 804 and P2 section 805 of the command. This processing makes a search for the control information which coincides with the identifiers specified at the P1 section 804 and P2 section 805 from the data management information shown in FIG. 5 (step S500).

In the case where the control information coinciding with the parameters of the P1 section 804 and P2 section 805 has not been specified (step S500, NO), the CPU 14 outputs a response status indicating that the control information on the data specified by the command to the reader/writer 2 (step S501), and terminates processing.

In the case of specifying the control information which coincides with the parameters of the P1 section 804 and P2 section 805 (step S500, YES), the CPU 14 checks whether or not the security condition in accordance with the security condition information 213 contained in the control information is met (step S502). In the case where the above security condition is not met (step S502, NO), the CPU 14 outputs a response status indicating that the security condition is not met, to the reader/writer 2 (step S503), and terminates processing.

In the case where the above security condition is met (step S502, YES), the CPU 14 checks whether or not data has been already set at an address indicated by the set address information 211 contained in the control information (step S504). In the case where no data is set at the address indicated by the set address information 211 contained in the control information (step S504, NO), the CPU 14 outputs a response status indicating that no data is set, to the reader/writer 2 (step S505), and terminates processing.

In the case where data is set at the address indicated by the set address information 211 contained in the control information (step S504, YES), the CPU 14 checks whether or not the data length indicated by the data length management information 220 on the first hierarchy data specified by the command is within the allowable range indicated by the settable size information 212 contained in the control information (step S506).

In the case where the data length of the first hierarchy data specified by the command exceeds the allowable range (step S506, NO), the CPU 14 outputs a response status indicating the data management information on the specified first hierarchy data (indicating that the data length exceeds the allowable range) to the reader/writer 2 (step S507), and terminates processing.

In the case where it is checked that the data length of the first hierarchy data specified by the command is within the allowable range (step S506, YES), the CPU 14 checks the validity of the data in accordance with the data validity management information 222 on the first hierarchy data specified by the command (step S508).

In the case where the validity of the first hierarchy data specified by the command has not been successfully checked (step S508, NO), the CPU 14 outputs a response status indicating that the data validity management information on the first hierarchy specified by the command is abnormal (indicating that the validity of the data has not been successfully checked) to the reader/writer 2 (step S509), and terminates processing.

In the case where the validity of the first hierarchy data specified by the command has not been successfully checked (step S508, YES), the CPU 14 checks whether or not the data length of the second hierarchy data to be added, the data being set at the data section 807 of the command, coincides with the current data length (data length management information) of the first hierarchy data specified by the command (step S510).

In the above step S510, it is determined whether or not a memory overflow occurs in the case where additional writing is done. Specifically, in the case where the data set at the data section 807 is additionally written into the first hierarchy data, the CPU 14 determines whether or not the data length of the first hierarchy data exceeds the allowable range indicated by the settable size information 212 contained in the control information. That is, the CPU 14 determines whether or not the data length of the first hierarchy data after being additionally written exceeds the allowable range indicated by the settable size information 212, based on the data length of the current first hierarchy data and the data length of the data set at the data section 807.

In the case where it is determined that the data length set at the data section 807 does not coincide with the current data length of the first hierarchy data specified by the command by the determination of the step S510, namely, in the case where it is determined that additional writing of the data specified by the command is disabled (step S510, NO), the CPU 14 outputs a response status indicating that the data length of the specified first hierarchy data exceeds the allowable range (indicating that a memory overflow occurs) to the reader/writer 2 (step S511), and terminates processing.

In addition, in the case where it is determined that the data length set at the data section 807 coincides with the current data length of the first hierarchy data specified by the command by the determination of the step S510, namely, in the case where it is determined that the data specified by the command can be additionally written (step S510, YES), the CPU 14 additionally writes the data set at the data section 807 of the command 800 as the second hierarchy data into the data section (value) of the first hierarchy data specified by the command 800 (step S511).

In this case, the data length of the first hierarchy data is changed by the additionally written second hierarchy data. Thus, the CPU 14 needs to change the data length of the first hierarchy data (data length management information). Therefore, the CPU 14 computes the data length added by the second hierarchy data additionally written into the current data length of the first hierarchy data. Based on the data length of the computed new first hierarchy data, the CPU 14 corrects the data length of the data length management information 220 on the first hierarchy data (step S513).

When these processings are normally completed, the CPU 14 outputs a response status indicating that no abnormality occurs, to the reader/writer 2 (step S514), and terminates processing.

As described above, in the case where there has been successfully received an additional writing command having specified the first hierarchy data and the second hierarchy data to be newly added, the IC card additionally writes the second hierarchy data specified in the specified first hierarchy data.

In this manner, the new second hierarchy data can be easily added to the first hierarchy data without rewriting the whole first hierarchy data. As a result, it becomes possible to efficiently carry out additional writing of the second hierarchy data into the first hierarchy data having a nest structure.

Now, a processing operation for making a search for data having a nest structure will be described here.

First, a description will be given with respect to instruction data (search command) for instructing search for the second hierarchy data having a nest structure.

Figure 30:
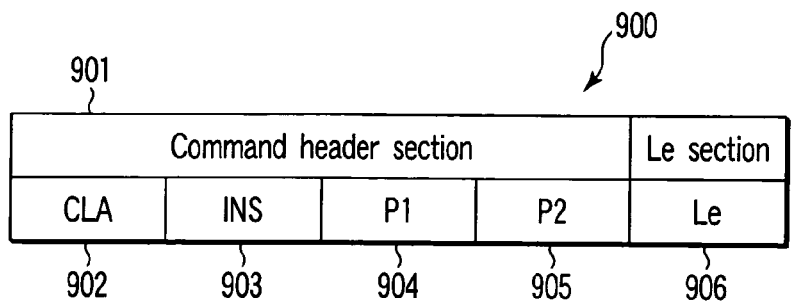
FIG. 30 is a view showing a configuration of a search command for requesting a search for data-having a nest structure.

FIG. 30 shows an example of a configuration of a search command 900 for instructing search for the second hierarchy data having a nest structure. This search command 900 is provided as a command to be supplied from the reader/writer 2 to the IC card.

The above search command 900, as shown in FIG. 30, is composed of a command header section 901 and an Le section 906. The above command header section 901 stores data indicating the classification, instruction, and parameter of the command. The above Le section 906 stores data indicating a data length of the command header section 901.

In addition, the command header section 901 is composed of: a CLA (class) section 902; an INS (instruction) section 903; a first parameter (P1) section 904; and a second parameter (P2) section 905.

The above CLA section 902 stores data indicating the classification (class) of the command. The above INS section 903 stores data indicating the instruction of the command. In the search command 900, data indicating an instruction for making a search for the second hierarchy data on the identifier specified by the parameters of the P1 section 904 and P2 section 905 is set at the INS section 903.

The above first parameter (P1) section 904 and the second parameter (P2) section 905 each store data (parameters) indicating the identifier of the second hierarchy data to be searched. For example, in a command for requesting a search for a final update date of point for the data shown in FIGS. 4A, 4B and 4C (final update date of point in data on point X shown in FIG. 4A and final update date of point in data on point Z shown in FIG. 4C), data indicating a search command is set at the CLA section 902 and the INS section 903; "DF" is set at the P1 section 904; and "03" is set at the P2 section 905.

It the case where there has been successfully received the search command 900 as shown in FIG. 30, the CPU 14 of the IC card 1 first discriminates that the command is provided as a search command based on the data set at the CLA section 902 and the INS section 903 of the command 900. When it is discriminated that the command is provided as the search command, the CPU 14 makes a search for the second hierarchy data on the identifier specified by the parameters (data) set at the P1 section 904 and P2 section 905. This search result is transmitted to the reader/writer as a response to the search command 900.

Figure 31:
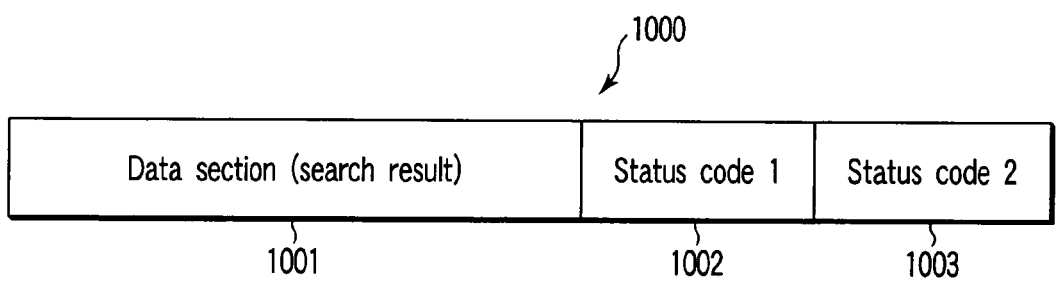
FIG. 31 is a view showing a configuration of response data in response to a search command.

FIG. 31 shows an example of a configuration of response data 1000 to the search command 900. This response data 1000 is provided as data to be outputted from the IC card 1 to the reader/writer 2 as an execution result (response) of the search command 900.

The response data 1000 for the search command 900 is composed of a data section 1001, a first status code section 1002, and a second status code section 1003.

The search result relevant to the search command 900 is set at the data section 1001. At the data section 1001, information indicating an identifier of the first hierarchy data including the second hierarchy data on the specified identifier is set as a search result of the identifier of the second hierarchy data specified by the search command 900. In addition, the first status code 1002 and the second status code 1003 are set as status codes each indicating a processing result relevant to the search command 900.

For example, in the IC card having the data shown in FIGS. 4A, 4B and 4C, response data obtained by setting a data identifier "E1" of point X and a data identifier "E3" of point Z which serve as the first hierarchy data is outputted to the search command for specifying an identifier (DF03) of a final update date of point serving as the second hierarchy data.

Figure 32:
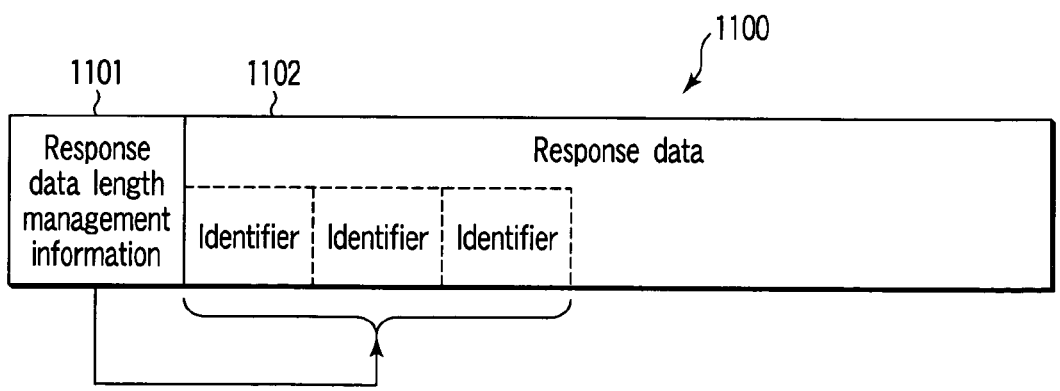
FIG. 32 is a view showing an example of a configuration of a response data memory for storing response data.

FIG. 32 shows an example of a configuration of a memory (response data memory) 1100 for storing the above response data.

The response data memory 1100 as shown in FIG. 32 is provided in the data memory 15, for example. This response data memory 1100, as shown in FIG. 32, is composed of: a region 1101 for storing the response data length management information and a region 1102 for storing response data. The data stored in the response data memory 1100 is provided as data set at the data section 1001 shown in FIG. 31, for example.

Now, a description will be given with respect to a flow of a processing operation (search processing operation) for making a search for the second hierarchy data having a nest structure as described above.

Figure 33:
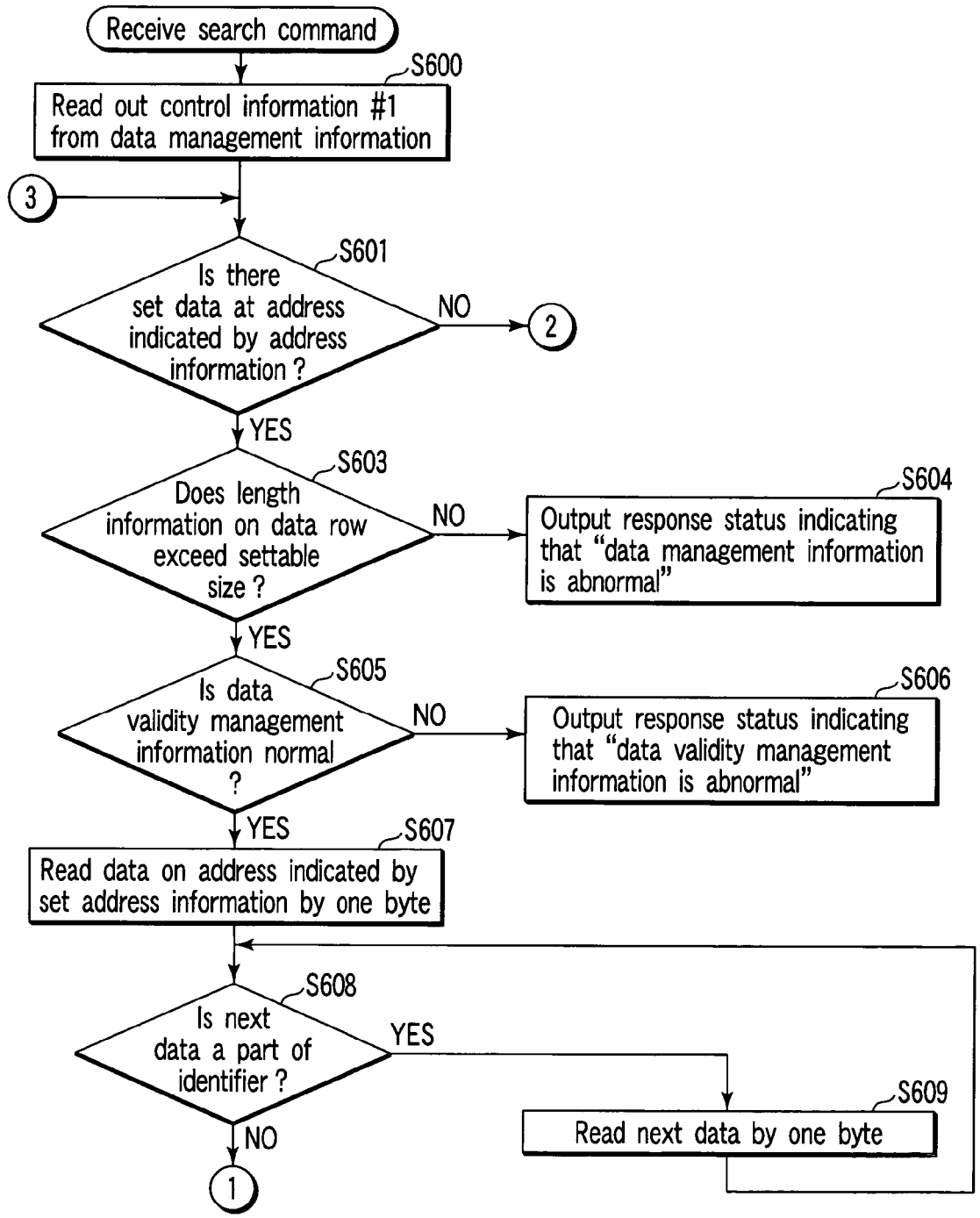
FIG. 33 is a flow chart illustrating a flow of the processing for making a search for data having a nest structure.
Figure 34:
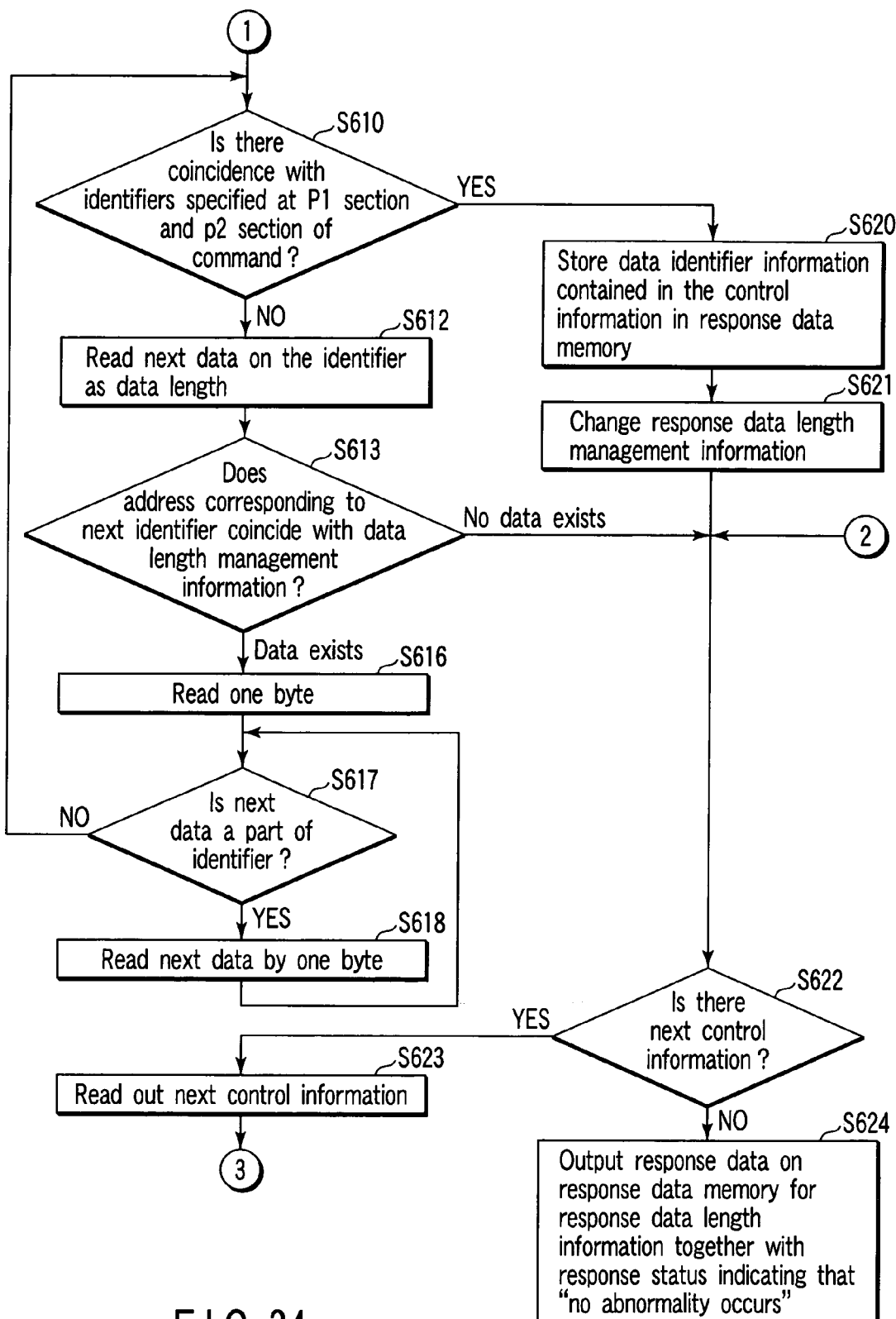
FIG. 34 is a flow chart illustrating a flow of the processing for making a search for data having a nest structure.

FIGS. 33 and 34 are flow charts each illustrating the processing for making a search for the second hierarchy data having a nest structure stored in the data memory 15 incorporated in the IC card 1.

First, it is assumed that the reader/writer 2 serving as an external device has supplied a search command 900 to the IC card 1. In the IC card 1, the communication section 12 receives the search command 900. The received command is supplied from the communication section 12 to the CPU 14.

Then, the CPU 14 determines that the command is provided as a search command by the CLA section 902 and INS section 903 of the command header section 901 of the received command 900.

When it is determined that the received command is provided as the search command 900, the CPU 14 reads out first control information from the data management information shown in FIG. 5 (step S600). When the control information is read out, the CPU 14 checks whether or not the first hierarchy data is set at an address indicated by the set address information 211 contained in the control information (step S601).

In the case where the first hierarchy data is not set at the address indicated by the set address information 211 contained in the control information (step S601, NO), the CPU 14 proceeds to the step S622 described later. In the case where it is checked that the first hierarchy data is set at the address indicated by the set address information 211 contained in the control information (step 601, YES), the CPU 14 checks whether or not the data length indicated by the data length management information 220 on the first hierarchy data is within the allowable range indicated by the settable size information 212 contained in the control information (step S603).

In the case where the data length of the first hierarchy data exceeds the allowable range (step S603, NO), the CPU 14 outputs a response status indicating that the data management information on the first hierarchy data is abnormal (indicating that the data length exceeds the allowable range) to the reader/writer 2 (step S604), and terminates processing.

In the case where it is checked that the data length of the first hierarchy data is within the allowable range (step S603, YES), the CPU 14 checks the validity of the first hierarchy data in accordance with the data validity management information 222 on the first hierarchy data (step S605). In the case where the validity of the first hierarchy data has not been successfully checked, namely, in the case where it is determined that the data is abnormal (step S605, NO), the CPU 14 outputs a response status indicating that the data validity management information on the first hierarchy data is abnormal (indicating that the validity of the data has not been successfully checked) to the reader/writer 2 (step S606), and terminates processing.

In the case where the validity of the first hierarchy data has been successfully checked (step S605, YES), the CPU 14 reads data on an address indicated by the set address information 211 contained in the control information by one byte (step S607). When one byte of data is read in the above step S607, the CPU 14 checks whether or not the next data (next one byte) is provided as a part of an identifier (step S608). In the case where it is thus checked that the next data is provided as a part of the identifier (step S608, YES), the CPU 14 reads the next data by one byte (step S609).

In the case where it is checked that the next data is not provided as a part of the identifier (step S608, NO), the CPU 14 determines that the data read in the steps S607 and S609 is provided as data indicating the identifier. That is, the CPU 14 reads the first identifier of the second hierarchy data in accordance with the processings of the steps S607 to S609.

Therefore, in the case where it is checked that the next data is not provided as a part of the identifier, namely, in the case where the identifier of the second hierarchy data is read (step S608, NO), the CPU 14 determines whether or not the identifier of the read second hierarchy data coincides with the identifiers specified at the P1 section 904 and P2 section 905 of the search command 900 (identifier of data targeted for search) (step S610).

In the case where it is determined that the identifier read by this determination does not coincide with the identifier specified by the received search command 900 (step S610, NO), the CPU 14 reads the data that follows the identifier as a data length (step S612). When the data length is thus read, the CPU 14 determines a start address of the next data (next identifier) based on the read data length.

When the start address of the identifier of the next data is determined, the CPU 14 checks whether or not the address corresponding to the identifier of the next data coincides with the data length management information 220 (step S613). In this determination, for example, the coincidence is checked in accordance with whether or not the start address of the next data determined based on the data length read in the step S612 exceeds the allowable range based on the address of the data length of the first hierarchy data indicated by the data length management information 220. Namely, in the above step S613, it is determined that whether or not the next data on the second hierarchy exists in the first hierarchy data.

In the case where it is determined that the address of the next identifier does not coincide with the data length management information 220 by the above determination, namely, in the case where it is determined that the next data on the second hierarchy does not exist (step S613, No data), the CPU 14 proceeds to the step S622 described later.

In addition, in the case where it is determined that the address of the next identifier coincides with the data length management information 220 by the above determination, namely, in the case where it is determined that the next data on the second hierarchy exists (step S613, YES), the CPU 14 reads data on an address corresponding to an identifier of the next data on the second hierarchy based on the data length read in the step S612 (step S616). When one byte of data is read in the step S616, the CPU 14 checks whether or not the next data (next one byte) is provided as a part of the identifier (step S617). In the case where it is thus checked that the next data is provided as a part of the identifier (step S617, YES), the CPU 14 reads the next one byte of data (step S618).

In the case where it is determined that the next data is not provided as a part of the identifier (step S617, NO), the CPU 14 determines that the data read in the steps S617 and S618 is provided as data indicating an identifier of the next data.

Therefore, in the case where it is checked that the next data is not provided as a part of the identifier, namely, in the case where the identifier of the next data on the second hierarchy is read (step 617, NO), the CPU 14 returns to the step S610 in which it is determined whether or not the read identifier coincides with the identifiers specified at the P1 section 904 and P2 section 905 of the command 900 (step S610).

In addition, in the case where it is determined that the identifier read by the determination of the step S610 coincides with the identifiers specified at the P1 section 904 and P2 section 905 of the received search command 900 (step S610, YES), the CPU 14 stores the data identifier information 210 contained in the control information 201a (namely, the identifier of the first hierarchy data) in a region 1102 of the above response data memory 1100 (step S620). At this time, the identifier of the first hierarchy data is set at an address having offset a data length serving as the response data length management information stored in a region 1101 of the response data memory 1100.

When the identifier is set in the region 1102 of the response data memory 1100, the CPU 14 changes a data length of response data in amount corresponding to the data for the set identifier by adding "+1" for the response data length management information (step S621).

When a search for the first hierarchy data indicated by one item of control information 201a, . . . from among the items of the control information 201 has been made (No in step S601, NO in step S613, or step S621), the CPU 14 determines whether or not the next control information exists (step S622).

In the case where it is determined that the next control information exists (step S622, YES), the CPU 14 reads out the next control information (step S623), and proceeds to the step S601. That is, the CPU 14 executes the processings in the steps S600 to S623 for all the control information. In this manner, a search for the second hierarchy data on the identifier specified by the search command 900 is made for all the first hierarchy data indicated by each item of control information.

In addition, in the case where it is determined that the next control information does not exist (step S622, NO), the CPU 14 determines that a search processing operation has been completed for all the first hierarchy data indicated by each item of the control information. In the case where it is thus determined that the search processing operation has been completed, the CPU 14 transmits response data 1000 as a result of making a search for the data stored in the response data memory 1100 to the reader/writer 2 (step S624).

Data contained in the region 1102 for the response data length information contained in the region 1101 of the above response data memory is set at the data section 1001 of this response data 1000. In addition, a response status indicating that the processing operation for the research command has been normally made (indicating that no abnormality occurs) is set at the first status section and the second status section of the response data 1000.

As described above, in the case where there has been successfully received a search command having specified an identifier (tag) of the second hierarchy data contained in data having a nest structure, the IC card makes a search for all the first hierarchy data (parent tag) including the second hierarchy data on the specified identifier so as to output the identifiers of all the first hierarchy data including the second hierarchy data on the identifier specified as the search result.

In this manner, the first hierarchy data including the second hierarchy data on a specific identifier can be easily detected without analyzing a respective one of a plurality of the first hierarchy data each having a nest structure. As a result, a search for the second hierarchy data can be efficiently made.

Now, a description will be given with respect to a processing operation for outputting a data structure contained in the first hierarchy data (data having a nest structure).

First, a description will be given with respect to instruction data (data structure output command) for instructing an output of the data structure contained in the first hierarchy data (data having a nest structure).

Figure 35:
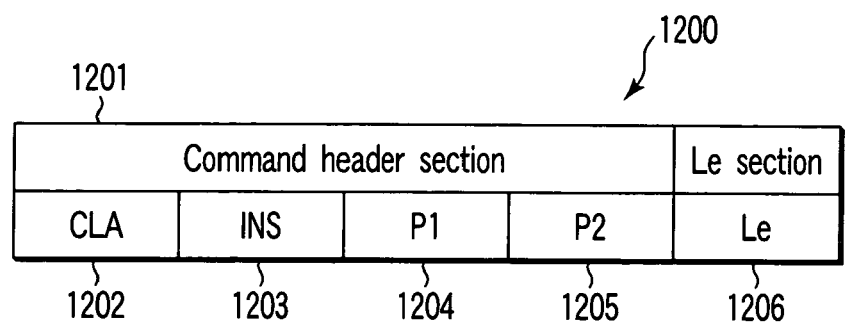
FIG. 35 is a view showing a configuration of a data output command for requesting an output of a structure of data having a nest structure.

FIG. 35 shows an example of a configuration of a data structure output command. This data structure output command 1200 is provided as a command to be supplied from the reader/writer 2 to the IC card 1.

This data structure output command 1200, as shown in FIG. 35, is composed of a command header section 1201 and an Le section 1206. The above command header section 1201 stores the data indicating the classification, instruction, and parameter of the command. The above Le section 1206 stores the data indicating a data length of the command header section 1201.

In addition, the command header section 1201 is composed of: a CLA (class) section 1202; an INS (instruction) section 1203; a first parameter (P1) section 1204; and a second parameter (P2) section 105.

The above CLA section 1202 stores the data indicating the classification (class) of the command. The INS section 1203 stores the data indicating the instruction of the command. In the data structure output command 1200, the data indicating an instruction for requesting an output of a data structure contained in the first hierarchy data on the identifiers specified by the parameters of the P1 section 1204 and P2 section 1205 is set at the INS section 1203.

The above first parameter (P1) section 1204 and the second parameter (P2) section 1205 stores the data (parameter) indicating an identifier of the first hierarchy data. For example, in the data structure output command 1200 for requesting an output of a data structure contained in data 100 (identifier E1) on point X shown in FIG. 4A, the data indicating the data structure output command is set at the CLA section 1202 and the INS section 1203; "00" is set at the P1 section 1204; and "E2" is set at the P2 section 1205.

The CPU 14 of the IC card 1 having received the data structure output command 1200 as shown in FIG. 35 discriminates that the command is provided as a data structure output command based on the data set at the CLA section 1202 and the INS section 1203 of the command 1200. When it is discriminated that the command is provided as the data structure output command, the CPU 14 analyzes a data structure contained in the first hierarchy data on the identifiers specified by the parameters (data) set at the P1 section 1204 and P2 section 1205. This analysis result is transmitted to the reader/writer 2 as a response to the data structure output command 1200.

Figure 36:
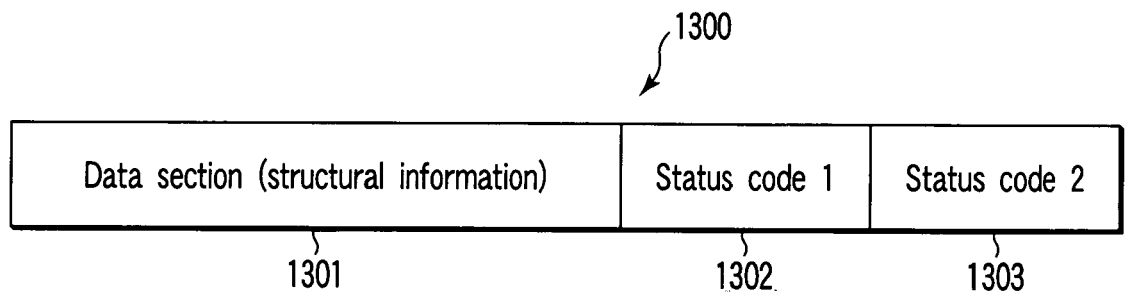
FIG. 36 is a view showing a configuration of response data in response to a data output command.

FIG. 36 shows an example of a configuration of response data 1300 to the data structure output command 1200. This response data 1300 is provided as data to be outputted from the IC card 1 to the reader/writer 2 as an execution result (response) of the data structure output command 1200.

The response data 1300 for the data structure output command 1200 is composed of: a data section 1301; a first status code section 1302; and a second status code section 1303.

The search result relevant to the data structure output command 1200 is composed of a data section 1301, a first status code section 1302, and a second status code section 1303.

The search result relevant to the data structure output command 1200 is set at the data section 1301. At the data section 1301, the data indicating the data structure contained in the first hierarchy of the specified identifier is set as an analysis result of the data structure contained in the first hierarchy data specified by the data structure output command 1200. In addition, the first status code 102 and the second status code 1303 are set as status codes each indicating a processing result relevant to the data structure output command 1200.

For example, it the case where there has been successfully received a data structure output command for requesting an output of a data structure of data (identifier E1) of point X shown in FIG. 4A, the IC card 1 outputs response data having set "DF01" (identifier of point value serving as the second hierarchy data); "DF02" (identifier of the upper limit value of point serving as the second hierarchy data); and "DF03" (identifier of the final update date of point serving as the second hierarchy data) as an identifier of the second hierarchy data included in data on point X (the specified first hierarchy data), the data being contained in the data section 1301.

In addition, the data stored in the response data memory 1100 as shown in FIG. 32 is set at the data section 1301 of the response data 1300 as shown in FIG. 36.

Now, a description will be given with respect to a flow of a processing operation (data structure output processing operation) for outputting a data structure in the first hierarchy data having a nest structure.

Figure 37:
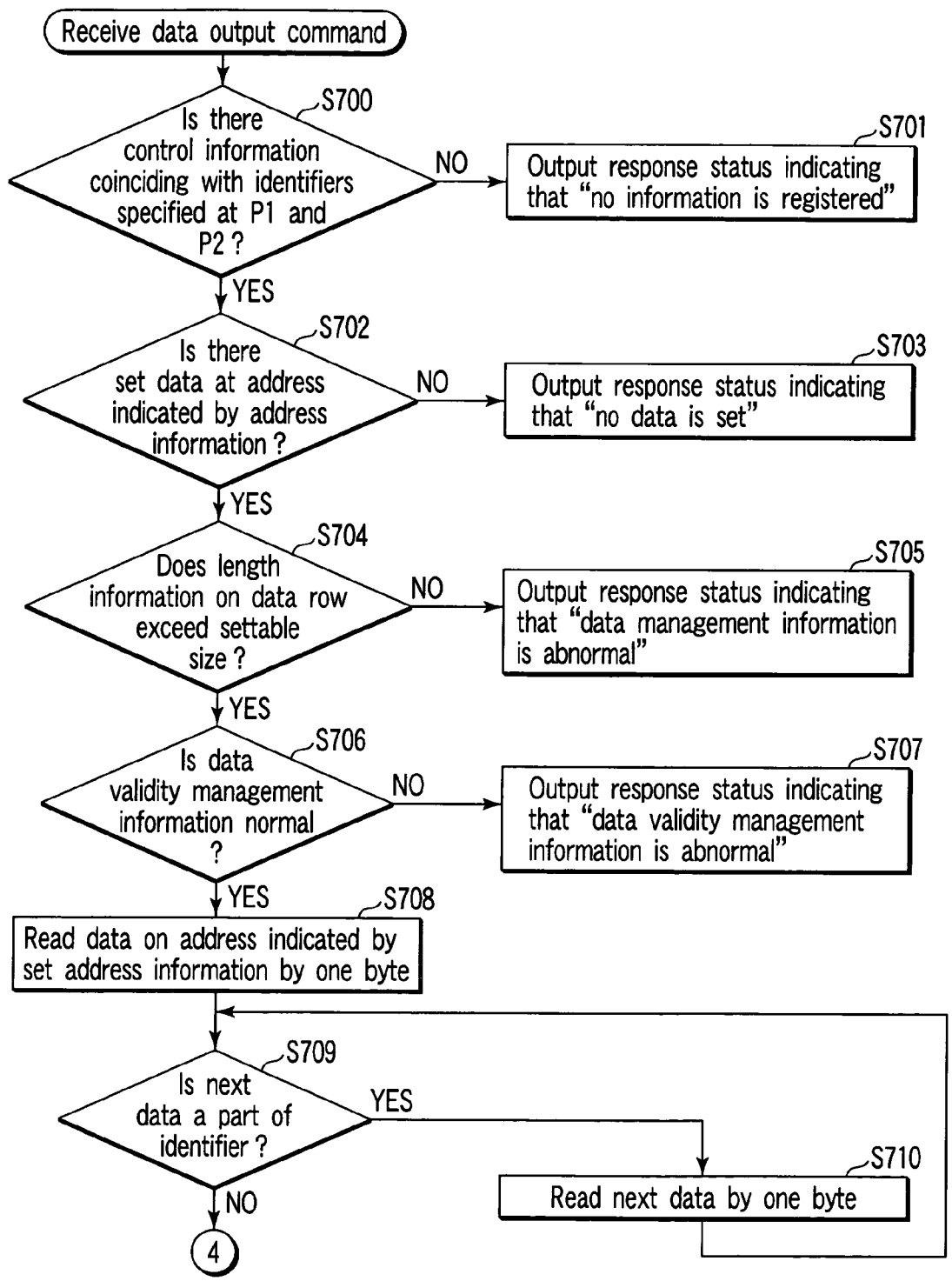
FIG. 37 is a flow chart illustrating a flow of the processing for outputting a structure of data having a nest structure.
Figure 38:
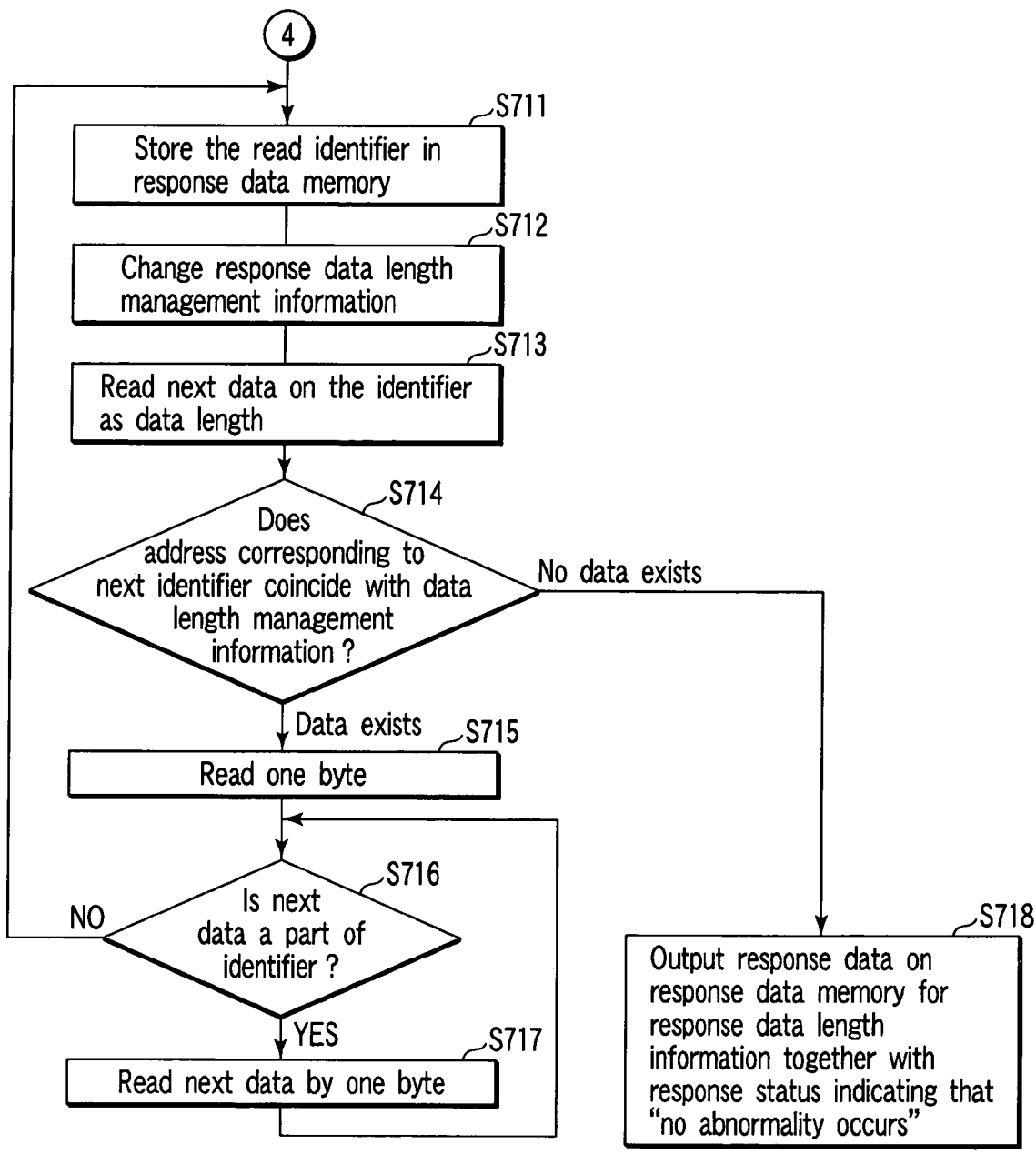
FIG. 38 is a flow chart illustrating a flow of the processing for outputting a structure of data having a nest structure.

FIGS. 37 and 38 are flow charts each illustrating the processing for outputting a data structure contained in the first hierarchy data having a nest structure.

First, it is assumed that the reader/writer 2 serving as an external device has supplied a data structure output command to the IC card 1. In the IC card 1, the communication section 12 receives the data structure output command 1200. The received command is supplied from the communication section 12 to the CPU 14. Then, the CPU 14 determines that the command is provided as a data structure output command by the CLA section 1202 and INS section 1203 of the command header section 1201 of the received command 1200.

When it is determined that the received command is provided as the data structure output command 1200, the CPU 14 makes a search for control information on the first hierarchy data on an identifier which coincides with the parameters set at the P1 section 1204 and P2 section 1205 of the command. This processing makes a search for the control information which coincides with the identifiers specified at the P1 section 1204 and P2 section 1205 from the data management information shown in FIG. 5 (step S700).

In the case where the control information on the identifier which does not coincide with the parameters set at the P1 section 804 and P2 section 805 has not been successfully specified (step S700, NO), the CPU 14 outputs a response status indicating that the control information on the data specified by the command is not registered, to the reader/writer 2 (step S701), and terminates processing.

In the case where the control information on the identifier which coincides with the parameters set at the P1 section 1204 and P2 section has been successfully specified (step S700, YES), the CPU 14 checks whether or not data has been already set at an address indicated by the set address information 211 contained in the control information (step S702). In the case where no data is set at the address indicated by the set address information 211 contained in the control information (step S702, NO), the CPU 14 outputs a response status indicating that data is not registered, to the reader/writer 2 (step S703), and terminates processing.

In the case where data has been set at the address indicated by the set address information 211 contained in the control information (step S702, YES), the CPU 14 checks whether or not the data length indicated by the data length management information 220 on the first hierarchy data specified by the command is within the allowable range indicated by the settable size information 212 contained in the control information (step S704).

In the case where the data length of the first hierarchy data specified by the command exceeds the allowable range (step S704, NO), the CPU 14 outputs a response status indicating that the data management information on the specified first hierarchy data is abnormal (indicating that the data length exceeds the allowable range) to the reader/writer 2 (step S705), and terminates processing.

In the case where it is checked that data length of the first hierarchy data specified by the command is within the allowable range (step S704, YES), the CPU 14 checks the validity of the first hierarchy data in accordance with the data validity management information 222 on the first hierarchy data specified by the command (step S706).

In the case where the validity of the first hierarchy data specified by the command has not been successfully checked (step S706, NO), the CPU 14 outputs a response status indicating that abnormal data validity management information on the first hierarchy data has been specified by the command (indicating that the validity of the data has not been successfully checked) to the reader/writer 2 (step S707), and terminates processing.

In the case where the validity of the first hierarchy data specified by the command has been successfully checked (step S706, YES), the CPU 14 reads the data on an address indicated by the set address information 211 contained in the control information by one byte (step S708). When one byte of data is read in the above step S708, the CPU 14 checks whether or not the next data (next one byte) is provided as a part of the identifier (step S709). In the case where the next data is provided as a part of the identifier (step S709, YES), the CPU 14 reads the next data by one byte (step S710).

In the case where the next data is not provided as a part of the identifier (step S709, NO), the CPU 14 determines that the data read in the steps S708 and S710 is provided as an identifier of the second hierarchy data contained in the first hierarchy data. That is, the CPU 14 reads the first identifier on the second hierarchy contained in the first hierarchy data specified by the processings of the steps S708 to S710.

Therefore, in the case where the next data is not provided as a part of the identifier, namely, in the case where there has been successfully read the first data on the second hierarchy contained in the specified first hierarchy data (step S709, NO), the CPU 14 stores an identifier of the read second hierarchy data (namely, identifier of the second hierarchy data existing in the specified first hierarchy data) in the region 1102 of the response data memory 1199 (step S711). At this time, the identifier of the second hierarchy data is set at an address having offset the data length serving as the response data length management information stored in the region 1101 of the response data memory 1100.

When the identifier is set in the region 1102 of the response data memory 1100, the CPU 14 changes the data length of the response data in amount corresponding to the data on the set identifier by adding "+2" for the response data length management information (step S712).

When the second identifier read in the response data memory 100 is set, the CPU 14 reads data that follows the identifier as a data length of the identifier data (step S713). When the data length is thus read, the CPU 14 determines a start address of the next second hierarchy data (next identifier) based on the read data length.

When the start address of the next data identifier is determined, the CPU 14 checks whether or not the address corresponding to the next data identifier coincides with the data length of the data length management information 220 (step S714). In the determination of the step S714, for example, the coincidence is checked in accordance with whether or not the start address of the next data determined based on the data length read in the step S713 exceeds the range of the address based on the data length of the first hierarchy data indicated by the data length management information 220. Namely, in the above step S714, it is determined whether or not the next data on the second hierarchy exists in the first hierarchy data.

In the case where it is determined that the address of the next identifier coincides with the data length of the data length management in formation 220 in the step S714, namely, in the case where it is determined that the next data on the second hierarchy exists (step S714, YES), the CPU 14 reads the data on an address which corresponds to an identifier of the next data on the second hierarchy based on the data length read in the step S713 by one byte (step S715). When one byte of data is read in the step S715, the CPU 14 checks whether or not the next data (next one byte) is provided as a part of the identifier (step S716). In the case where the next data is provide as a part of the identifier (step S716, YES), the CPU 14 reads the next data by one byte (step S717).

In the case where it is determined that the next data is not provided as a part of the identifier (step S716, NO), the CPU 14 determines that the data read in the steps S617 and S618 is provided as data indicating an identifier of the next data. Therefore, in the case where the next data is not provided as a part of the identifier, namely, in the case where the identifier of the next data on the second hierarchy has been read (step S716, NO), the CPU 14 returns to the step S711, and carries out a processing operation for setting the read identifier (identifier of the second hierarchy data) for the response data memory.

The processings of the steps S711 to S717 are repeatedly executed until it has been determined that the identifier of the next data on the second hierarchy does not exist in the step S714. Namely, the information indicating a data structure in the first hierarchy data specified by the data structure output command 1200 (identifiers of all the second hierarchy data existing in the first hierarchy data) is set in the response data memory 1100 in accordance with the processings of the step S711 to S717.

That is, in the case where it is determined that the address of the identifier of the next data on the second hierarchy does not coincide with the data length of the data length management information 220 by the determination of the step S714 (step S714, No data), the CPU 14 determines that an analysis processing operation has been completed for the data structure in the first hierarchy data specified by the data structure output command 1200. In the case where it is thus determined that the search processing operation has been completed, the CPU 14 transmits response data 1300 as a result of analyzing the data stored in the response data memory 1100 to the reader/writer 2 (step S718).

The data contained in the region 1102 for the response data length management information contained in the region 1101 of the response data memory 1100 is set at the data section 1301 of this response data 1300. In addition, response statuses each indicating that processing has been normally carried out for the data structure output command 1200 (indicating that no abnormality occurs) is set at the first status section 1302 and the second status section 1303 of the response data 1300.

As described above, in the case where there has been successfully received a data structure output command having specified an identifier of the first hierarchy data having a nest structure, the IC card analyzes the identifiers of all the second hierarchy data contained in the specified first hierarchy data so as to output the identifiers of all the second hierarchy data included in the first hierarchy data specified as this analysis result.

In this manner, the contents of the second hierarchy data included in the first hierarchy data having a nest structure can be easily detected.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable electronic device comprising:
   a memory which stores data having a nest structure in which a plurality of lower hierarchy data exist in upper hierarchy data; and
   a control section which provides direct access to only specific lower hierarchy data from among the plurality of lower hierarchy data existing in the upper hierarchy data with respect to the data having a nest structure stored in the memory.

2. A portable electronic device according to claim 1, wherein the upper hierarchy data and the lower hierarchy data are expression formats composed of a tag, a length, and a value.

3. A portable electronic device according to claim 1, further comprising:
   a communication section which makes communication with an external device, wherein, in the case where there has been successfully received a command having the upper hierarchy data and the lower hierarchy data specified by the communication section, the control section provides direct access to the lower hierarchy data specified by the command from among the plurality of lower hierarchy data existing in the upper hierarchy data specified by the command.

4. A portable electronic device according to claim 3, wherein, in the case where there has been successfully received a read command having the upper hierarchy data and the lower hierarchy data specified by the communication section, the control section reads out only the lower hierarchy data specified by the command from among the plurality of lower hierarchy data existing in the upper hierarchy data specified by the command.

5. A portable electronic device according to claim 3, wherein, in the case where there has been successfully received a data change command having the upper hierarchy data and the lower hierarchy data specified by the communication section, the control section rewrites only the lower hierarchy data specified by the command into data to be changed, the data being assigned by the command, from among the plurality of lower hierarchy data existing in the upper hierarchy data specified by the command.

6. A portable electronic device according to claim 3, wherein, in the case where there has been successfully received a sequence specifying read command having the upper hierarchy data, the lower hierarchy data and the sequence specified by the communication section, the control section reads out only lower hierarchy data in sequence specified by the command from among the upper hierarchy data specified by the command, of the lower hierarchy data existing in the upper hierarchy data specified by the command.

7. A portable electronic device according to claim 3, wherein, in the case where there has been successfully received a deleting command having the upper hierarchy data and the lower hierarchy data specified by the communication section, the control section deletes only lower hierarchy data specified by the command from among the plurality of lower hierarchy data existing in the upper hierarchy data specified by the command.

8. A portable electronic device according to claim 3, wherein, in the case where there has been successfully received an additional writing command having the upper hierarchy data specified by the communication section, the control section additionally writes data to be additionally written, the data being assigned by the command, as lower hierarchy data into the upper hierarchy data specified by the command.

9. A portable electronic device according to claim 3, wherein, in the case where there has been successfully received a search command having the lower hierarchy data specified by the communication section, the control section searches for the upper hierarchy data including the lower hierarchy data specified by the command from among the data having the nest structure stored in the memory.

10. A portable electronic device according to claim 3, wherein, in the case where there has been successfully received a data output command having the upper hierarchy data specified by the communication section, the control section extracts information indicating all the lower hierarchy data existing in the upper hierarchy data specified by the command.

* * * * *